US010965928B2

(12) United States Patent
Lee et al.

(10) Patent No.: US 10,965,928 B2
(45) Date of Patent: Mar. 30, 2021

(54) METHOD FOR 360 VIDEO PROCESSING BASED ON MULTIPLE VIEWPOINTS AND APPARATUS THEREFOR

(71) Applicant: LG ELECTRONICS INC., Seoul (KR)

(72) Inventors: Sooyeon Lee, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/767,558

(22) PCT Filed: Jul. 31, 2018

(86) PCT No.: PCT/KR2018/008705
§ 371 (c)(1),
(2) Date: May 27, 2020

(87) PCT Pub. No.: WO2020/027349
PCT Pub. Date: Feb. 6, 2020

(65) Prior Publication Data
US 2020/0322586 A1 Oct. 8, 2020

(51) Int. Cl.
*H04N 13/117* (2018.01)
*H04N 13/268* (2018.01)
(Continued)

(52) U.S. Cl.
CPC ......... *H04N 13/117* (2018.05); *H04N 13/178* (2018.05); *H04N 13/268* (2018.05);
(Continued)

(58) Field of Classification Search
None
See application file for complete search history.

(56) References Cited

U.S. PATENT DOCUMENTS 8,862,987 B2 * 10/2014 Haussecker ........ H04N 5/23238
715/243
9,167,226 B2 * 10/2015 Klein Gunnewiek ......................
H04N 13/111
(Continued)

FOREIGN PATENT DOCUMENTS

KR 20080066722 A * 7/2008 ............. H04N 5/262
KR 10-2018-0029344 A 3/2018
(Continued)

*Primary Examiner* — James A Thompson
(74) *Attorney, Agent, or Firm* — Dentons US LLP

(57) ABSTRACT

A method for 360 video data processing based on multiple viewpoints performed by a 360 video receiving apparatus according to the present invention comprises the steps of: acquiring, from received video signals, image information for pictures of multiple viewpoints-based 360 videos and metadata for the multiple viewpoints-based 360 videos, wherein the metadata includes multiple viewpoint information; decoding an image of a first viewport of a first viewpoint on the basis of the metadata and the image information; rendering the image of the first viewport into a 3D space; decoding an image of a second viewport of a second viewpoint on the basis of the metadata and the image information; deriving, in a case in which the hotspot in the first viewport is selected, the second viewport in the second viewpoint connected through a hotspot on the basis of the multiple viewpoint information; and rendering the image of the second viewport into the 3D space.

18 Claims, 31 Drawing Sheets

(51) Int. Cl.

| | | |
|---|---|---|
| *H04N 13/178* | (2018.01) | |
| *H04N 21/236* | (2011.01) | |
| *H04N 21/81* | (2011.01) | |
| *H04N 21/858* | (2011.01) | |
| *G06T 15/08* | (2011.01) | |
| *G06T 15/20* | (2011.01) | |
| *G06T 19/00* | (2011.01) | |

(52) U.S. Cl.
CPC ..... *H04N 21/23614* (2013.01); *H04N 21/816* (2013.01); *H04N 21/858* (2013.01); *G06T 15/08* (2013.01); *G06T 15/20* (2013.01); *G06T 19/00* (2013.01)

(56) References Cited

U.S. PATENT DOCUMENTS

| | | | |
|---|---|---|---|
| 2010/0251101 A1* | 9/2010 | Haussecker | H04N 5/23238 715/243 |
| 2012/0081382 A1* | 4/2012 | Lindahl | G06T 11/00 345/581 |
| 2017/0053675 A1* | 2/2017 | Dickerson | G11B 27/036 |
| 2018/0077451 A1* | 3/2018 | Yip | H04N 21/4104 |
| 2018/0091735 A1 | 3/2018 | Wang et al. | |
| 2018/0211443 A1 | 7/2018 | Abbas | |
| 2018/0374192 A1* | 12/2018 | Kunkel | G06T 15/205 |
| 2019/0236795 A1* | 8/2019 | Oryoji | H04N 5/247 |
| 2019/0306530 A1* | 10/2019 | Fan | H04N 13/161 |
| 2020/0007845 A1* | 1/2020 | Fukuyasu | H04N 5/23238 |
| 2020/0029111 A1* | 1/2020 | Koyama | G06T 19/006 |
| 2020/0092531 A1* | 3/2020 | Di | H04N 21/44 |
| 2020/0260063 A1* | 8/2020 | Hannuksela | H04N 13/243 |

FOREIGN PATENT DOCUMENTS

| | | | | |
|---|---|---|---|---|
| KR | 20180029344 A | * | 3/2018 | ........... H04N 13/178 |
| KR | 10-2018-0040507 A | | 4/2018 | |

* cited by examiner

FIG. 9a
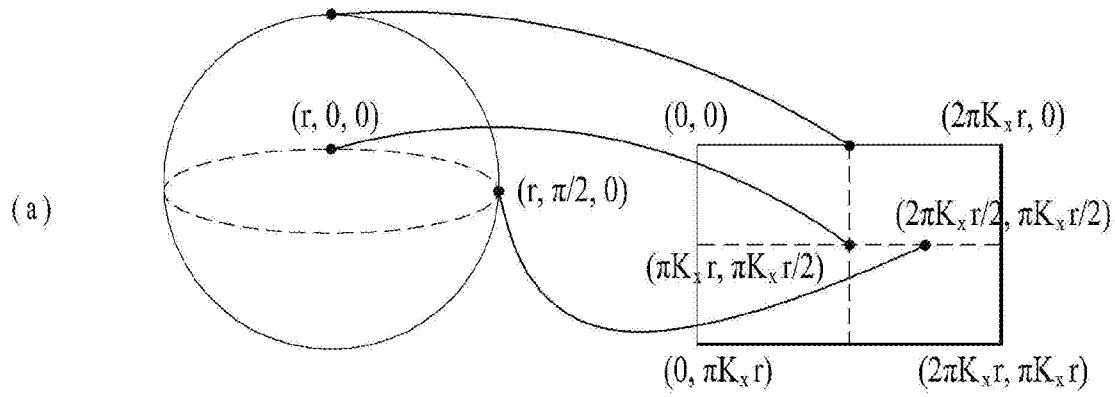
(a)
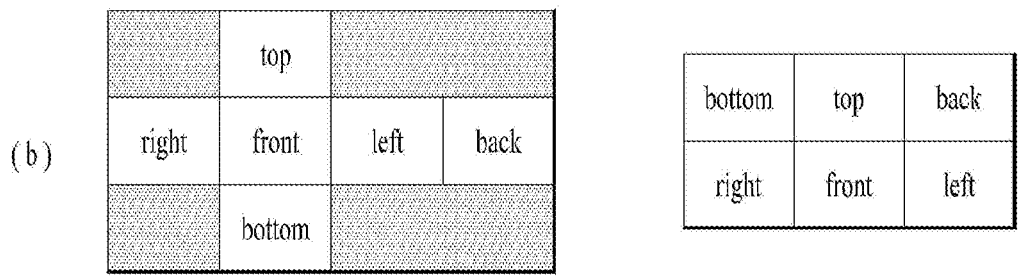
(b)
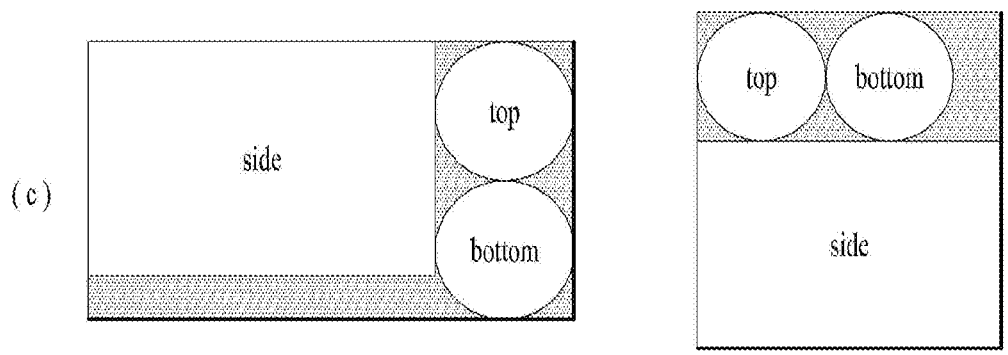
(c)
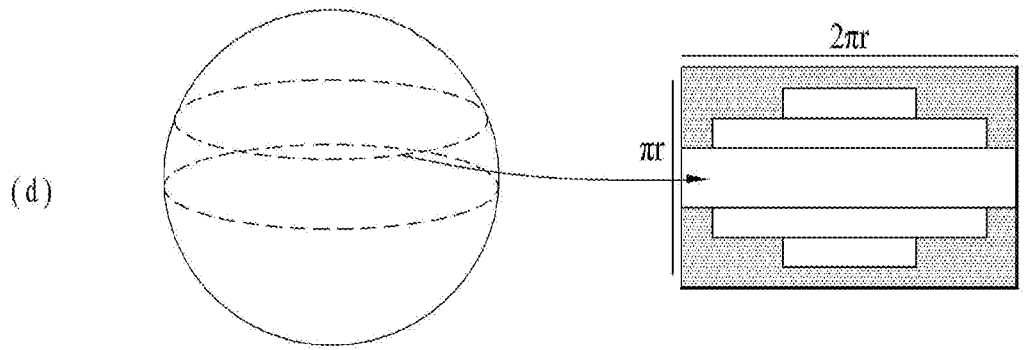
(d)

FIG. 9b
(e)
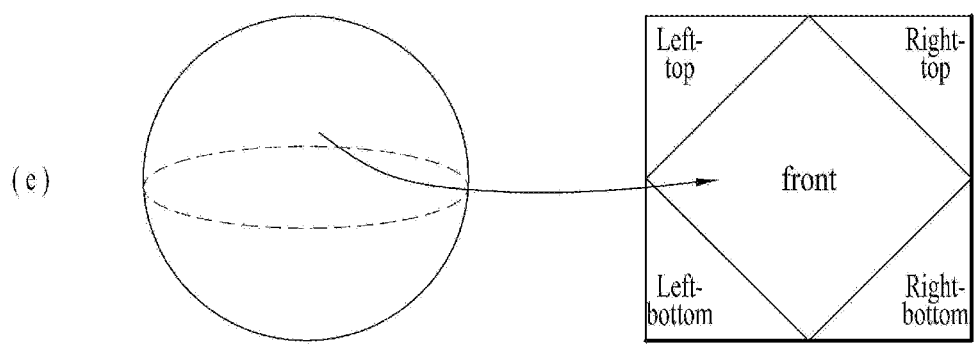
(f)
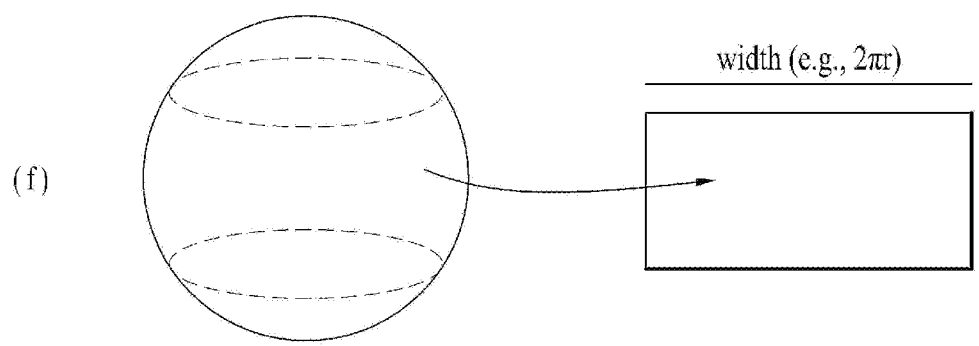
(g)

FIG. 11

```
...
            Default metadata
unsigned    int(8)      vr_geometry;
unsigned    int(8)      projection_schme;
    Stereoscopic related metadata
unsigned    int(1)      is_stereoscopic;
unsigned    int(3)      stereo_mode;
    Initial View related metadata
signed      int(8)      initial_view_yaw_degree;
signed      int(8)      initial_view_pitch_degree;
signed      int(8)      initial_view_roll_degree;
        ROI related metadata
unsigned int(1)     2d_roi_range_flag;
unsigned int(1)     3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
    Field Of View related metadata
unsigned int(1)             content_fov_flag;
if (content_fov_flag==1) {
  unsigned int(16)          content_fov;
}
    Cropped Region related metadata
unsigned int(1)             is_copped_region;
if (content_fov_flag==1) {
  unsigned int(16)          cr_region_left_top_x;
  unsigned int(16)          cr_region_left_top_y;
  unsigned int(16)          cr_region_width;
  unsigned int(16)          cr_region_height;
}
...
```

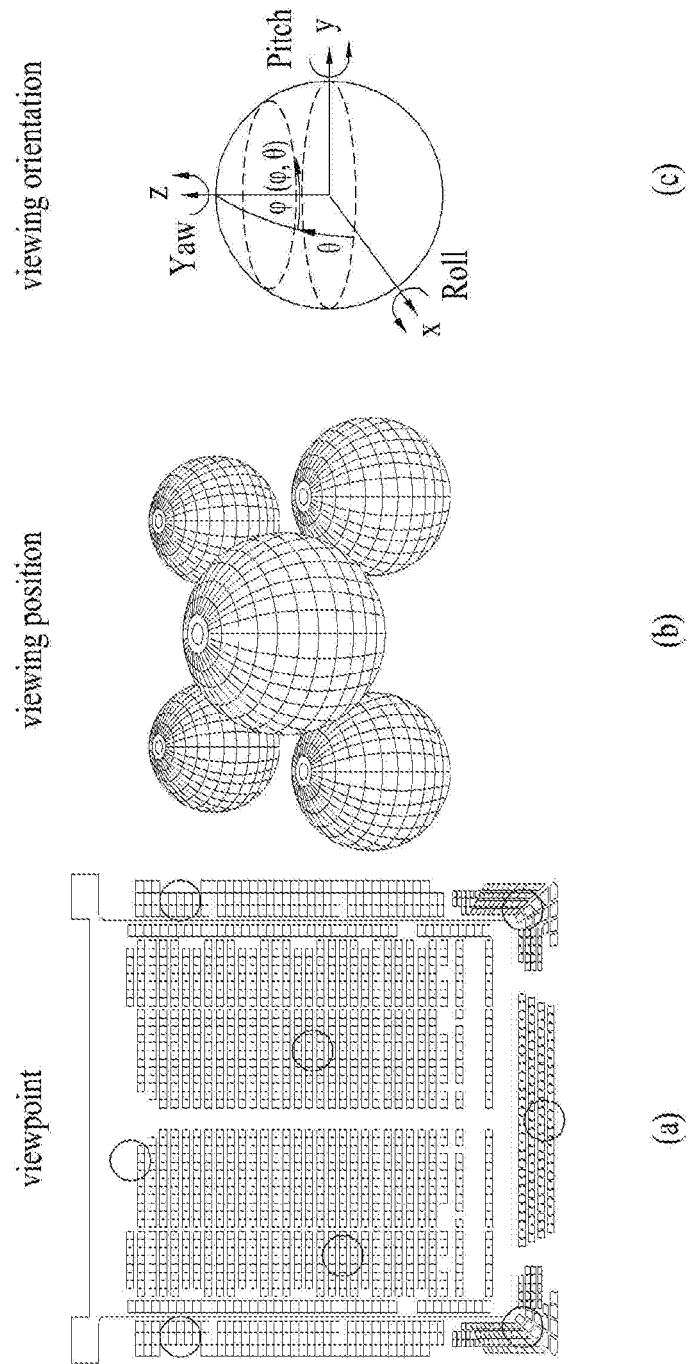

FIG. 20
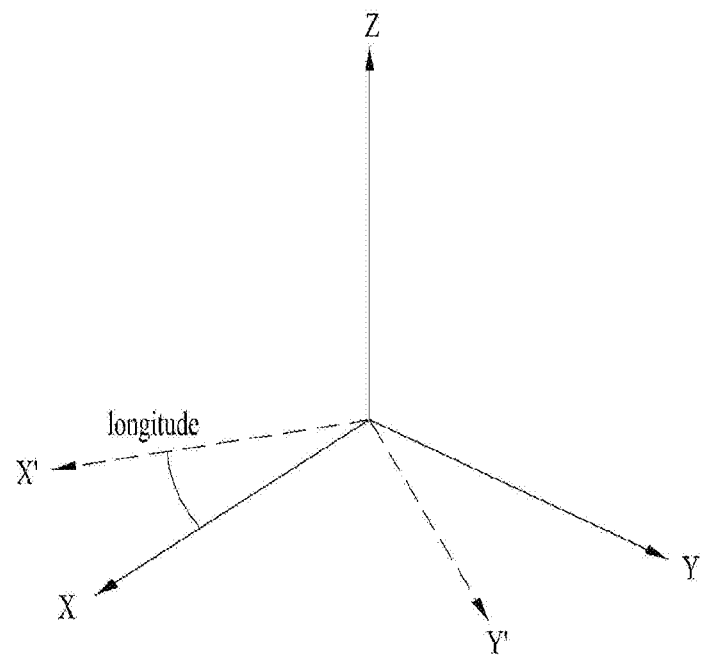
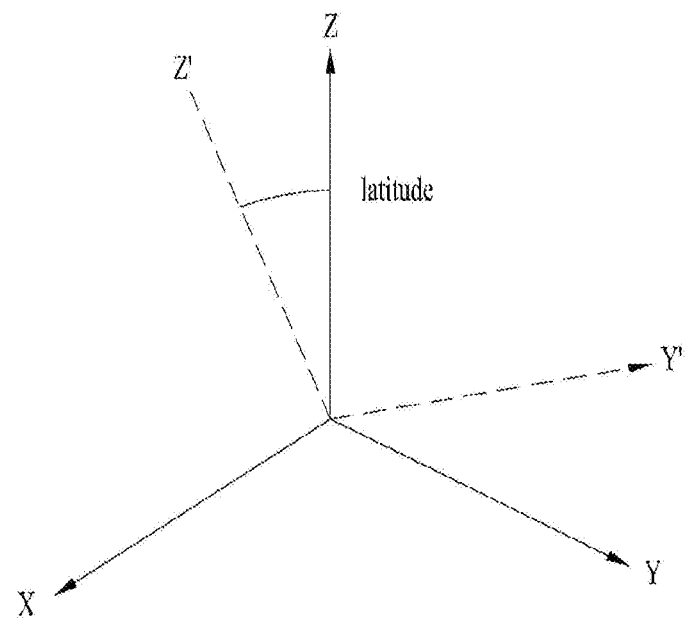

FIG. 23
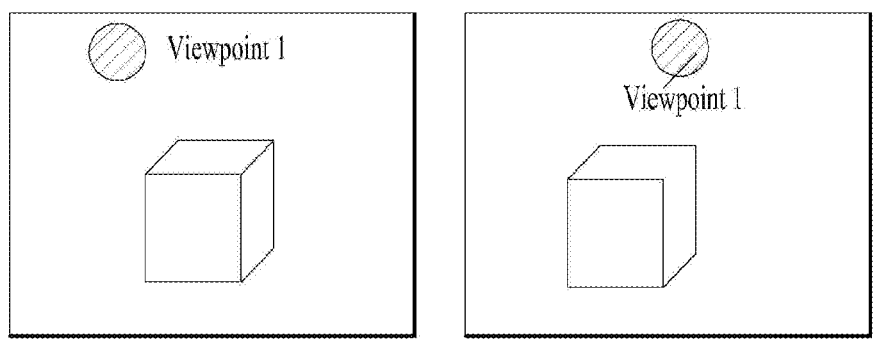
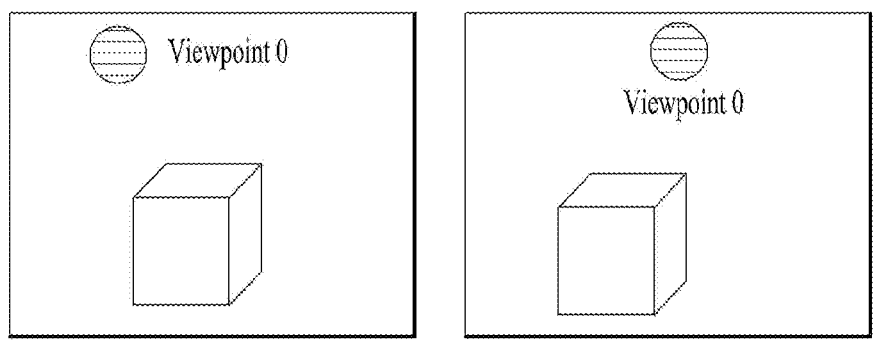
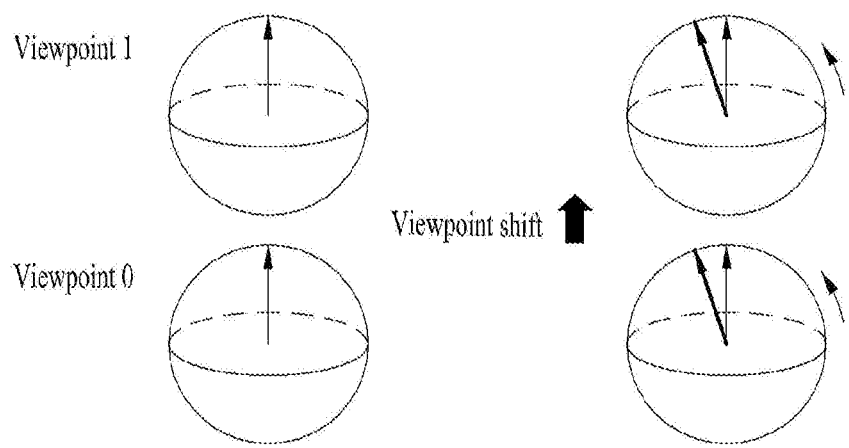

FIG. 25
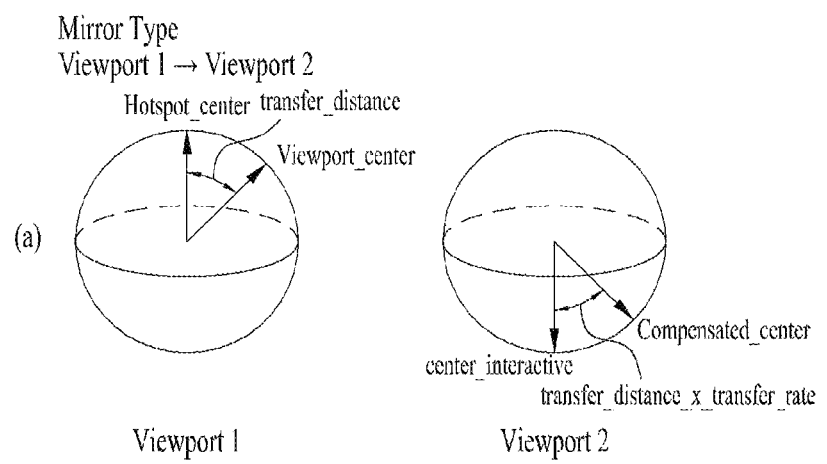
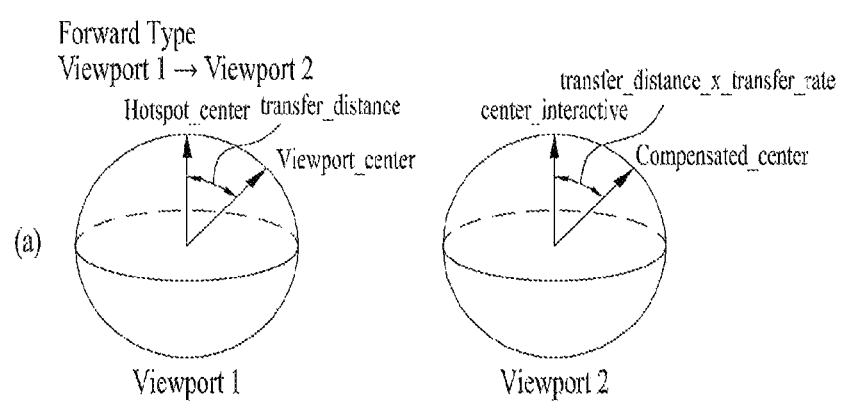
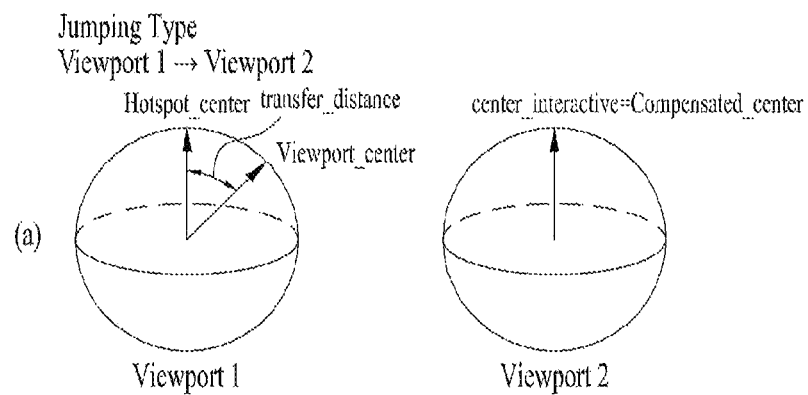

METHOD FOR 360 VIDEO PROCESSING BASED ON MULTIPLE VIEWPOINTS AND APPARATUS THEREFOR

This application is a National Stage Application of International Application No. PCT/KR2018/008705, filed on Jul. 31, 2018, which is hereby incorporated by reference in its entirety for all purposes as if fully set forth herein.

TECHNICAL FIELD

The present disclosure relates to a 360 video, and more particularly, to a method for processing 360-degree video based on multiple viewpoints and an apparatus therefor.

BACKGROUND ART

A virtual reality (VR) system provides a user with a sense of being in an electronically projected environment. The system for providing VR may be further improved to provide higher quality images and stereophonic sound. A VR system may allow a user to interactively consume VR content.

DISCLOSURE

Technical Problem

An object of the present disclosure is to provide a method and apparatus for processing 360 video data.

Another object of the present disclosure is to provide a method and apparatus for transmitting metadata for 360 video data.

Another object of the present disclosure is to provide a method and apparatus for transmitting metadata for efficient rendering of 360 video.

Another object of the present disclosure is to provide a method and apparatus for efficiently processing 360 video based on multiple viewpoints.

Another object of the present disclosure is to provide a method and apparatus for transmitting metadata for efficient viewpoint switching of 360-degree video based on multiple viewpoints.

Technical Solution

In one aspect of the present disclosure, provided herein is a method for processing 360 video data by a 360 video reception apparatus. The method may include acquiring image information about pictures of 360 videos based on multiple viewpoints and metadata about the 360 videos based on the multiple viewpoints from a received video signal, the metadata including multi-viewpoint information, decoding an image of a first viewport of a first viewpoint based on the metadata and the image information, rendering the image of the first viewport in a 3D space, decoding an image of a second viewport of a second viewpoint based on the metadata and the image information, deriving the second viewport in the second viewpoint linked through a hotspot in the first viewport based on the multi-viewpoint information, and rendering the image of the second viewport in the 3D space.

In another aspect of the present disclosure, provided herein is a 360 video reception apparatus for processing 360 video data. The 360 video reception apparatus may include a reception processor configured to acquire image information about pictures of 360 videos based on multiple viewpoints and metadata about the 360 videos based on the multiple viewpoints from a received video signal, the metadata including multi-viewpoint information, a data decoder configured to decode an image of a first viewport of a first viewpoint based on the metadata and the image information and decode an image of a second viewport of a second viewpoint based on the metadata and the image information, and a renderer configured to render the image of the first viewport in a 3D space, derive the second viewport in the second viewpoint linked through a hotspot in the first viewport based on the multi-viewpoint information, and render the image of the second viewport in the 3D space.

In another aspect of the present disclosure, provided herein is a method for processing 360 video data by a 360 video transmission apparatus. The method may include acquiring 360 videos supporting multiple viewpoints, processing the 360 videos and deriving pictures related to each of the viewpoints, generating metadata including multi-viewpoint information, encoding the pictures related to each of the viewpoints, and performing processing for storage or transmission on the encoded pictures and the metadata, wherein the multi-viewpoint information indicates that a first viewport of a first viewpoint among the multiple viewpoints is linked to a second viewport in a second viewpoint through a hotspot in the first viewport.

In another aspect of the present disclosure, provided herein is a 360 video transmission apparatus for processing 360 video data. The 360 video transmission apparatus may include a data input unit configured to acquire 360 videos supporting multiple viewpoints, a projection processor configured to process the 360 videos and deriving pictures related to each of the viewpoints, a metadata processor configured to generate metadata including multi-viewpoint information, a data encoder configured to encode the pictures related to each of the viewpoints, and a transmission processor configured to perform processing for storage or transmission on the encoded pictures and the metadata.

Advantageous Effects

According to the present disclosure, VR content may be efficiently transmitted in an environment supporting next-generation hybrid broadcasting, which employs a terrestrial broadcasting network and the Internet.

According to the present disclosure, an interactive experience may be provided to a user in consuming 360 content.

According to the present disclosure, when a user consumpes 360 content, signaling may be performed so as to accurately reflect the intention of a 360 content creator.

According to the present disclosure, in deliverying 360 content, necessary information may be delivered while efficiently increasing the transmission capacity.

According to the present disclosure, 360 content based on multiple viewpoints may be efficiently provided, and user inconvenience may be minimized in switching between viewpoints.

According to the present disclosure, signaling information about 360-degree video data may be efficiently stored and transmitted through an International Organization for Standardization (ISO)-based media file format such as an ISO base media file format (ISOBMFF).

According to the present disclosure, signaling information about 360-degree video data may be transmitted through HyperText Transfer Protocol (HTTP)-based adaptive streaming such as Dynamic Adaptive Streaming over HTTP (DASH).

According to the present disclosure, signaling information about 360-degree video data may be stored and transmitted through a supplemental enhancement information (SEI) message or video usability information (VUI), thereby improving the overall transmission efficiency.

DESCRIPTION OF DRAWINGS

FIGS. 9A and 9B exemplarily show projection formats according to the disclosure.

FIG. 11 shows an example of 360-degree video-related metadata according to an embodiment of the present disclosure.

FIG. 12 schematically illustrates the concept of a viewpoint, a viewing position, and a viewing orientation.

FIG. 20 shows an example of shift of axes.

FIGS. 22 to 24 exemplarily show hotspot types to which the present disclosure is applicable.

FIG. 25 shows an example of position compensation and an application direction of transfer_rate according to each hot spot type.

MODE

Figure 1:
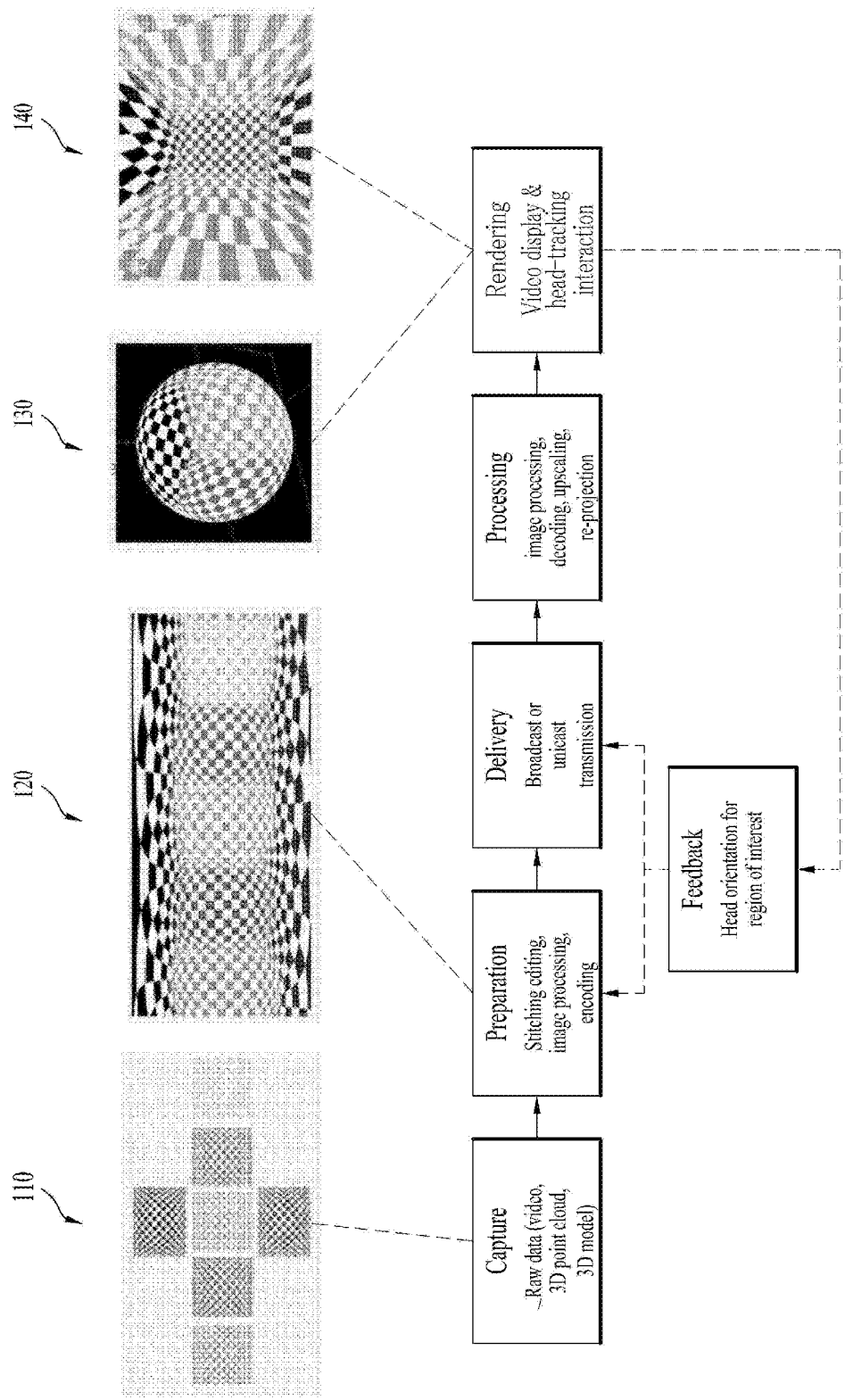
FIG. 1 is a diagram showing an overall architecture for providing a 360 video according to an embodiment.

The present disclosure may be subjected to various changes and may have various embodiments, and specific embodiments will be described in detail with reference to the accompanying drawings. However, this is not intended to limit the disclosure to the specific embodiments. Terms used in this specification are merely adopted to explain specific embodiments, and are not intended to limit the technical spirit of the present disclosure. A singular expression includes a plural expression unless the context clearly indicates otherwise. In this specification, the term "include" or "have" is intended to indicate that characteristics, figures, steps, operations, constituents, and components disclosed in the specification or combinations thereof exist, and should be understood as not precluding the existence or addition of one or more other characteristics, figures, steps, operations, constituents, components, or combinations thereof.

Though individual elements described in the present disclosure are independently shown in the drawings for convenience of description of different functions, this does not mean that the elements are implemented in hardware or software elements separate from each other. For example, two or more of the elements may be combined to form one element, or one element may be divided into a plurality of elements. Embodiments in which respective elements are integrated and/or separated are also within the scope of the present disclosure without departing from the essence of the present disclosure.

Hereinafter, exemplary embodiments of the present disclosure will be described in detail with reference to the accompanying drawings. The same reference numerals will be used for the same components in the drawings, and redundant descriptions of the same components may be omitted.

FIG. 1 is a diagram showing an overall architecture for providing a 360 video according to an embodiment.

In order to provide virtual reality (VR) to users, a method of providing 360-degree content is proposed. VR may refer to a technique or an environment for replicating a real or virtual environment. VR may artificially provide sensuous experiences to users and thus users may experience electronically projected environments therethrough.

360 content may refer to all content for realizing and providing VR, and may include 360 video and/or 360 audio. 360-degree video may refer to video or image content which is needed to provide VR and is captured or played in all directions (360 degrees) at the same time. Hereinafter, a 360 video may refer to a 360-degree video. A 360 video may refer to a video or an image presented in various types of 3D space according to a 3D model. For example, 360 video may be presented on a spherical surface. 360 audio may be audio content for providing VR and may refer to spatial audio content which may make an audio generation source recognized as being located in a specific 3D space. 360 content may be generated, processed and transmitted to users, and the users may consume VR experiences using the 360 content. The 360 video may be called omnidirectional video, and the 360 image may be called omnidirectional image.

In particular, the present disclosure proposes a method for effectively providing 360 video. To provide 360 video, a 360 video may be captured first using one or more cameras. The captured 360 video may be transmitted through a series of processes, and the data received on the receiving side may be processed into the original 360 video and rendered. Then, the 360 video may be provided to a user.

Specifically, the entire processes for providing 360 video may include a capture process, a preparation process, a transmission process, a processing process, a rendering process and/or a feedback process.

The capture process may refer to a process of capturing images or videos for multiple viewpoints through one or more cameras. Image/video data as shown in part 110 of FIG. 1 may be generated through the capture process. Each plane in part 110 of FIG. 1 may refer to an image/video for each viewpoint. The captured images/videos may be called raw data. In the capture process, metadata related to capture may be generated.

A special camera for VR may be used for capture. According to an embodiment, when a 360 video for a virtual space generated using a computer is to be provided, the capture operation using an actual camera may not be performed. In this case, the capture process may be replaced by a process of simply generating related data.

The preparation process may be a process of processing the captured images/videos and the metadata generated in the capture process. The captured images/videos may be subjected to stitching, projection, region-wise packing and/or encoding in the preparation process.

First, the images/videos may be subjected to the stitching process. The stitching process may be a process of connecting the captured images/videos to create a single panoramic image/video or a spherical image/video.

Then, the stitched images/videos may be subjected to the projection process. In the projection process, the stitched images/videos may be projected onto a 2D image. The 2D image may be referred to as a 2D image frame depending on the context. Projecting onto a 2D image may be referred to as mapping to the 2D image. The projected image/video data may take the form of a 2D image as shown in part 120 of FIG. 1.

The video data projected onto the 2D image may be subjected to the region-wise packing process in order to increase video coding efficiency. Region-wise packing may refer to a process of dividing the video data projected onto the 2D image into regions and processing the regions. Here, the regions may refer to regions obtained by dividing the 2D image onto which 360 video data is projected. According to an embodiment, such regions may be distinguished by dividing the 2D image equally or randomly. According to an embodiment, the regions may be divided according to a projection scheme. The region-wise packing process may be an optional process and may thus be omitted from the preparation process.

According to an embodiment, this processing process may include a process of rotating the regions or rearranging the regions on the 2D image in order to increase video coding efficiency. For example, the regions may be rotated such that specific sides of the regions are positioned close to each other. Thereby, efficiency may be increased in coding.

According to an embodiment, the processing process may include a process of increasing or decreasing the resolution of a specific region in order to differentiate the resolutions for regions of the 360 video. For example, the resolution of regions corresponding to a relatively important area of the 360 video may be increased over the resolution of the other regions. The video data projected onto the 2D image or the region-wise packed video data may be subjected to the encoding process that employs a video codec.

According to an embodiment, the preparation process may further include an editing process. In the editing process, the image/video data may be edited before or after the projection. In the preparation process, metadata for stitching/projection/encoding/editing may be generated. In addition, metadata about the initial viewpoint or the region of interest (ROI) of the video data projected onto the 2D image may be generated.

The transmission process may be a process of processing and transmitting the image/video data and the metadata obtained through the preparation process. Processing according to any transport protocol may be performed for transmission. The data that has been processed for transmission may be delivered over a broadcasting network and/or broadband. The data may be delivered to a reception side on an on-demand basis. The receiving side may receive the data through various paths.

The processing process may refer to a process of decoding the received data and re-projecting the projected image/video data onto a 3D model. In this process, the image/video data projected onto 2D images may be re-projected onto a 3D space. This process may be referred to as mapping projection depending on the context. Here, the shape of the 3D space to which the data is mapped may depend on the 3D model. For example, 3D models may include a sphere, a cube, a cylinder and a pyramid.

According to an embodiment, the processing process may further include an editing process and an up-scaling process. In the editing process, the image/video data may be edited before or after the re-projection. When the image/video data has a reduced size, the size of the image/video data may be increased by up-scaling the samples in the up-scaling process. The size may be reduced through down-scaling, when necessary.

The rendering process may refer to a process of rendering and displaying the image/video data re-projected onto the 3D space. The re-projection and rendering may be collectively expressed as rendering on a 3D model. The image/video re-projected (or rendered) on the 3D model may take the form as shown in part 130 of FIG. 1. The part 130 of FIG. 1 corresponds to a case where the image/video data is re-projected onto a 3D model of sphere. A user may view a part of the regions of the rendered image/video through a VR display or the like. Here, the region viewed by the user may take the form as shown in part 140 of FIG. 1.

The feedback process may refer to a process of delivering various types of feedback information which may be acquired in the display process to a transmitting side. Through the feedback process, interactivity may be provided in 360 video consumption. According to an embodiment, head orientation information, viewport information indicating a region currently viewed by a user, and the like may be delivered to the transmitting side in the feedback process. According to an embodiment, the user may interact with content realized in a VR environment. In this case, information related to the interaction may be delivered to the transmitting side or a service provider in the feedback process. In an embodiment, the feedback process may be skipped.

The head orientation information may refer to information about the position, angle and motion of a user's head. Based on this information, information about a region currently viewed by the user in the 360 video, that is, viewport information may be calculated.

The viewport information may be information about a region currently viewed by a user in the 360 video. Gaze analysis may be performed using this information to check how the user consumes 360 video and how long the user gazes at a region of the 360 video. The gaze analysis may be performed at the receiving side and a result of the analysis may be delivered to the transmitting side on a feedback channel. A device such as a VR display may extract a viewport region based on the position/orientation of the user's head, vertical or horizontal Field of View (FOY) information supported by the device, and the like.

According to an embodiment, the aforementioned feedback information may be consumed on the receiving side as well as being delivered to the transmitting side. That is, decoding, re-projection and rendering processes of the receiving side may be performed using the aforementioned feedback information. For example, only 360 video corresponding to the region currently viewed by the user may be preferentially decoded and rendered using the head orientation information and/or the viewport information.

Here, the viewport or the viewport region may refer to a region of 360 video currently viewed by the user. A viewpoint may be a point which is viewed by the user in a 360 video and may represent a center point of the viewport region. That is, a viewport is a region centered on a viewpoint, and the size and shape of the region may be determined by FOV, which will be described later.

In the above-described architecture for providing 360 video, image/video data which is subjected to a series of capture/projection/encoding/transmission/decoding/re-projection/rendering processes may be called 360 video data. The term "360 video data" may be used as a concept including metadata or signaling information related to such image/video data.

To store and transmit media data such as the audio or video data described above, a standardized media file format may be defined. According to an embodiment, a media file may have a file format based on ISO base media file format (ISOBMFF).

Figure 2:
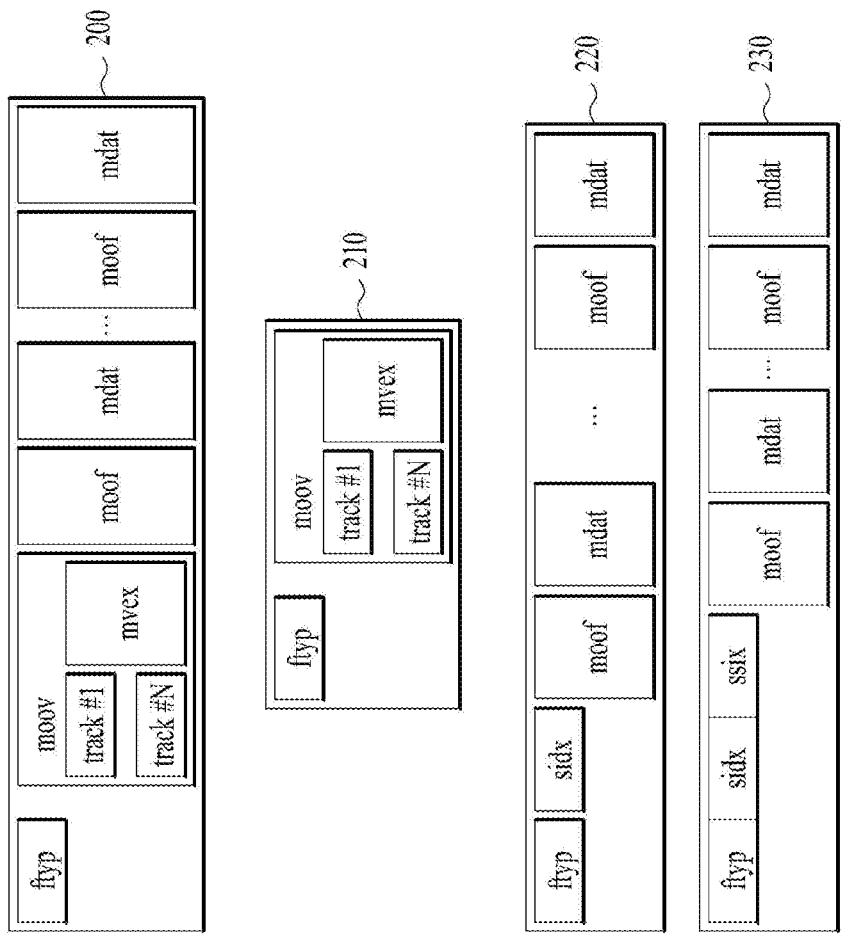
FIGS. 2 and 3 illustrate a structure of a media file according to an embodiment of the present disclosure.
Figure 3:
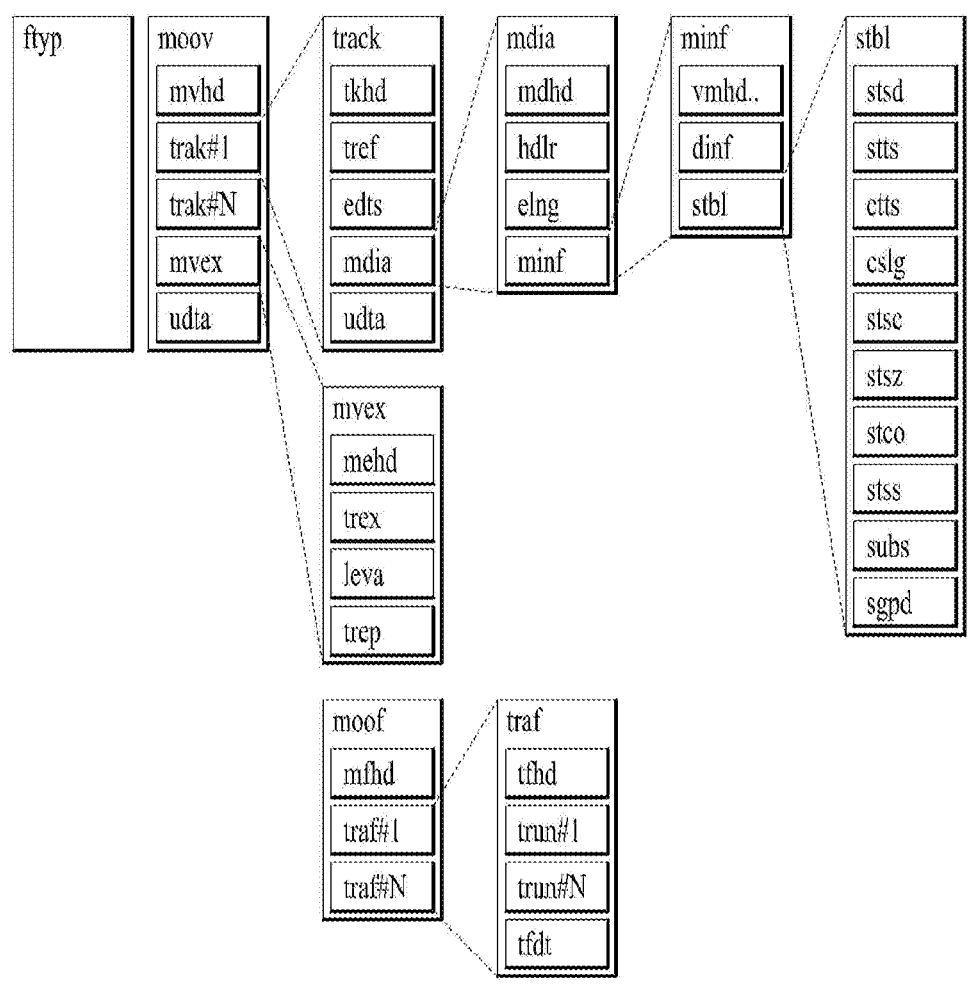

FIGS. 2 and 3 illustrate a structure of a media file according to an embodiment of the present disclosure.

A media file according to the present disclosure may include at least one box. Here, the box may be a data block or an object containing media data or metadata related to the media data. The boxes may be arranged in a hierarchical structure. Thus, the data may be classified according to the boxes and the media file may take a form suitable for storage and/or transmission of large media data. In addition, the media file may have a structure which facilitates access to media information as in the case where the user moves to a specific point in the media content.

The media file according to according to the present disclosure may include an ftyp box, a moov box and/or an mdat box.

The ftyp box (file type box) may provide information related to a file type or compatibility of a media file. The ftyp box may include configuration version information about the media data of the media file. A decoder may identify the media file with reference to the ftyp box.

The moov box (movie box) may include metadata about the media data of the media file. The moov box may serve as a container for all metadata. The moov box may be a box at the highest level among the metadata related boxes. According to an embodiment, only one moov box may be present in the media file.

The mdat box (media data box) may a box that actually contains the media data of the media file. The media data may contain audio samples and/or video samples and the mdat box may serve as a container to contain such media samples.

According to an embodiment, the moov box may include an mvhd box, a trak box and/or an mvex box as sub-boxes.

The mvhd box (movie header box) may contain media presentation related information about the media data included in the media file. That is, the mvhd box may contain information such as a media generation time, change time, time standard and period of the media presentation.

The trak box (track box) may provide information related to a track of the media data. The trak box may contain information such as stream related information about an audio track or a video track, presentation related information, and access related information. Multiple trak boxes may be provided depending on the number of tracks.

According to an embodiment, the trak box may include a tkhd box (track header box) as a sub-box. The tkhd box may contain information about a track indicated by the trak box. The tkhd box may contain information such as a generation time, change time and track identifier of the track.

The mvex box (movie extend box) may indicate that the media file may include a moof box, which will be described later. The moov boxes may need to be scanned to recognize all media samples of a specific track.

The media file according to the present disclosure may be divided into multiple fragments (200). Accordingly, the media file may be segmented and stored or transmitted. The media data (mdat box) of the media file may be divided into multiple fragments and each of the fragments may include a moof box and a divided mdat box. According to an embodiment, the information about the ftyp box and/or the moov box may be needed to use the fragments.

The moof box (movie fragment box) may provide metadata about the media data of a corresponding fragment. The moof box may be a box at the highest layer among the boxes related to the metadata of the corresponding fragment.

The mdat box (media data box) may contain actual media data as described above. The mdat box may contain media samples of the media data corresponding to each fragment.

According to an embodiment, the above-described moof box may include an mfhd box and/or a traf box as sub-boxes.

The mfhd box (movie fragment header box) may contain information related to correlation of multiple divided fragments. The mfhd box may include a sequence number to indicate the sequential position of the media data of the corresponding fragment among the divided data. In addition, it may be checked whether there is missing data among the divided data, based on the mfhd box.

The traf box (track fragment box) may contain information about a corresponding track fragment. The traf box may provide metadata about a divided track fragment included in the fragment. The traf box may provide metadata for decoding/reproducing media samples in the track fragment. Multiple traf boxes may be provided depending on the number of track fragments.

According to an embodiment, the traf box described above may include a tfhd box and/or a trun box as sub-boxes.

The tfhd box (track fragment header box) may contain header information about the corresponding track fragment. The tfhd box may provide information such as a default sample size, period, offset and identifier for the media samples of the track fragment indicated by the traf box.

The trun box (track fragment run box) may contain information related to the corresponding track fragment. The trun box may contain information such as a period, size and reproduction timing of each media sample.

The media file or the fragments of the media file may be processed into segments and transmitted. The segments may include an initialization segment and/or a media segment.

The file of the illustrated embodiment 210 may be a file containing information related to initialization of the media decoder except the media data. This file may correspond to the above-described initialization segment. The initialization segment may include the ftyp box and/or the moov box described above.

The file of the illustrated embodiment 220 may be a file including the above-described fragments. For example, this file may correspond to the above-described media segment. The media segment may include the moof box and/or the mdat box described above. The media segment may further include an styp box and/or an sidx box.

The styp box (segment type box) may provide information for identifying media data of a divided fragment. The styp box may perform the same function as the above-described ftyp box for a divided fragment. According to an embodiment, the styp box may have the same format as the ftyp box.

The sidx box (segment index box) may provide information indicating an index for a divided fragment. Accordingly, the sequential position of the divided fragment may be indicated.

An ssix box may be further provided according to an embodiment 230. When a segment is further divided into sub-segments, the ssix box (sub-segment index box) may provide information indicating indexes of the sub-segments.

The boxes in a media file may further contain extended information about the basis of a box as shown in an embodiment 250 or a FullBox. In this embodiment, the size field, largesize, may indicate the length of a corresponding box in bytes. The version field may indicate the version of a corresponding box format. The Type field may indicate the type or identifier of the box. The flags field may indicate a flag related to the box.

Figure 4:
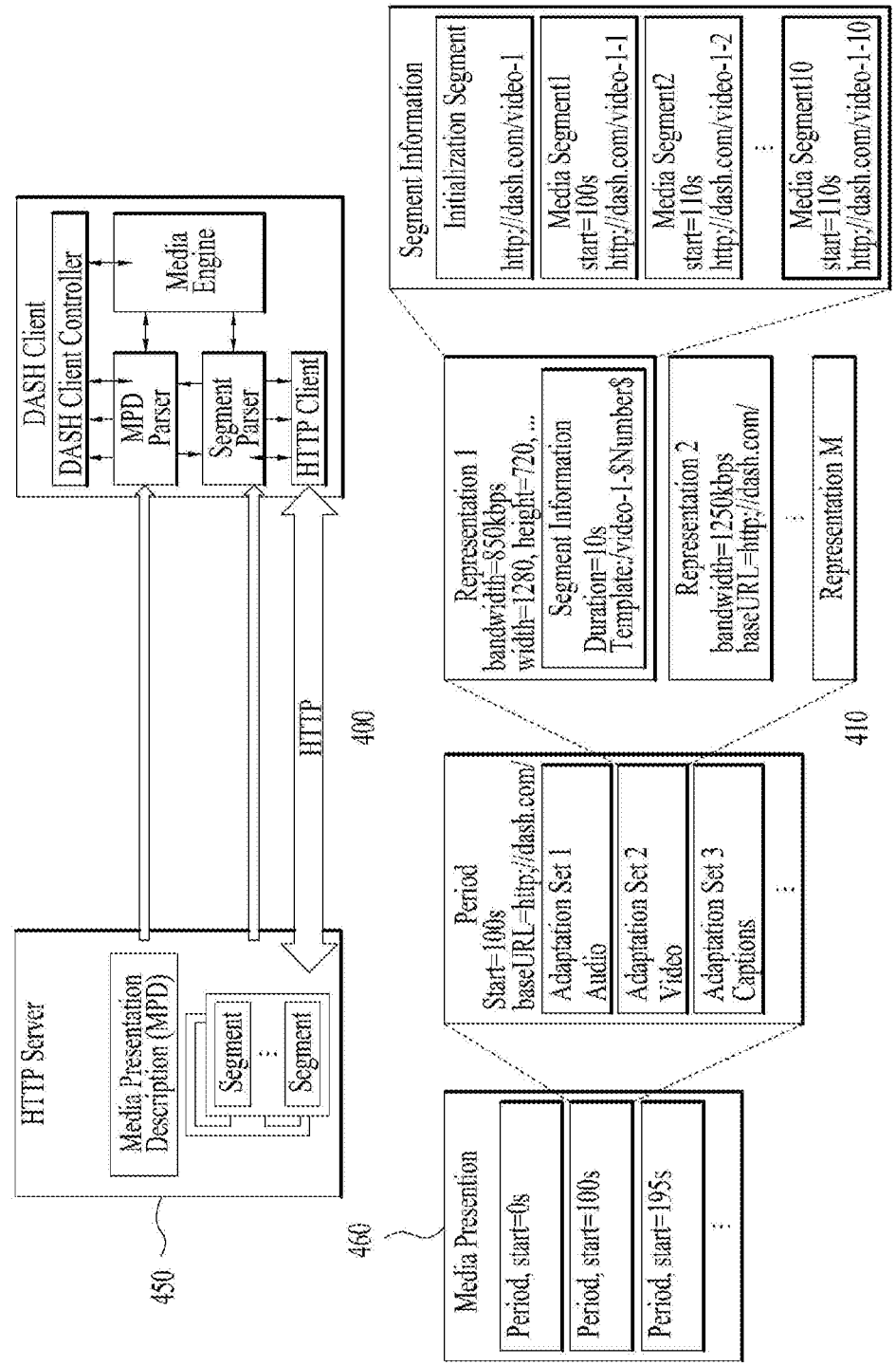
FIG. 4 illustrates an example of the overall operation of a DASH-based adaptive streaming model.

FIG. 4 illustrates an example of the overall operation of a DASH-based adaptive streaming model. A DASH-based adaptive streaming model according to an embodiment 400 shown in the figure describes operations between an HTTP server and a DASH client. Here, DASH (dynamic adaptive streaming over HTTP) is a protocol for supporting HTTP-based adaptive streaming and may dynamically support streaming depending on the network condition. Accordingly, AV content may be seamlessly played.

Initially, the DASH client may acquire an MPD. The MPD may be delivered from a service provider such as the HTTP server. The DASH client may make a request to the server for segments described in the MPD, based on the information for accessing the segments. The request may be made based on the network condition.

The DASH client may acquire the segments, process the segments through a media engine and display the processed segments on a screen. The DASH client may request and acquire necessary segments by reflecting the playback time and/or the network condition in real time (Adaptive Streaming) Accordingly, content may be seamlessly played.

The MPD (media presentation description) is a file containing detailed information allowing the DASH client to dynamically acquire segments, and may be represented in an XML format.

A DASH client controller may generate a command for requesting the MPD and/or segments considering the network condition. In addition, the DASH client controller may control an internal block such as the media engine to use the acquired information.

An MPD parser may parse the acquired MPD in real time. Accordingly, the DASH client controller may generate a command for acquiring necessary segments.

A segment parser may parse the acquired segment in real time. Internal blocks such as the media engine may perform a specific operation according to the information contained in the segment.

The HTTP client may make a request to the HTTP server for a necessary MPD and/or segments. In addition, the HTTP client may deliver the MPD and/or segments acquired from the server to the MPD parser or the segment parser.

The media engine may display content on the screen based on the media data included in the segments. In this operation, the information about the MPD may be used.

The DASH data model may have a hierarchical structure 410. Media presentation may be described by the MPD. The MPD may describe a time sequence of multiple periods for the media presentation. A period may represent one section of media content.

In one period, data may be included in adaptation sets. An adaptation set may be a set of multiple media content components which may be exchanged. An adaption may include a set of representations. A representation may correspond to a media content component. In one representation, content may be temporally divided into multiple segments, which may be intended for appropriate accessibility and delivery. To access each segment, URL of each segment may be provided.

The MPD may provide information related to media presentation. A period element, an adaptation set element, and a representation element may describe a corresponding period, a corresponding adaptation set, and a corresponding representation, respectively. A representation may be divided into sub-representations. A sub-representation element may describe a corresponding sub-representation.

Here, common attributes/elements may be defined. The common attributes/elements may be applied to (included in) sub-representations. The common attributes/elements may include EssentialProperty and/or SupplementalProperty.

The EssentialProperty may be information including elements regarded as essential elements in processing the corresponding media presentation related data. The SupplementalProperty may be information including elements which may be used in processing the corresponding media presentation related data. In an embodiment, descriptors which will be described later may be defined in the EssentialProperty and/or the SupplementalProperty when delivered through an MPD.

Figure 5:
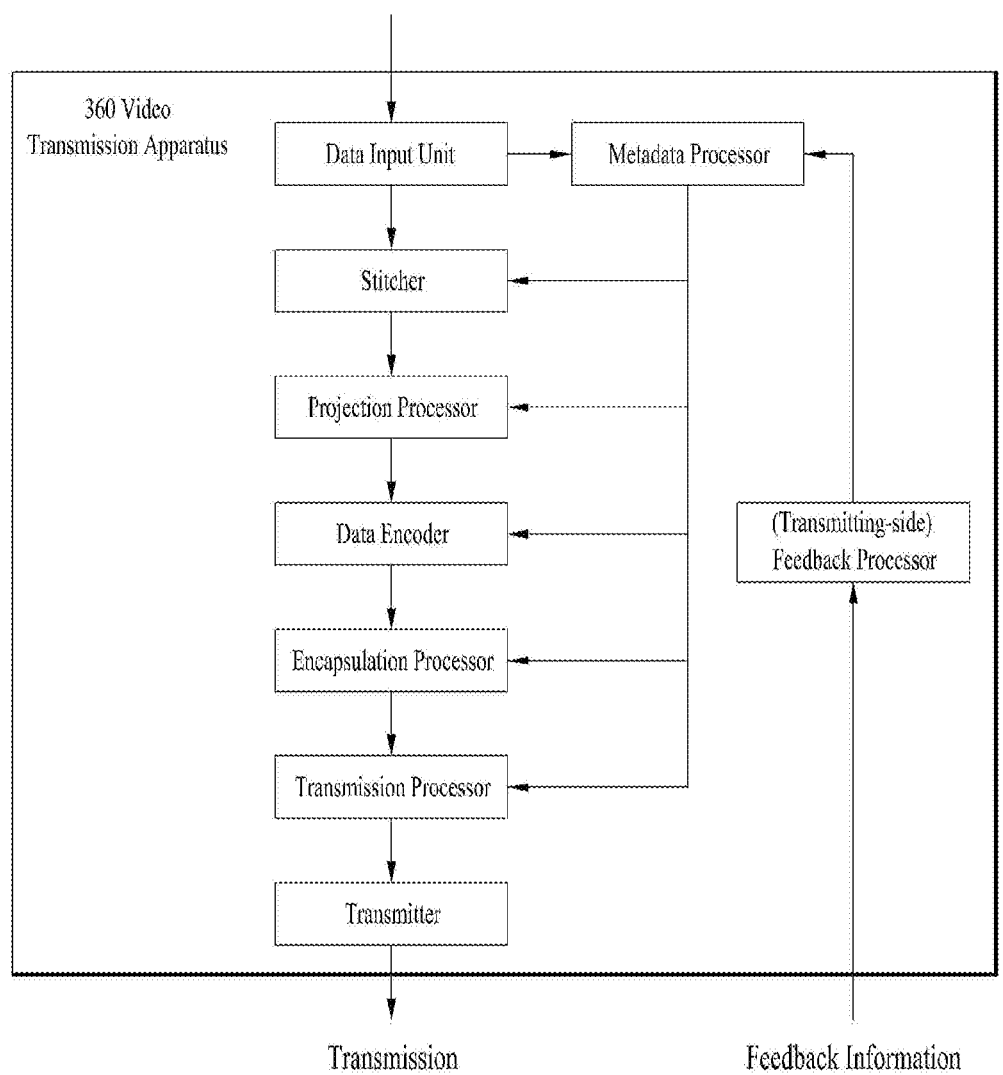
FIG. 5 is a diagram schematically illustrating a configuration of a 360 video transmission apparatus to which the present disclosure is applicable.

FIG. 5 is a diagram schematically illustrating a configuration of a 360 video transmission apparatus to which the present disclosure is applicable.

The 360 video transmission apparatus according to the present disclosure may perform operations related to the preparation process or transmission process described above. The 360 video transmission apparatus may include a data input unit, a stitcher, a projection processor, a region-wise packing processor (not shown), a metadata processor, a (transmitting-side) feedback processor, a data encoder, an encapsulation processor, a transmission processor, and/or a transmitter as internal/external elements.

The data input unit may receive images/videos for each captured viewpoint. These viewpoint-specific images/videos may be images/videos captured by one or more cameras. The data input unit may also receive metadata generated during the capture process. The data input unit may deliver the input images/videos for each viewpoint to the stitcher, and deliver the metadata of the capture process to the signaling processor.

The stitcher may perform stitching on the captured images/videos for each viewpoint. The stitcher may deliver the stitched 360 video data to the projection processor. When necessary, the stitcher may receive necessary metadata from the metadata processor and use the same for stitching. The stitcher may deliver metadata generated in the stitching process to the metadata processor. The metadata of the stitching process may contain information such as an indication of whether stitching has been performed and a stitching type.

The projection processor may project the stitched 360 video data onto a 2D image. The projection processor may perform projection according to various schemes, which will be described later. The projection processor may perform mapping in consideration of a corresponding depth of 360 video data for each viewpoint. When necessary, the projection processor may receive metadata necessary for projection from the metadata processor and use the same in the projection operation. The projection processor may deliver the metadata generated in the projection process to the metadata processor. The metadata of the projection processor may include a type of a projection scheme.

The region-wise packing processor (not shown) may perform the above-described region-wise packing process. That is, the region-wise packing processor may perform processing such as dividing the projected 360 video data into regions, rotating or rearranging each region, or changing the resolution of each region. As described above, the region-wise packing process is optional. When region-wise packing is skipped, the region-wise packing processor may be omitted. When necessary, the region-wise packing processor may receive metadata necessary for region-wise packing from the metadata processor and use the same in the region-wise packing operation. The region-wise packing processor may deliver the metadata generated in the region-wise packing process to the metadata processor. The metadata of the region-wise packing processor may include a rotation degree and size of each region.

According to an embodiment, the stitcher, the projection processor and/or the region-wise packing processor described above may be implemented by one hardware component.

The metadata processor may process metadata that may be generated in the capture process, stitching process, projection process, region-wise packing process, encoding process, encapsulation process, and/or transmission process. Using the metadata, the metadata processor may generate 360 video-related metadata. According to an embodiment, the metadata processor may generate 360 video-related metadata in the form of a signaling table. Depending on the signaling context, the 360 video-related metadata may be referred to as metadata or 360 video-related signaling information. The metadata processor may also deliver the acquired or generated metadata to internal elements of the 360 video transmission apparatus, as necessary. The metadata processor may transmit the 360 video-related metadata to the data encoder, the encapsulation processor and/or the transmission processor such that the metadata may be transmitted to the receiving side.

The data encoder may encode 360 video data projected onto a 2D image and/or 360 video data packed region-wise. The 360 video data may be encoded in various formats.

The encapsulation processor may encapsulate the encoded 360 video data and/or the 360 video-related metadata in the form of a file. Here, the 360 video-related metadata may be received from the metadata processor described above. The encapsulation processor may encapsulate the data in a file format such as ISOBMFF, or CFF, or process the data into DASH segments or the like. According to an embodiment, the encapsulation processor may include the 360 video-related metadata in a file format. The 360-related metadata may be included, for example, in various levels of boxes in the ISOBMFF, or included as data in separate tracks in the file. According to an embodiment, the encapsulation processor may encapsulate the 360 video-related metadata into a file. The transmission processor may process the encapsulated 360 video data according to the file format so as to be transmitted. The transmission processor may process the 360 video data according to any transport protocol. The processing for transmission may include processing for delivery over a broadcasting network, and processing for delivery over a broadband. According to an embodiment, the transmission processor may receive not only the 360 video data, but also the 360 video-related metadata from the metadata processor, and may process the same so as to be transmitted.

The transmitter may transmit, over a broadcasting network and/or a broadband, the 360 video data and/or 360 video-related metadata processed for transmission. The transmitter may include an element for transmission over a broadcasting network and/or an element for transmission over a broadband.

According to an embodiment, the 360 video transmission apparatus may further include a data storage unit (not shown) as an internal/external element. The data storage unit may store the encoded 360 video data and/or 360 video-related metadata before transmitting the same to the transmission processor. These data may be stored in a file format such as ISOBMFF. When a 360 video is transmitted in real time, the data storage unit may not be needed. However, when the video is transmitted on-demand, in NRT (Non Real Time), or over a broadband. The encapsulated 360 data may be stored in the data storage unit for a certain period of time and then transmitted.

According to another embodiment, the 360 video transmission apparatus may further include a (transmitting-side) feedback processor and/or a network interface (not shown) as internal/external elements. The network interface may receive feedback information from the 360 video reception apparatus according to the present disclosure, and deliver the same to the transmitting-side feedback processor. The transmitting-side feedback processor may deliver the feedback information to the stitcher, the projection processor, the region-wise packing processor, the data encoder, the encapsulation processor, the metadata processor, and/or the transmission processor. According to an embodiment, after the feedback information is delivered to the metadata processor, it may in turn be delivered to each internal element. The internal elements that receive the feedback information may reflect the feedback information in subsequent processing of the 360 video data.

According to another embodiment of the 360 video transmission apparatus of the present disclosure, the region-wise packing processor may rotate each region and map the same onto a 2D image. In this operation, the respective regions may be rotated at different angles in different directions, and then mapped onto the 2D image. The rotation of the regions may be performed in consideration of a portion that neighbored the 360 video data on the spherical surface or was stitched before projection. Information about the rotation of the regions, that is, the rotation directions, angles, and the like, may be signaled by 360 video-related metadata. According to another embodiment of the 360 video transmission apparatus of the present disclosure, the data encoder may perform encoding differently for each region. The data encoder may encode a specific region with high quality and other regions with low quality. The transmitting-side feedback processor may deliver the feedback information received from the 360 video reception apparatus to the data encoder, such that the data encoder uses a differentiated encoding method for each region. For example, the transmitting-side feedback processor may deliver the viewport information received from the receiving side to the data encoder. The data encoder may encode regions including an area indicated by the viewport information with higher quality (UHD, etc.) than the other regions.

According to another embodiment of the 360 video transmission apparatus of the present disclosure, the transmission processor may perform processing for transmission differently for each region. The transmission processor may apply different transmission parameters (modulation order, code rate, etc.) for the respective regions, such that the data transmitted for each region may have different robustness.

Then, the transmitting-side feedback processor may deliver the feedback information received from the 360 video reception apparatus to the transmission processor, such that the transmission process performs the differentiated transmission processing for each region. For example, the transmitting-side feedback processor may deliver viewport information received from the receiving side to the transmission processor. The transmission processor may perform processing for transmission on regions including an area indicated by the viewport information, such that the regions may have higher robustness than the other regions.

The internal/external elements of the 360 video transmission apparatus of the present disclosure described above may be hardware elements implemented in hardware. According to an embodiment, the internal/external elements may be changed, omitted, or replaced with other elements. According to an embodiment, supplemental elements may be added to the 360 video transmission apparatus.

Figure 6:
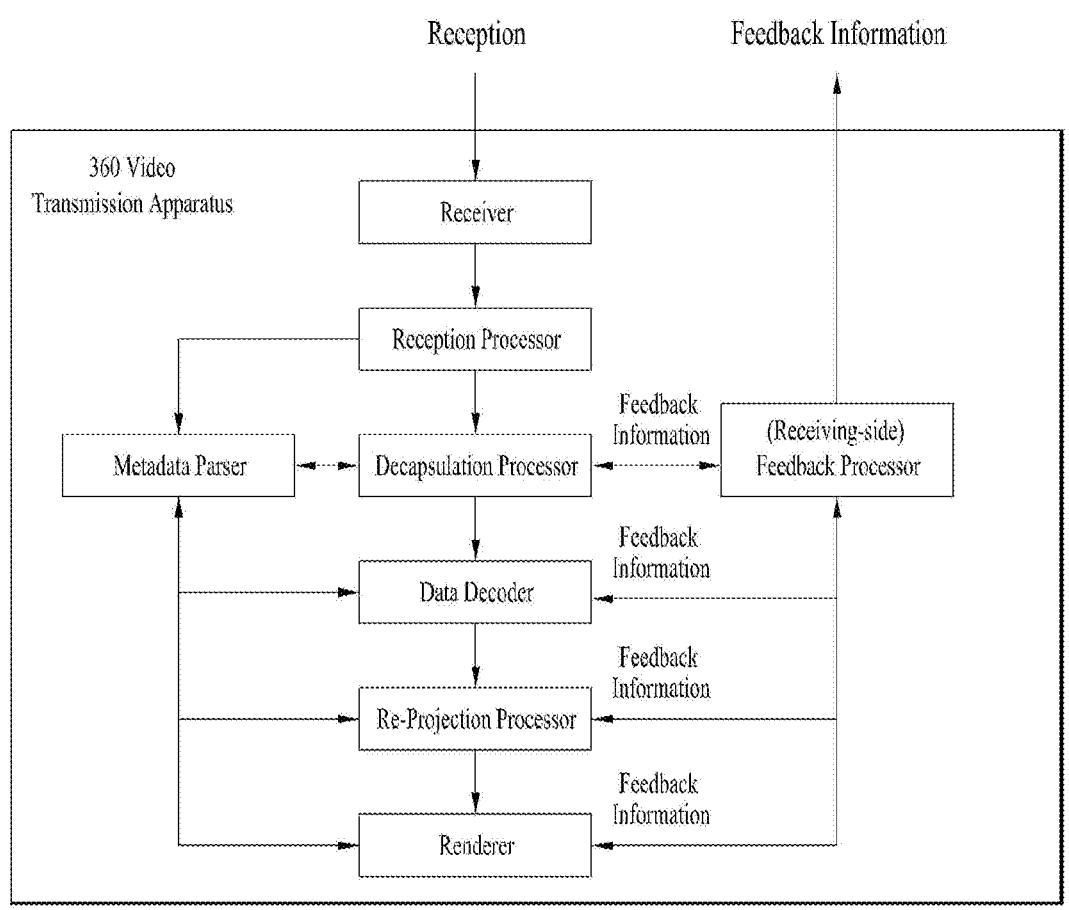
FIG. 6 is a diagram schematically illustrating a configuration of a 360 video reception apparatus to which the present disclosure is applicable.

FIG. 6 is a diagram schematically illustrating a configuration of a 360 video reception apparatus to which the present disclosure is applicable.

The 360 video reception apparatus according to the present disclosure may perform operations related to the processing process and/or the rendering process described above. The 360 video reception apparatus may include a receiver, a reception processor, a decapsulation processor, a data decoder, a metadata parser, a (receiving-side) feedback processor, a re-projection processor, and/or a renderer as internal/external elements. A signaling parser may be referred to as a metadata parser.

The receiver may receive 360 video data transmitted by the 360 video transmission apparatus according to the present disclosure. Depending on the transmission channel, the receiver may receive 360 video data over a broadcasting network or a broadband.

The reception processor may process the received 360 video data according to a transport protocol. The reception processor may perform the reverse of the process of the above-described transmission processor such that the reverse process corresponds to the processing for transmission on the transmitting side. The reception processor may deliver the acquired 360 video data to the decapsulation processor, and deliver the acquired 360 video-related metadata to the metadata parser. The 360 video-related metadata acquired by the reception processor may be in the form of a signaling table.

The decapsulation processor may decapsulate the 360 video data received in the form of a file from the reception processor. The decapsulation processor may decapsulate the files according to ISOBMFF or the like to acquire the 360 video data or 360 video-related metadata. The acquired 360 video data may be delivered to the data decoder, and the acquired 360 video-related metadata may be delivered to the metadata parser. The 360 video-related metadata acquired by the decapsulation processor may be in the form of a box or track in the file format. When necessary, the decapsulation processor may receive metadata needed for decapsulation from the metadata parser.

The data decoder may decode the 360 video data. The data decoder may receive metadata needed for decoding from the metadata parser. The 360 video-related metadata acquired in the data decoding process may be delivered to the metadata parser.

The metadata parser may parse/decode the 360 video-related metadata. The metadata parser may deliver the acquired metadata to the data decapsulation processor, the data decoder, the re-projection processor, and/or the renderer.

The re-projection processor may re-project the decoded 360 video data. The re-projection processor may re-project the 360 video data onto a 3D space. The shape of the 3D space may depend on the employed 3D model. The re-projection processor may receive metadata needed for re-projection from the metadata parser. For example, the re-projection processor may receive information about the type of the employed 3D model and the corresponding detailed information from the metadata parser. According to an embodiment, the re-projection processor may re-project only 360 video data corresponding to a specific area in the 3D space onto the 3D space using the metadata needed for re-projection.

The renderer may render the re-projected 360 degree video data. As described above, the 360 video data may be rendered in the 3D space. In the case where the two processes occur at once as described above, the re-projection processor and the renderer may be integrated, and the processes may all be performed by the renderer. According to an embodiment, the renderer may render only a part that the user is viewing according to the viewing position information about the user.

The user may view some areas of the rendered 360 video through a VR display or the like. The VR display is a device that plays back the 360 video, and may be included in the 360 video reception apparatus (in a tethered state) or connected to the 360 video reception apparatus as a separate device (in an un-tethered state).

According to an embodiment of the present disclosure, the 360 video reception apparatus may further include a (receiving-side) feedback processor and/or a network interface (not shown) as internal/external elements. The receiving-side feedback processor may acquire feedback information from the renderer, the re-projection processor, the data decoder, the decapsulation processor, and/or the VR display, and process the same. The feedback information may include viewport information, head orientation information, and gaze information. The network interface may receive the feedback information from the receiving-side feedback processor and transmit the same to the 360 video transmission apparatus.

As described above, the feedback information may not only be delivered to the transmitting side, but also be consumed at the receiving side. The receiving-side feedback processor may deliver the acquired feedback information to internal elements of the 360 video reception apparatus such that the information may be reflected in processes such as rendering. The receiving-side feedback processor may deliver the feedback information to the renderer, the re-projection processor, the data decoder and/or the decapsulation processor. For example, the renderer may preferentially render an area viewed by a user based on the feedback information. The decapsulation processor and the data decoder may preferentially decapsulate and decode the area that is being viewed or to be viewed by the user.

The internal/external elements of the 360 video reception apparatus according to the present disclosure described above may be hardware elements implemented in hardware. According to an embodiment, the internal/external elements may be changed, omitted, or replaced with other elements. According to an embodiment, supplemental elements may be added to the 360 video reception apparatus.

Another aspect of the present disclosure may relate to a method of transmitting 360 video and a method of receiving 360 video. The methods of transmitting/receiving a 360 video according to the present disclosure may be implemented by the 360 video transmission/reception apparatuses according to the present disclosure described above or by the embodiments of the apparatuses.

The embodiments of the 360 video transmission/reception apparatuses, the transmission/reception methods, and the internal/external elements thereof according to the present disclosure described above may be combined with each other. For example, the embodiments of the projection processor and the embodiments of the data encoder may be combined with each other to configure as many embodiments of the 360 video transmission apparatus as the combinations. The embodiments configured through such combinations are also within the scope of the present disclosure.

Figure 7:
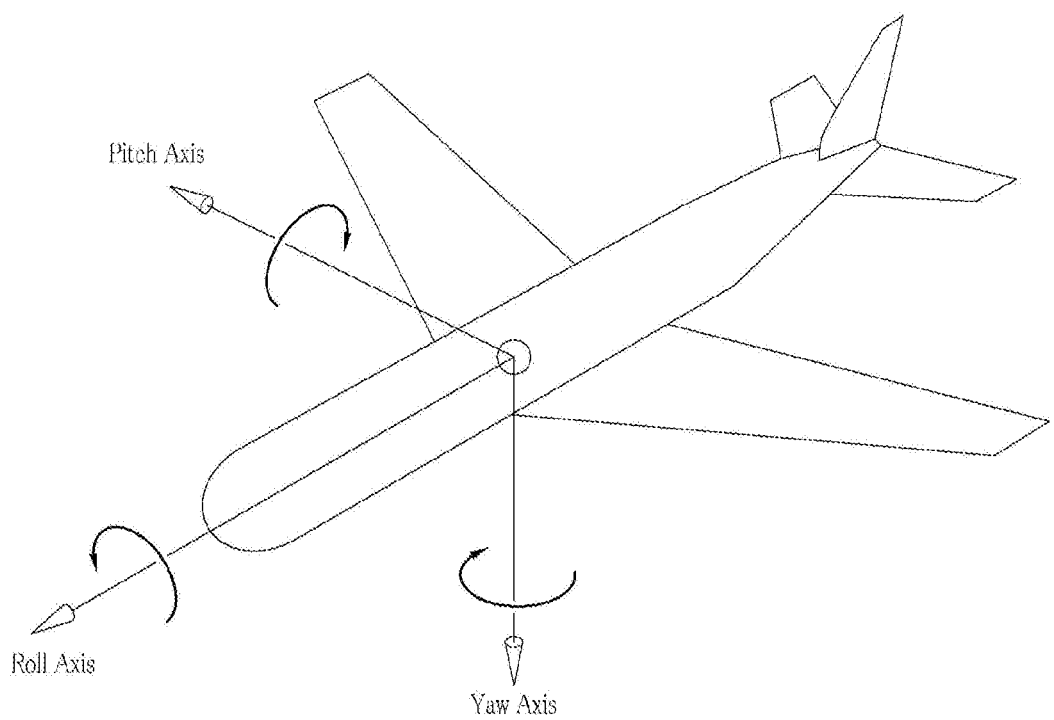
FIG. 7 is a diagram illustrating the concept of aircraft principal axes for describing a 3D space according to the present disclosure.

FIG. 7 is a diagram illustrating the concept of aircraft principal axes for describing a 3D space according to the present disclosure. In the present disclosure, the concept of aircraft principal axes may be used to express a specific point, position, direction, spacing, area, and the like in a 3D space. That is, in the present disclosure, the concept of 3D space given before or after projection may be described, and the concept of aircraft principal axes may be used to perform signaling thereon. According to an embodiment, a method based on the concept of X, Y, and Z axes or a spherical coordinate system may be used.

An aircraft may rotate freely in three dimensions. The three-dimensional axes are called a pitch axis, a yaw axis, and a roll axis, respectively. In this specification, these axes may be simply expressed as pitch, yaw, and roll or as a pitch direction, a yaw direction, a roll direction.

The pitch axis may refer to an axis around which the front nose of the aircraft rotates upward/downward. In the illustrated concept of aircraft principal axes, the pitch axis may refer to an axis extending from one wing to the other wing of the aircraft.

The yaw axis may refer to a reference axis around which the front nose of the aircraft rotates leftward/rightward. In the illustrated concept of aircraft principal axes, the yaw axis may refer to an axis extending from the top to the bottom of the aircraft. The roll axis may be an axis extending from the front nose to the tail of the aircraft in the concept of aircraft principal axes, and rotation in the roll direction may refer to rotation about the roll axis. As described above, the 3D space in the present disclosure may be described based on the concept of pitch, yaw, and roll.

As described above, the video data projected on a 2D image may be subjected to the region-wise packing process in order to increase video coding efficiency and the like. The region-wise packing process may refer to a process of dividing the video data projected onto the 2D image into regions and processing the same according to the regions. The regions may refer to regions obtained by dividing the 2D image onto which 360-degree video data is projected. The divided regions of the 2D image may be distinguished by projection schemes. Here, the 2D image may be called a video frame or a frame.

In this regard, the present disclosure proposes metadata for the region-wise packing process according to a projection scheme and a method of signaling the metadata. The region-wise packing process may be more efficiently performed based on the metadata.

Figure 8:
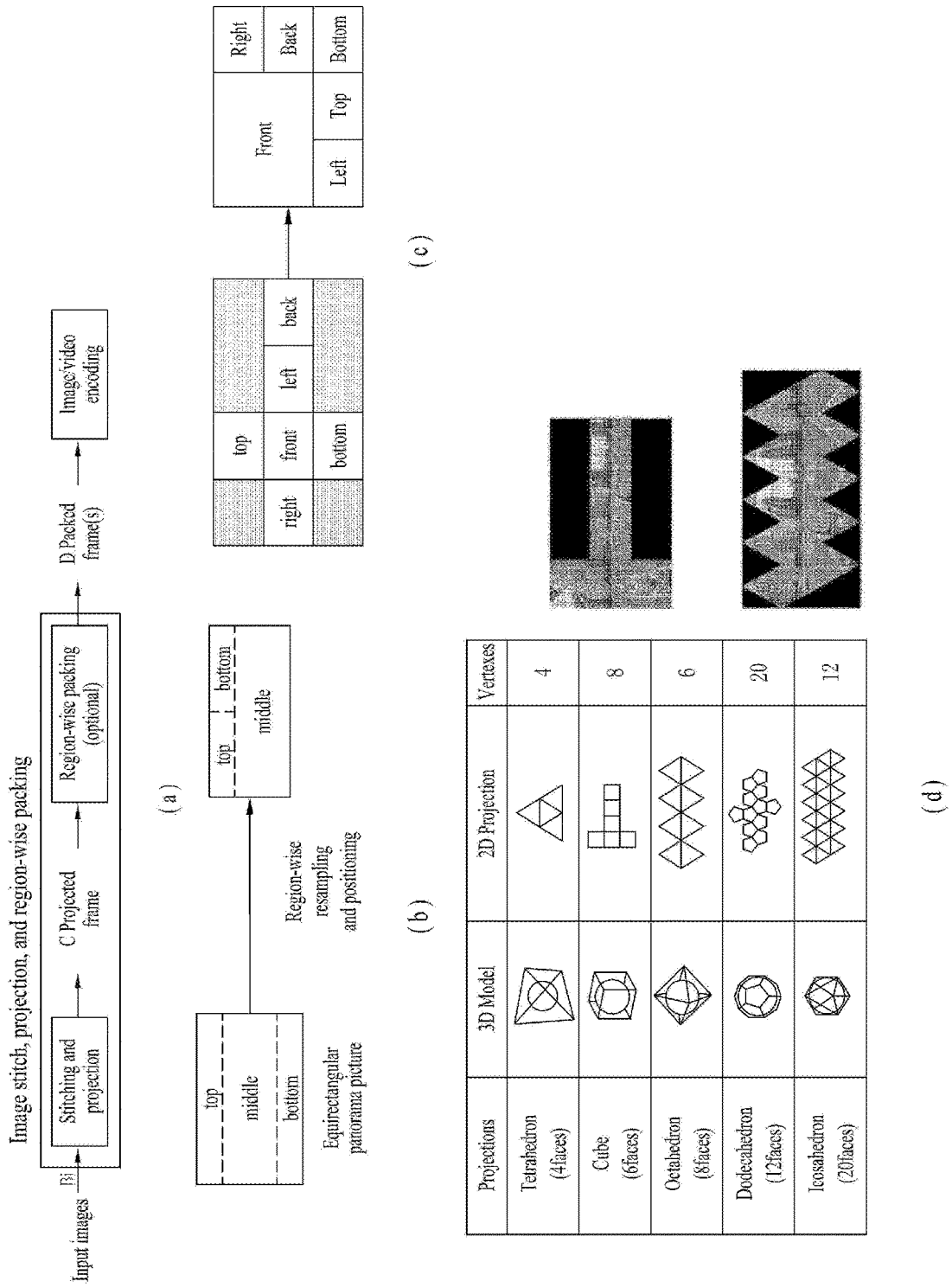
FIG. 8 exemplarily illustrates a 2D image to which a 360 video processing process and a projection format-based region-wise packing process are applied.

FIG. 8 exemplarily illustrates a 2D image to which a 360 video processing process and a projection format-based region-wise packing process are applied. FIG. 8(a) may illustrate a process of processing input 360-degree video data. Referring to FIG. 8(a), 360-degree video data of the input viewing position may be stitched and projected onto a 3D projection structure according to various projection schemes. The 360-degree video data projected onto the 3D projection structure may be represented as a 2D image. That is, the 360 video data may be stitched and projected into the 2D image. The 2D image into which the 360 video data is projected may be represented as a projected frame. In addition, the above-described may be performed on the projected frame. That is, processing such as dividing an area including the projected 360 video data on the projected frame into regions, rotating or rearranging each region, or changing the resolution of each region may be performed. In other words, the region-wise packing process may represent a process of mapping the projected frame to one or more packed frames. Performing the region-wise packing process may be optional. When the region-wise packing process is skipped, the packed frame may be identical to the projected frame. When the region-wise packing process is applied, each region of the projected frame may be mapped to a region of the packed frame, and metadata indicating the position, shape, and size of the region of the packed frame to which each region of the projected frame is mapped may be derived.

FIGS. 8(b) and 8(c) may show examples in which each region of the projected frame is mapped to a region of the packed frame. Referring to FIG. 8(b), the 360 video data may be projected into a 2D image (or frame) according to a panoramic projection scheme. The top region, middle region, and bottom region of the projected frame may be subjected to a region-wise packing process and rearranged as shown on the right side of the figure. Here, the top region may represent the top surface of the panorama on a 2D image, the middle region may represent the middle surface of the panorama on the 2D image, and the bottom region may represent the bottom surface of the panorama on the 2D image.

Referring to FIG. 8(c), the 360 video data may be projected into a 2D image (or frame) according to a cubic projection scheme. The front region, the back region, the top region, the bottom region, the right region, and the left region of the projected frame may be subjected to the region-wise packing process and rearranged as shown on the right side of the figure. Here, the front region may represent the front face of the cube on the 2D image, and the back region may represent the back face of the cube on the 2D image. In addition, the top region may represent the top face of the cube on the 2D image, and the bottom region region may represent the bottom face of the cube on the 2D image. The right region may represent the right face of the cube on the 2D image, and the left region may represent the left face of the cube on the 2D image.

FIG. 8(d) may show various 3D projection formats in which the 360 video data may be projected. Referring to FIG. 8(d), the 3D projection formats may include tetrahedron, cube, octahedron, dodecahedron, and icosahedron. The 2D projections shown in FIG. 8(d) may represent projected frames representing 360 video data projected onto a 3D projection format as a 2D image.

According to the present disclosure, as the projection formats, for example, some or all of various projection formats (or projection schemes) disclosed below may be used. A projection format used for 360 video may be indicated through, for example, the projection format field of metadata.

FIGS. 9A and 9B exemplarily show projection formats according to the present disclosure.

FIG. 9A(a) may show an equilateral projection format. When the equilateral projection format is used, a point (r, $\theta_0$, 0) on the spherical surface, that is, a point with $\theta=\theta_0$ and $\varphi=0$, may be mapped to a center pixel of the 2D image. In addition, the principal point of the front camera may be assumed to be the point (r, 0, 0) on the spherical surface. Also, $\varphi_0$ may be fixed to $\varphi_0=0$. Accordingly, the value (x, y) obtained by transformation into the XY coordinate system may be transformed into a pixel (X, Y) on the 2D image by the following equation.

$$X=K_X*x+X_O=K_X*(\theta-\theta_0)*r+X_O$$

$$Y=-K_Y*y-Y_O \quad \text{Equation 1}$$

In addition, when the left top pixel of the 2D image is positioned at (0, 0) of the XY coordinate system, the offset value along the x-axis and the offset value along the y-axis may be given by the following equation.

$$X_O=K_x*\pi*r$$

$$Y_O=-K_y*\pi/2*r \quad \text{Equation 2}$$

Based on this equation, the equation for a transformation into to the XY coordinate system may be given as follows.

$$X=K_x x+X_O=K_x*(\pi+\theta-\theta_0)*r$$

$$Y=-K_y y-Y_O=K_y*(\pi/2-\varphi)*r \quad \text{Equation 3}$$

For example, when $\theta_0=0$, that is, when the center pixel of the 2D image indicates data with $\theta=0$ on a spherical surface, the spherical surface may be mapped to an area having a width=$2K_x\pi r$ and a height=$K_x\pi r$ in the 2D image with respect to (0,0). Data having $\varphi=\pi/2$ on the spherical surface may be mapped to the entire top side of the 2D image. In addition, data of (r, $\pi/2$, 0) on the spherical surface may be mapped to a point ($3\pi K_x r/2$, $\pi K_x r/2$) on the 2D image.

On the receiving side, 360 video data on the 2D image may be re-projected onto a spherical surface. The transformation question for this operation may be given as follows.

$$\theta=\theta_0+X/K_x*r-\pi$$

$$\varphi=\pi/2-Y/K_y*r \quad \text{Equation 4}$$

For example, on a 2D image, a pixel whose XY coordinate value is ($Kx\pi r$, 0) may be re-projected to a point where $\theta=\theta_0$ and $\varphi=\pi/2$ on a spherical surface.

FIG. 9A(b) may show a cubic projection format. For example, stitched 360 video data may be displayed on a spherical surface. The projection processor may divide the 360 video data in a cube shape to project the same onto a 2D image. The 360 video data on the spherical face may correspond to each face of the cube, and may be projected onto the 2D image as shown on the left or right side in FIG. 9A(b).

FIG. 9A(c) may show a cylindrical projection format. Assuming that the stitched 360 video data can be displayed on a spherical surface, the projection processor may divide the 360 video data in a cylinder shape and project the same onto a 2D image. The 360 video data on the spherical surface may correspond to the side, top, and bottom of the cylinder, respectively, and may be projected onto the 2D image as shown in the left or right side in FIG. 9A(c).

FIG. 9A(d) may show a tile-based projection format. When a tile-based projection scheme is used, the above-described projection processor may divide the 360 video data on the spherical surface into one or more detailed regions as shown in FIG. 9A(d) to project the same onto a 2D image. The detailed regions may be referred to as tiles.

FIG. 9B(e) may show a pyramid projection format. When it is assumed that the stitched 360 video data can be displayed on a spherical surface, the projection processor may consider the 360 video data to have a pyramid shape and divide the respective faces thereof to project the same onto a 2D image. The 360 video data on the spherical surface may correspond to the front side of the pyramid and the four sides (left top, left bottom, right top, right bottom) of the pyramid, respectively, and may be projected as shown on the left side or right side in FIG. 9(e). Here, the front may be an area including data acquired by a camera facing forward.

FIG. 9B(f) may show a panoramic projection format. When a panoramic projection format is used, the above-described projection processor may project, onto a 2D image, only a side surface of the 360 video data on a spherical surface, as shown in FIG. 9B(f). This may be the same as the case where the top and bottom are not present in the cylindrical projection scheme.

According to an embodiment of the present disclosure, projection may be performed without stitching. FIG. 9B(g) may show a case where projection is performed without stitching. When projection is performed without stitching, the above-described projection processor may project 360 video data onto a 2D image as shown in FIG. 9B(g). In this case, stitching may be skipped, and each image acquired by the camera may be projected directly onto the 2D image.

Referring to FIG. 9B(g), two images may be projected onto a 2D image without stitching. Each image may be a fish-eye image acquired through each sensor in a spherical camera (or a fish-eye camera). As described above, the receiving side may stitch the image data acquired from the camera sensors, and map the stitched image data onto a spherical surface to render a spherical video, that is, a 360 video.

Figure 10A:
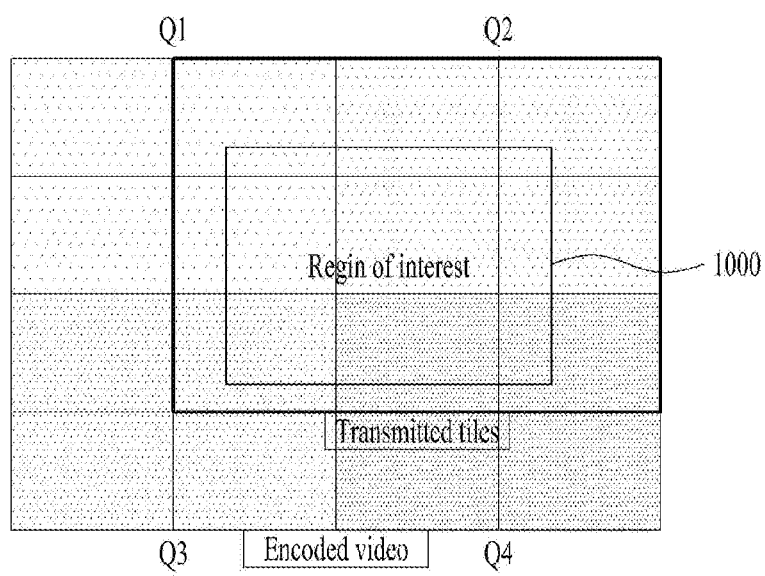
FIGS. 10A and 10B are diagrams illustrating tiles according to an embodiment of the present disclosure.
Figure 10B:
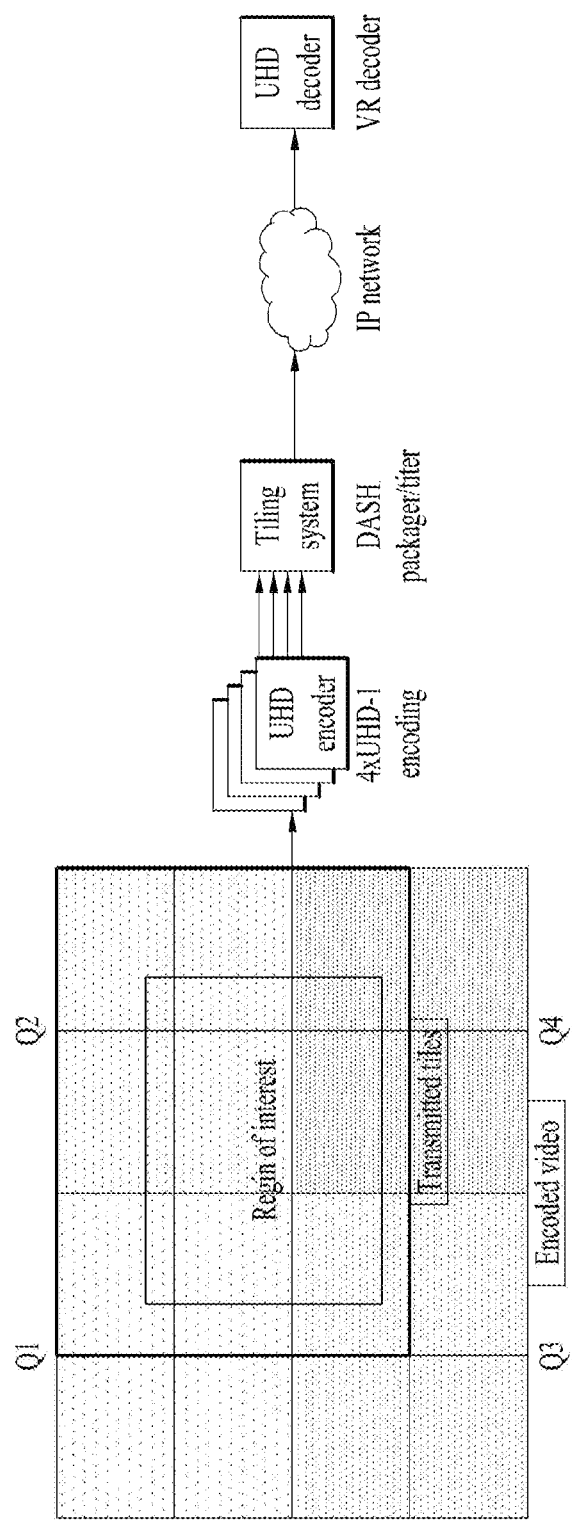

FIGS. 10A and 10B are diagrams illustrating tiles according to an embodiment of the present disclosure.

The 360 video data obtained after being projected onto a 2D image or and then subjected to region-wise packing may be divided into one or more tiles. FIG. 10A shows that one 2D image is divided into 16 tiles. Here, the 2D image may be the aforementioned projected frame or packed frame. According to another embodiment of the 360 video transmission apparatus of the present disclosure, the data encoder may independently encode each tile.

The region-wise packing and tiling described above be distinguished from each other. The region-wise packing may refer to dividing 360 video data projected onto a 2D image into regions and processing the regions to improve coding efficiency or to adjust resolution. The tiling may referred to an operation of the data decoder of dividing the projected frame or the packed frame into sections called tiles and independently encoding each tile. When 360 video is provided, the user does not consume all parts of the 360 video simultaneously. The tiling may make it possible to transmit or consume only tiles corresponding to an important part or a certain part, such as a viewport currently viewed by a user, to on the receiving side on a limited bandwidth. When tiling is performed, the limited bandwidth may be utilized more efficiently, and the receiving side may reduce the computational load compared to a case where all 360 video data are processed at once.

A region and a tile are distinguished from each other, and accordingly the region and the tile do not need to be the same. However, according to an embodiment, the region and the tile may refer to the same area. According to an embodiment, region-wise packing is performed according to a tile, and thus the region and the tile may be the same. According to an embodiment, when each face according to the projection scheme and a region are the same, each face according to the projection scheme, the region, and the tile may refer to the same area. Depending on the context, a region may be called a VR region, or a tiled may be called as a tile region.

A region of interest (ROI) may refer to an area of interest of users, as suggested by a 360 content provider. In producing a 360 video, the 360 content provider may create the 360 video, assuming that users will be interested in a certain area. According to an embodiment, the ROI may correspond to an area in which important content is played in the content of the 360 video.

According to another embodiment of the 360 video transmission/reception apparatus of the present disclosure, the receiving-side feedback processor may extract and collect viewport information and transmit the same to the transmitting-side feedback processor. In this process, viewport information may be transferred between both sides using both network interfaces. In the 2D image of FIG. 10A, a viewport 1000 is displayed. Here, the viewport may span 9 tiles on the 2D image.

In this case, the 360 video transmission apparatus may further include a tiling system. According to an embodiment, the tiling system may be arranged next to the data encoder (as shown in FIG. 10B), may be included in the above-described data encoder or transmission processor, or may be included in the 360 video transmission apparatus as a separate internal/external element.

The tiling system may receive viewport information from the feedback processor of the transmitting side. The tiling system may select and transmit only tiles including the viewport region. In the 2D image shown in FIG. 10A, only 9 tiles including the viewport region 1000 among the 16 tiles may be transmitted. Here, the tiling system may transmit the tiles over broadband in a unicast manner. This is because the viewport region varies among users.

In this case, the transmitting-side feedback processor may deliver the viewport information to the data encoder. The data encoder may encode the tiles including the viewport region with higher quality than the other tiles.

In this case, the transmitting-side feedback processor may deliver the viewport information to the metadata processor. The metadata processor may deliver metadata related to the viewport region to each internal element of the 360 video transmission apparatus, or may include the same in the 360 video-related metadata.

As the tiling operation is performed, the transmission bandwidth may be saved, and data processing/transmission may be performed efficiently by performing differentiated processing on each tile.

The above-described embodiments related to the viewport region may be applied to specific regions other than the viewport region in a similar manner. For example, a region that users are determined to be mainly interested in through the gaze analysis described above, the ROI, and a region that is played first when the user views 360 video through a VR display (initial viewpoint) may be processed in the same manner as the viewport region described above.

According to another embodiment of the 360 video transmission apparatus, the transmission processor may process each tile differently for transmission. The transmission processor may apply different transmission parameters (modulation order, code rate, etc.) for the respective tiles, such that the data delivered for each tile may have different robustness.

Then, the transmitting-side feedback processor may deliver the feedback information received from the 360 video reception apparatus to the transmission processor, such that the transmission processor performs differentiated processing on each tile for transmission. For example, the transmitting-side feedback processor may deliver viewport information received from the receiving side to the transmission processor. The transmission processor may perform processing for transmission on the tiles including the viewport region, such that the tiles may have higher robustness than the other tiles.

FIG. 11 shows an example of 360-degree video-related metadata according to an embodiment of the present disclosure. As described above, the 360-degree video-related metadata may include various metadata about 360-degree video. Depending on the context, the 360-degree video-related metadata may be referred to as 360-degree video related signaling information. The 360-degree video-related metadata may be transmitted in a separate signaling table, may be transmitted in a DASH MPD, or may be transmitted in the form of a box in a file format such as ISOBMFF. When the 360-degree video-related metadata is included in a box form, it may be included in various levels such as file, fragment, track, sample entry, and sample to include metadata for the data of the corresponding level.

According to an embodiment, a part of the metadata which will described later may be configured and delivered in a signaling table, and the other part thereof may be included in a file format in a box or track form.

According to an embodiment of the 360-degree video-related metadata of the present disclosure, the 360-degree video-related metadata may include default metadata related to a projection scheme, stereoscopic related metadata, and initial view/initial viewpoint-related metadata, ROI-related metadata, FOV (Field of View)-related metadata, and/or cropped region-related metadata. According to an embodiment, the 360-degree video-related metadata may further include supplemental metadata.

Embodiments of 360-degree video-related metadata according to the present disclosure may include at least one of the default metadata, the stereoscopic related metadata, the initial view/viewpoint-related metadata, the ROI-related metadata, the FOV-related metadata, the cropped region-related metadata, and/or metadata that may be added later. Embodiments of the 360-degree video-related metadata according to the present disclosure may be configured in various ways according to the number of cases of detailed metadata included in each embodiment. According to an embodiment, the 360-degree video-related metadata may further contain supplemental information in addition to the above-described information.

The stereo_mode field may indicate a 3D layout supported by the corresponding 360-degree video. Only this field may indicate whether the 360-degree video supports the 3D layout. In this case, the is_stereoscopic field described above may be omitted. When the value of this field is 0, the 360-degree video may be in the mono mode. That is, the projected 2D image may include only one mono view. In this case, the 360-degree video may not support the 3D layout.

When the value of this field is 1 or 2, the 360-degree video may conform to a left-right layout and a top-bottom layout, respectively. The left-right layout and the top-bottom layout may also be called a side-by-side format and a top-bottom format, respectively. In the left-right layout, 2D images onto which the left/right images are projected may be positioned on the left and right in the image frame, respectively. In the top-bottom layout, the 2D images onto which the left/right images are projected may be positioned at the top and bottom of the image frame, respectively. When the other values for the field may be reserved for future use.

The initial view-related metadata may include information about a view (initial viewpoint) of the user when the 360-degree video is initially played. The initial view-related metadata may include an initial_view_yaw_degree field, an initial_view_pitch_degree field, and/or an initial_view_roll_degree field. According to an embodiment, the initial view-related metadata may further include supplemental information.

The initial_view_yaw_degree field, the initial_view_pitch_degree field, and the initial_view_roll_degree field may indicate an initial view in playing back a corresponding 360-degree video. That is, the center point of the viewport that is initially displayed in playback may be indicated by these three fields. Specifically, the initial_view_yaw_degree field may indicate a yaw value for the initial view. That is, the initial_view_yaw_degree field may indicate the direction (sign) and degree (angle) of rotation of the position of the center point about the yaw axis. The initial_view_pitch_degree field may indicate a pitch value for the initial view. That is, the initial_view_pitch_degree field may indicate the direction (sign) and degree (angle) of rotation of the position of the center point about the pitch axis. The initial_view_roll_degree field may indicate a roll value for the initial view. That is, the initial_view_roll_degree field may indicate the direction (sign) and degree (angle) of rotation of the position of the center point about the roll axis. Based on the initial_view_yaw_degree field, the initial_view_pitch_degree field, and the initial_view_roll_degree field, an initial view in playing back a 360-degree video, that is, a center point of a viewport initially displayed in playback may be indicated. Thereby, a specific region of the 360-degree video may be displayed and provided to the user at the initial viewpoint. In addition, based on the field of view (FOV), the width and height of the initial viewport with respect to the indicated initial view may be determined. That is, using these three fields and the FOV information, the 360-degree video reception apparatus may provide the user with a certain region of the 360-degree video as an initial viewport.

According to an embodiment, the initial view indicated by the initial view-related metadata may vary among scenes. That is, the scene of the 360-degree video changes according to the temporal flow of the 360 content, and the initial view or initial viewport that the user sees first may vary among the scenes of the 360-degree video. In this case, the initial view-related metadata may indicate an initial view for each scene. To this end, the initial view-related metadata may further include a scene identifier for identifies a scene to which the corresponding initial view is applied. In addition, since the FOV may vary among the scenes of the 360-degree video, the initial view-related metadata may further include scene-specific FOV information indicating the FOV corresponding to a scene.

The ROI-related metadata may include information related to the ROI described above. The ROI-related metadata may include a 2d_roi_range_flag field and/or a 3d_roi_range_flag field. The 2d_roi_range_flag field may indicate whether the ROI-related metadata includes fields representing an ROI based on a 2D image, and the 3d_roi_range_flag field may indicate whether the ROI-related metadata includes fields representing an ROI based on 3D space. According to an embodiment, the ROI-related metadata may further include supplemental information such as differentiated encoding information according to the ROI and differentiated transmission processing information according to the ROI.

When the ROI-related metadata includes the fields representing an ROI based on a 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate minimum/maximum values of the coordinates of the top left end of the ROI. That is, the fields may indicate the minimum x coordinate, the maximum x coordinate, the minimum y coordinate, and the maximum y coordinate of the top left end, respectively.

The min_width field, the max_width field, the min_height field, and the max_height field may indicate the minimum/maximum values of the width and height of the ROI. That is, the fields may indicate the minimum value of the width, the maximum value of the width, the minimum value of the height, and the maximum value of the height, respectively.

The min_x field, the max_x field, the min_y field, and the max_y field may indicate the minimum/maximum values of the coordinates in the ROI. That is, the fields may indicate the minimum x coordinate, the maximum x coordinate, the minimum y coordinate, and the maximum y coordinate among the coordinates in the ROI, respectively. These fields may be omitted.

When the ROI-related metadata includes fields that represent an ROI based on coordinates in the 3D rendering space, the ROI-related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate an area occupied by the ROI in 3D space with the minimum/maximum values of yaw, pitch, and roll. That is, these fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis.

The min_field_of_view field and the max_field_of_view field may indicate the minimum/maximum value of the FOV of the corresponding 360-degree video data. FOV may refer to a field of view displayed at a time in playing back the 360-degree video. The min_field_of_view field and the max_field_of_view field may indicate the minimum and maximum values of the FOV, respectively. These fields may be omitted. These fields may be included in FOV-related metadata, which will be described later.

The FOV-related metadata may include information related to the FOV described above. The FOV-related metadata may include a content_fov_flag field and/or a content_fov field. According to an embodiment, the FOV-related metadata may further include supplemental information, such as information related to the minimum/maximum values of the FOV described above.

The content_fov_flag field may indicate whether information about an FOV intended at the time of production of the 360-degree video is present. When the value of this field is 1, the content_fov field may be present.

The content_fov field may indicate information about an FOV intended at the time of production of a corresponding 360-degree video. According to an embodiment, an area of a 360 image to be displayed to the user at one time may be determined based on a vertical or horizontal FOV of the 360-degree video reception apparatus. Alternatively, according to an embodiment, an area of the 360-degree image to be displayed to the user at one time to may be determined considering the FOV information about this field.

The cropped region-related metadata may include information about an area actually containing 360-degree video data in an image frame. The image frame may include an active video area onto which the 360-degree video data is actually projected and an unprojected area. In this case, the active video area may be referred to as a cropped region or a default display region. The active video area is a region where a 360-degree video is actually displayed on a VR display. The 360-degree video reception apparatus or VR display may process/display only the active video area. For example, when the aspect ratio of an image frame is 4:3, only the area of an image frame except a portion of the upper part and the lower part of the image frame may contain 360-degree video data. This area may be referred to as an active video area.

The cropped region-related metadata may include an is_cropped_region field, a cr_region_left_top_x field, a cr_region_left_top_y field, a cr_region_width field, and/or a cr_region_height field. According to an embodiment, the cropped region-related metadata may further include supplemental information.

The is_cropped_region field may be a flag indicating whether the entire area of the image frame is used by a 360-degree video reception apparatus or a VR display. Here, an area to which 360-degree video data is mapped or an area displayed on the VR display may be referred to as an active video area. The is_cropped_region field may indicate whether the entire image frame is an active video area. When only a part of the image frame is an active video area, the following 4 fields may be further added.

The cr_region_left_top_x field, the cr_region_left_top_y field, the cr_region_width field, and the cr_region_height field may indicate an active video area in an image frame. These fields may indicate the x coordinate of the top left of the active video area, the y coordinate of the top left of the active video area, the width of the active video area, and the height of the active video area, respectively. The width and the height may be expressed in units of pixels.

The 360 video-based VR system may provide a visual/aural experience for different viewing orientations with respect to the user's position for the 360 video based on the above-described 360 video processing process. A VR system that provides a visual/aural experience for different viewing orientations at the user's fixed position for the 360 video may be referred to as a 3 degree of freedom (DoF)-based VR system. A VR system capable of providing an extended visual/aural experience for different viewing orientations at different viewpoints or viewing positions may be referred to as a 3DoF+ or 3DoF plus-based VR system.

FIG. 12 schematically illustrates the concept of a viewpoint, a viewing position, and a viewing orientation.

Referring to FIG. 12, when a space (e.g., a theater) as shown in (a) is assumed, circles marked in the space may represent different viewpoints. The video/audio provided at the respective viewpoints in the same space may be associated with each other in the same time zone. In this case, different visual/aural experiences may be provided to the user according to change in the user's gaze direction (e.g., head motion) at a specific viewpoint. That is, spheres of various viewing positions as shown in (b) may be assumes for a specific viewpoint, and image/audio/text information reflecting the relative position of each viewing position may be provided.

As shown in (c), at a specific viewing position of a specific viewpoint, visual/aural information for various directions may be delivered as in the case of the existing 3DoF. At this time, a main source (e.g., image/audio/text) and various additional sources may be integrated and provided. In this case, information may be delivered in connection with or independently of the viewing orientation of the user.

Figure 13:
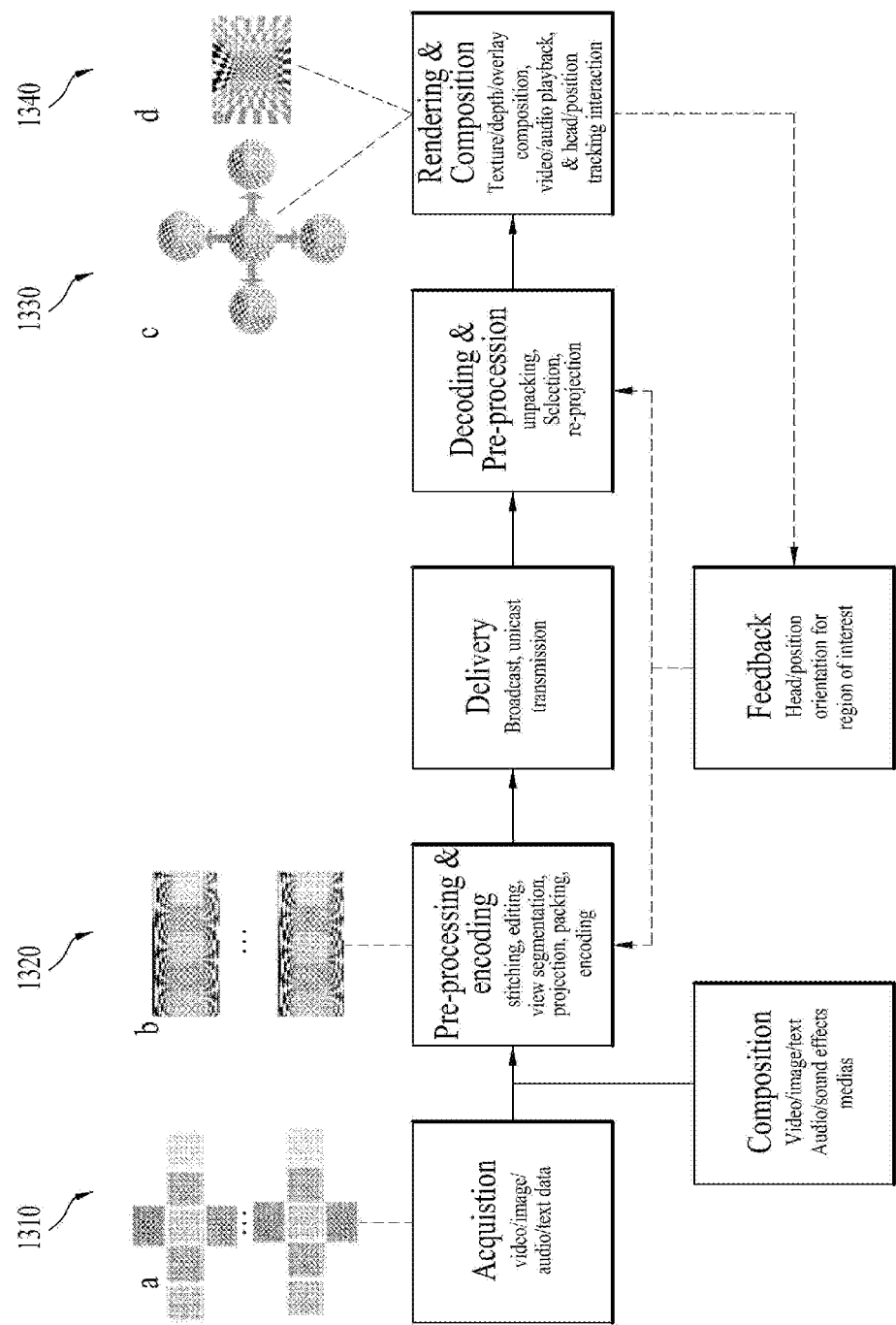
FIG. 13 is a diagram schematically showing an exemplary architecture for providing a 3DoF+ video according to the present disclosure.

FIG. 13 is a diagram schematically showing an exemplary architecture for providing 3DoF+ video according to an the present disclosure. FIG. 13 may show a flow diagram of a 3DoF+ end-to-end system including 3DoF+ image acquisition, pre-processing, transmission, (post) processing, rendering, and feedback processes.

Referring to FIG. 13, the acquisition process may refer to a process of acquiring 360 video through capture, composition, or generation of 360 video. Through this process, multiple pieces of image/audio information according to change in the gaze direction (e.g., head motion) may be acquired for multiple positions. Here, the image information may include depth information as well as visual information (e.g., texture). As illustrated in the example 1310 of image information, multiple pieces of information about different viewing positions according to different viewpoints may be acquired respectively.

The composition process may include a procedure and method for composing a video/image, soud (audio/sound effect, etc.) and text (a subtitle, etc.) obtained through external media as well as the information acquired through an image/audio input device to include the same in the user experience.

The pre-processing process may be a preparation (pre-processing) process for transmitting/delivering the acquired 360 video, and may include the stitching process, the projection process, the region-wise packing process, and/or the encoding process described above. That is, this process may include a pre-processing process and an encoding process for changing/supplementing the image/sound/text information according to the producer's intention. For example, the pre-processing of an image may include an operation of mapping the acquired visual information onto a 360 sphere (stitching), a correction operation of removing an area boundary, reducing a difference in color/brightness, or adding a visual effect to the image (editing), and operation of segmenting an image according to a view (view segmentation), and operation of mapping an image on a 360 sphere to a 2D image (projection), and operation of rearranging the image according to regions (region-wise packing), and an encoding operation of compressing the image information. As illustrated in the example 1320 in a video aspect, multiple projection images of different viewing positions according to different viewpoints may be generated.

The transmission process may refer to a process of processing and transmitting the image/audio data and metadata formed through the preparation process (pre-processing process). As a method of transmitting multiple image/audio data and related metadata of different viewing positions according to different viewpoints, a broadcasting network or a communication network may be used as described above, or a unidirectional delivery method may be used.

The post-processing and composition process may refer to a post-processing process for decoding received/stored video/audio/text data and finally playing back the same. For example, the post-processing process may include an unpacking process of unpacking the packed image and a re-projection process of restoring a 3D spherical image from a 2D projected image.

The rendering process may refer to a process of rendering and displaying the re-projected image/video data in 3D space. In this process, the image/sound signal may be reconstructed into a form for final output. The viewing orientation, viewing position/head position, and viewpoint of the user's ROI may be tracked, and only necessary image/audio/text information may be selectively used according to this information. In the case of an image signal, different viewing positions may be selected according to the user's ROI as in the example 1330. Finally, an image of a specific viewing orientation of a specific viewing position at a specific viewpoint, like the example 1340, may be output.

FIGS. 14A and 14B are diagrams illustrating an example of a 3DoF+ end-to-end system architecture. 3DoF+360 content as described above may be provided by the architecture of FIGS. 14A and 14B.

Figure 14A:
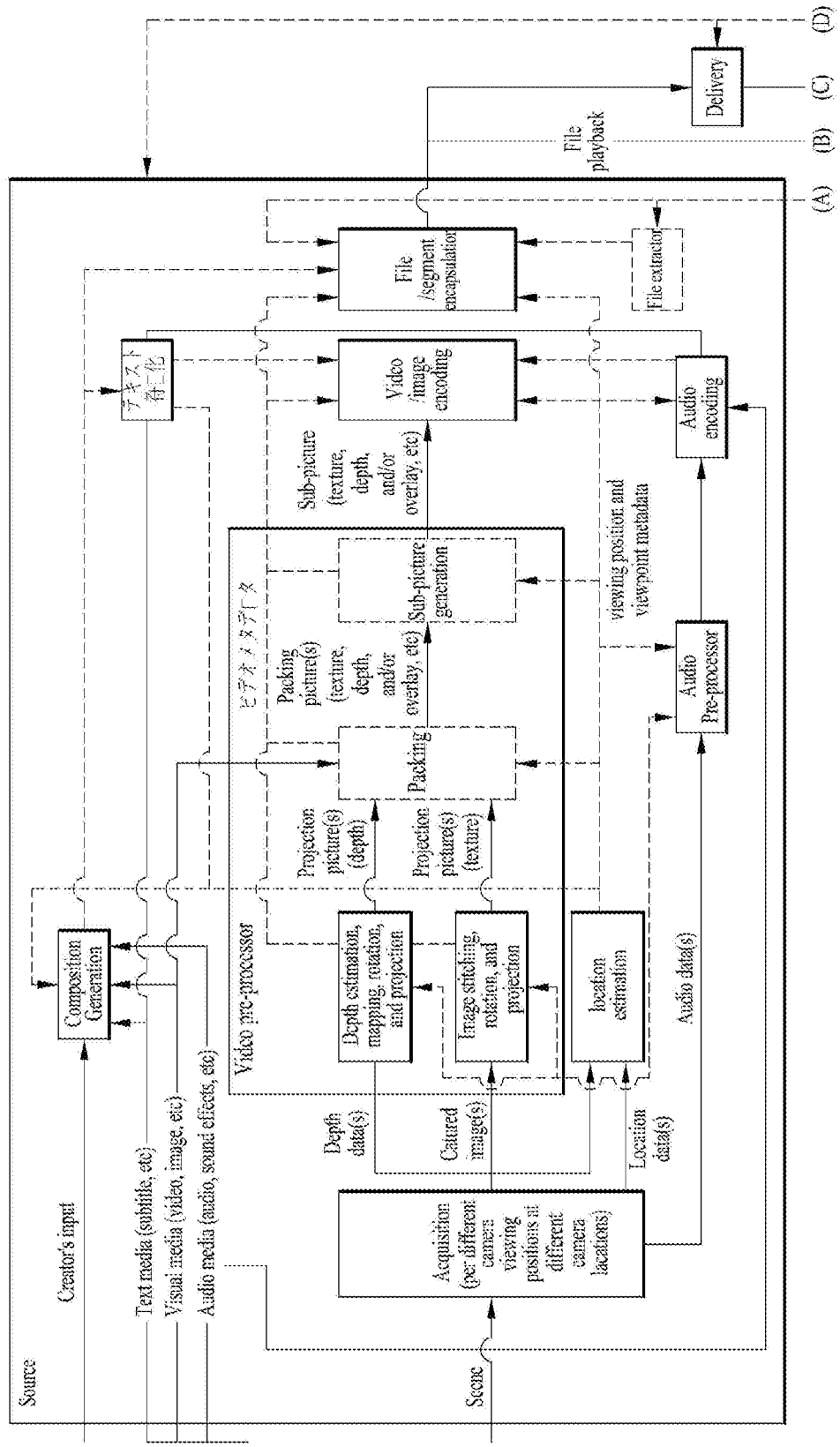
FIGS. 14A and 14B illustrate examples of a 3DoF+ end-to-end system architecture.

Referring to FIG. 14A, a 360 video transmission apparatus (transmission terminal) may include a acquisition unit configured to acquire 360 video (image)/audio data, a video/audio pre-processor configured to process the acquired data, and a composition generation unit configured to compose supplemental information, an encoding unit configured to encode text, audio, and a projected 360-degree video, an encapsulation unit configured to encapsulate the encoded data. As described above, the encoded data may be output in the form of a bitstream. The encoded data may be encapsulated in a file format such as ISOBMFF or CFF, or may be processed in the form of other DASH segments. The encoded data may be delivered to a 360 video reception apparatus through a digital storage medium. Alternatively, although not explicitly shown, the encoded data may be processed for transmission through a transmission processor as described above, and then transmitted over a broadcasting network or broadband.

The data acquisition unit may acquire different pieces of information simultaneously or sequentially according to the sensor orientation (or viewing orientation for an image), sensor position for acquisition of information (or a viewing position for an image), and sensor information acquisition location (a viewpoint for an image). At this time, video, image, audio, and location information may be acquired.

In the case of image data, texture and depth information may be respectively acquired, and different video pre-processing may be performed thereon according to characteristics of each component. For example, in the case of the texture information, a 360 omnidirectional image may be constructed using images of different viewing orientations of the same viewing position acquired at the same viewpoint based on the image sensor location information. To this end, an image stitching process may be performed. In addition, projection and/or region-wise packing for changing the image to a format for encoding may be performed. In the case of a depth image, an image may generally be acquired through a depth camera. In this case, a depth image may be created in a form such as a texture. Alternatively, depth data may be generated based on separately measured data. After the images for the respective components are generated, sub-picture generation may be performed by performing additional packing into a video format for efficient compression or dividing the image into parts that are actually needed. Information about the video configuration used in the video pre-processing stage is delivered through video metadata.

When additionally given image/audio/text information is provided along with the acquired data (or data for a main service), information for composing such information at the time of final playback needs to be provided. The composition generation unit generates, based on the creator's intention, information for composing externally generated media data (video/image for visual media, audio/sound effect for audio media, and a subtitle for text) in the final playback stage. This information is delivered as composition metadata.

The image/audio/text information obtained after each process is compressed using each encoder and encapsulated in a file unit or a segment unit depending on the application. In this case, only necessary information may be extracted (by a file extractor) according to the video, file, or segment configuration method.

In addition, information for reconstructing each data in the receiver is delivered at a codec or file format/system level. This information includes information for video/audio reconstruction (video/audio metadata), composition information for overlay (composition metadata), video/audio playable position (viewpoint), and viewing position information (viewing position and viewpoint metadata) for each viewpoint. Such information may be generated through a separate metadata processor.

Figure 14B:
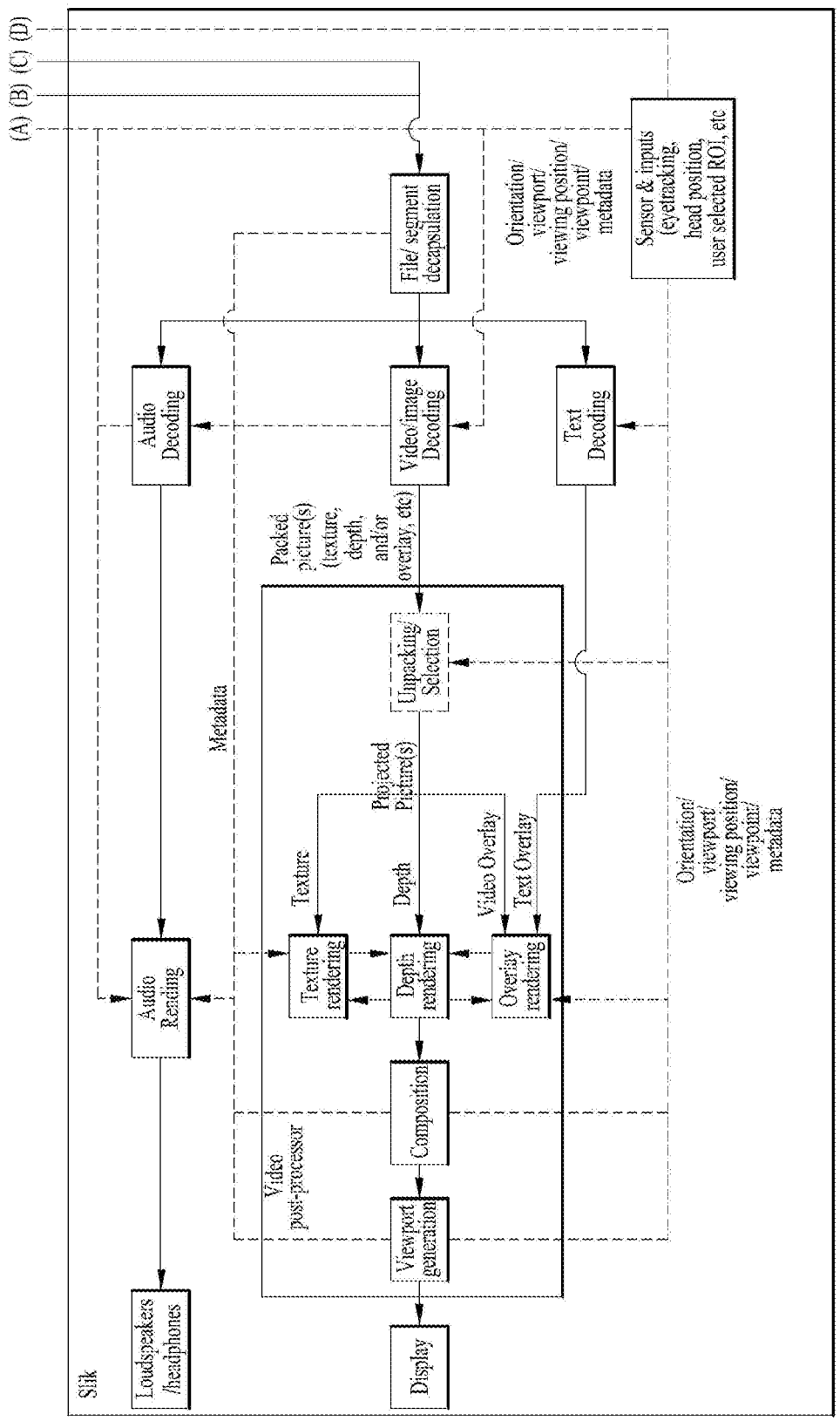

Referring to FIG. 14B, a 360 video reception apparatus (reception terminal) may include a file/segment decapsulation unit configured to decapsulate a received file or segment, a decoding unit configured to generate video/audio/text information from a bitstream, a post-processor configured to reconstruct image/audio/text in a form for playback, a tracking unit configured to track a user's ROI, and a display that is a playback device.

The bitstream generated through decapsulation may be divided into image/audio/text according to the type of data and separately decoded into a playable form.

The tracking unit may generate information about a viewpoint of the user's region of interest, a viewing position at the viewpoint, and a viewing orientation at the viewing position based on the input information about the sensor and the user. This information may be used for selection or extraction of a region of interest by each module of the 360 video reception apparatus, or may be used for a post-processing process for emphasizing information about the region of interest. When delivered to the 360 video transmission apparatus, the information may be used for file extraction or sub-picture selection for efficient bandwidth use, and various ROI-based image reconstruction methods (viewport/viewing position/viewpoint dependent processing).

The decoded image signal may be processed using various processing methods according to an image configuration method. When image packing is performed by the 360 video transmission apparatus, a process of reconstructing an image based on the information delivered through metadata is needed. In this case, video metadata generated by the 360 video transmission apparatus may be used. In addition, the location of the user's region of interest generated through tracking, when images of multiple viewpoints, multiple viewing positions, or various viewing orientations are included in the decoded image, information matching the viewpoint, viewing position and viewing orientation of the user's ROI may be selected and processed. At this time, the viewing position and viewpoint related metadata generated by the transmission terminal may be used. When multiple components are delivered for a specific viewpoint, viewing position, or viewing orientation, or video information for overlay is separately delivered, a rendering process based thereon may be included. The video data (texture, depth, overlay) that has undergone the separate rendering process is subjected to a composition process. At this time, composition metadata generated by the transmission terminal may be used. Finally, information for playback in a viewport may be generated according to the user's ROI.

A playable sound signal may be generated from the decoded sound signal through an audio renderer and/or a post-processing process. At this time, based on the information about the user's ROI and the metadata delivered to the 360 video reception apparatus, information meeting the user's request may be generated.

The decoded text signal may be delivered to an overlay renderer and processed as text-based overlay information such as a subtitle. A separate text post-processing process may be included when necessary.

Figure 15:
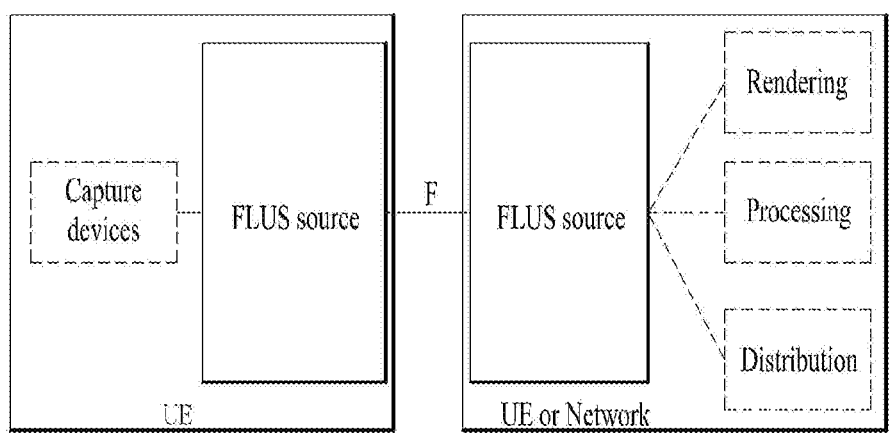
FIG. 15 schematically illustrates an example of a Framework for Live Uplink Streaming (FLUS) architecture.

FIG. 15 schematically illustrates an example of a Framework for Live Uplink Streaming (FLUS) architecture.

The detailed blocks of the transmission terminal and the reception terminal described in FIG. 14 (FIGS. 14A and 14B) may be classified into functions of a source and a sink in FLUS, respectively.

When the above-described detailed blocks of the transmission terminal and the reception terminal are classified into the functions of the source and the sink in FLUS, the function of the source may be implemented in a 360 video acquisition device as shown in FIG. 14, and the function of the sink may be implemented on a network. Alternatively, the source/sink may be respectively implemented in a network node.

Figure 16:
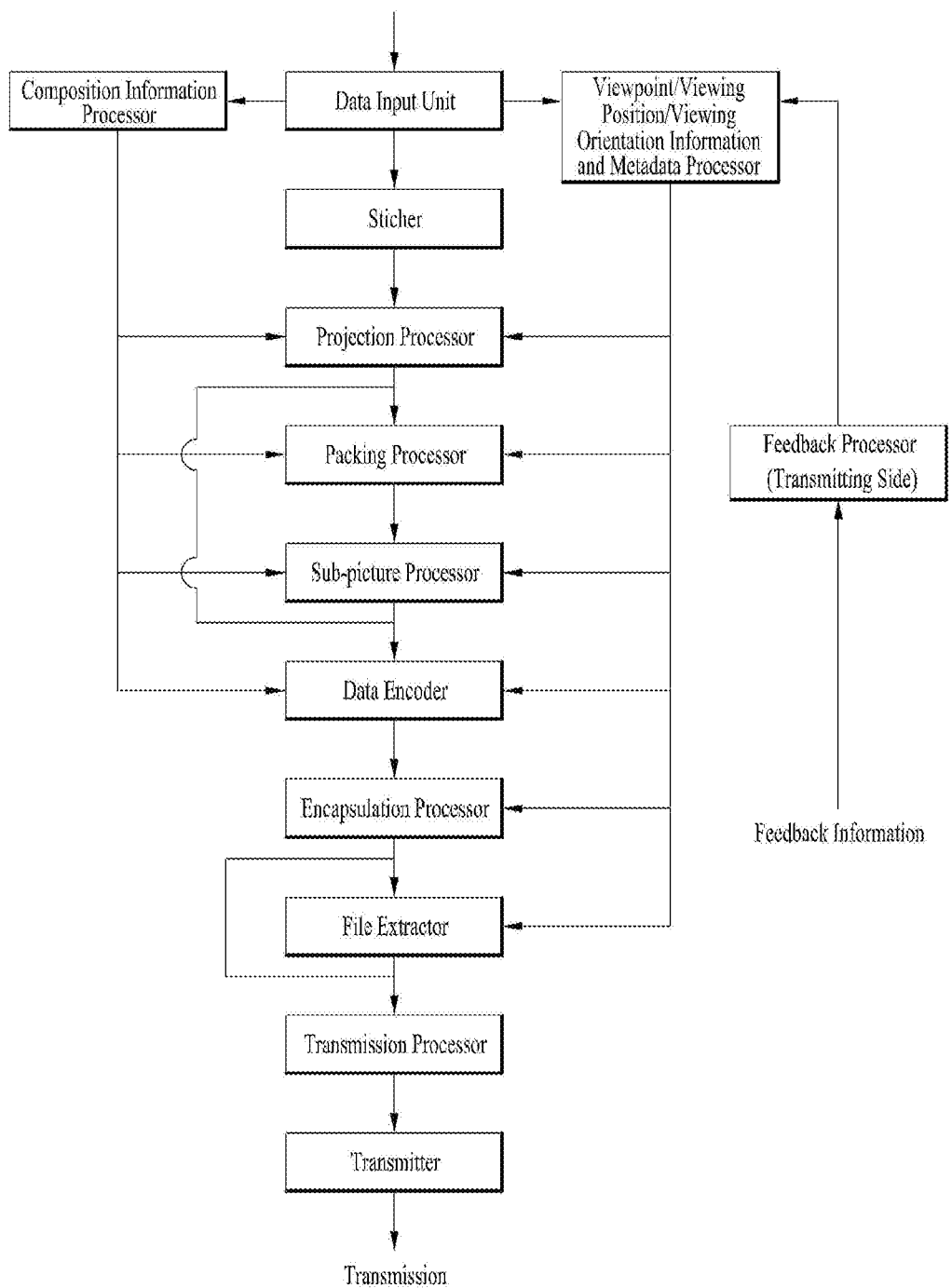
FIG. 16 schematically illustrates a configuration of a 3DoF+ transmission terminal.

The transmission and reception processing processes based on the above-described architecture may be schematically illustrated, for example, as in FIGS. 15 and 16. The transmission and reception processing processes of FIGS. 15 and 16 will be described based on the image signal processing process. When other signals such as voice or text are processed, some parts (e.g., the stitcher, the projection processor, the packing processor, the sub-picture processor, and packing/selection, rendering, composition, viewport generation, etc.) may be omitted, or may be changed and processed in accordance with the voice or text processing process.

FIG. 16 schematically illustrates a configuration of a 3DoF+ transmission terminal.

Referring to FIG. 16, when the input data is a camera output image, the transmission terminal (360 video transmission apparatus) may perform stitching for configuring a sphere image according to each viewpoint/viewing position/component. Once a sphere image is configured for each viewpoint/viewing position/component, the image may be projected onto a 2D image for coding. Depending on the application, packing for creating an integrated image from multiple images or sub-picture generation of dividing the image into images of detailed regions may be performed. As described above, the region-wise packing process may be skipped as an optional process. In this case, the packing processor may be omitted. When the input data is supplemental image/audio/text information, a method to add the supplemental information to a central image and display the image may be signaled, and added data may also be transmitted. The generated image and the added data may be compressed into a bitstream in the encoding process, and then transformed into a file format for transmission or storage through the encapsulation process. At this time, a process of extracting a file required by the receiver may be processed according to an application or a system request. The generated bitstream may be transformed into a transmission format and transmitted through the transmission processor. Then, the transmitting-side feedback processor may process the viewpoint/viewing position/viewing orientation information and necessary metadata based on the information transmitted from the reception terminal, and deliver the same to a related transmitter.

Figure 17:
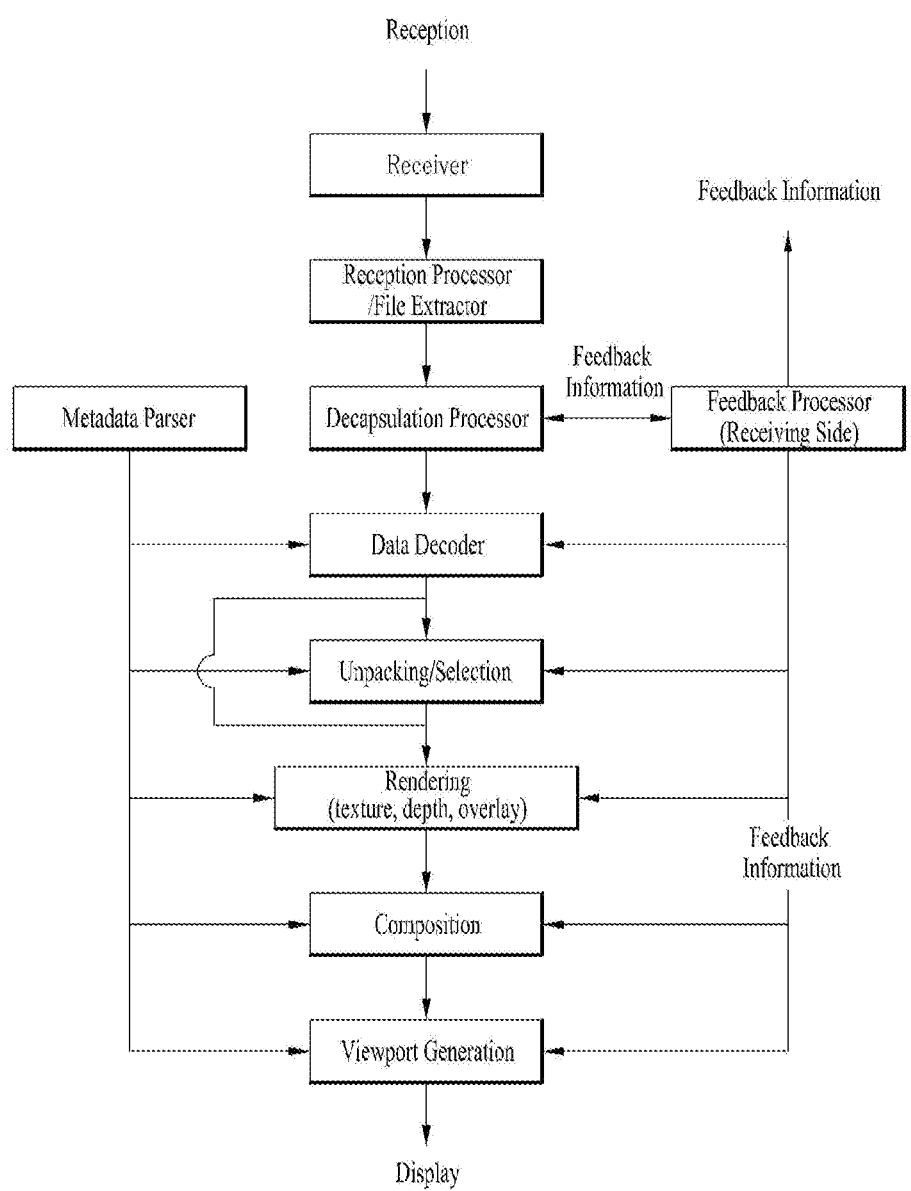
FIG. 17 schematically illustrates a 3DoF+ reception terminal.

FIG. 17 schematically illustrates a 3DoF+ reception terminal.

Referring to FIG. 17, the reception terminal (360 video reception apparatus) may extract a necessary file after receiving a bitstream delivered from the transmission terminal. A video stream in the generated file format may be selected using the viewpoint/viewing position/viewing orientation information and the video metadata delivered from the feedback processor, and video information may be reconstructed from the selected bitstream through a decoder. A packed image may be unpacked based on the packing information transmitted through the metadata. When the packing process is omitted at the transmission terminal, unpacking at the reception terminal may also be omitted. When necessary, a process of selecting an image and necessary components suitable for the viewpoint/viewing position/viewing orientation delivered from the feedback processor may be performed. A rendering process of reconstructing the image texture, depth, and overlay information into a format suitable for playback may be performed. Before the final image is generated, a composition process of integrating information about different layers may be performed, and an image suitable for the display viewport may be generated and played.

All the information that may be obtained when a user views one 360 video displayed through the 3DoF reception terminal may be a 360-degree image captured at a fixed location. However, for 3DoF+ content, the user may want to the 360 video by zooming in or out on a certain area. For example, suppose that a user is experiencing a 360 video captured from one stand of a football stadium. The user may have needs for an experience of a 360 video captured on the opposite side, in front of the soccer goalpost, or in the center of the stadium. In addition, when the position is moved from a specific point in the content of one viewing position to another linked viewing position, the link point may not be aligned with the viewing orientation, but may be within the range of the viewport. In this case, the user may want to see a scene that is partially moved to the viewing orientation rather than to move to the link point to view the viewport. Alternatively, when the viewing orientation is excessively far from the link point, the user may want to adjust the degree of movement to move to a point where the visual fatigue may be minimized.

However, in the existing hotspot signaling method, hotspot-related information (hotspot metadata) is signaled on the assumption that the location of the hotspot coincides with the center of the viewport, even though a hotspot link may exist at any position within the viewport. Here, the hotspot may indicate information about a link from one viewpoint to another viewpoint. In other words, a hotspot may be defined by associating a sphere region with the hotspot location and additionally linking the hotspot sphere region to the URI of the 360 degrees video that needs to be played out when that hotspot is clicked. The hotspot metadata may indicate the location of the hotspot and URI associated with the hotspot. That is, in conventional cases, the middle point of the viewport is regarded as a hotspot link point. In this case, when the viewport is expressed by moving to a 360 video of another viewpoint linked to the hotspot, a difference from the viewport viewed in the previous viewpoint may occur, causing a sudden rotation of the 360 video, which may cause dizziness to the user, and natural movement of content may be limited. The link of the hotspot does not need to be the center of the viewport, and it may be more suitable for user convenience to immediately show a point compensated according to the user's viewing orientation.

According to the present disclosure, a 360 video system based on multiple viewpoints may be provided in consideration of the user's needs or convenience as described above. According to the present disclosure, the coordinate axes of multiple 360 video services may be matched when they do not match. In addition, when multiple 360 video services are linked to each other at a specific point, viewport information before and after the connection may be delivered. In this case, if the center of the link point is different from the center coordinate information about the viewport that the user is currently viewing, the corresponding coordinates may be compensated to deliver new viewport information.

According to the present disclosure, various kinds of information for supporting multiple viewpoints may be signaled from a transmission terminal to a reception terminal. For example, as described below, the information about a viewpoint to serve as a reference among multiple linked 360 videos (of different viewpoints) may be signaled. In addition, information about the number of other viewpoints or 360 videos linked to the viewpoint may be signaled. The identifier of each viewpoint, the center coordinate information about each viewpoint, and/or the size information about a 360 video centered on each viewpoint may also be signaled. Also, coordinate axis alignment-related information about each viewpoint may be signaled. The coordinate axis alignment-related information may include information for checking whether coordinate axes are aligned, considering a case where the configured coordinate axes differ among the respective viewpoints. A 360 video identifier that may be linked at each viewpoint may also be signaled. In addition, information about the center value and area of a point to which 360 video is to be linked may be signaled. In addition, when the link point is selected, information about a 360 video to be linked and information about a viewport to be displayed first after the connection may be signaled.

Further, when the center of the predetermined link point is different from the center indicated by the viewport center information, information related to the position and compensation of the viewport to be displayed after the connection may be signaled. However, it is apparent that the above-described information is merely an example, and a part thereof may be omitted or additional information may be further included in order to configure a multi-viewpoint (or multi-view) supported 360 video service.

Figure 18:
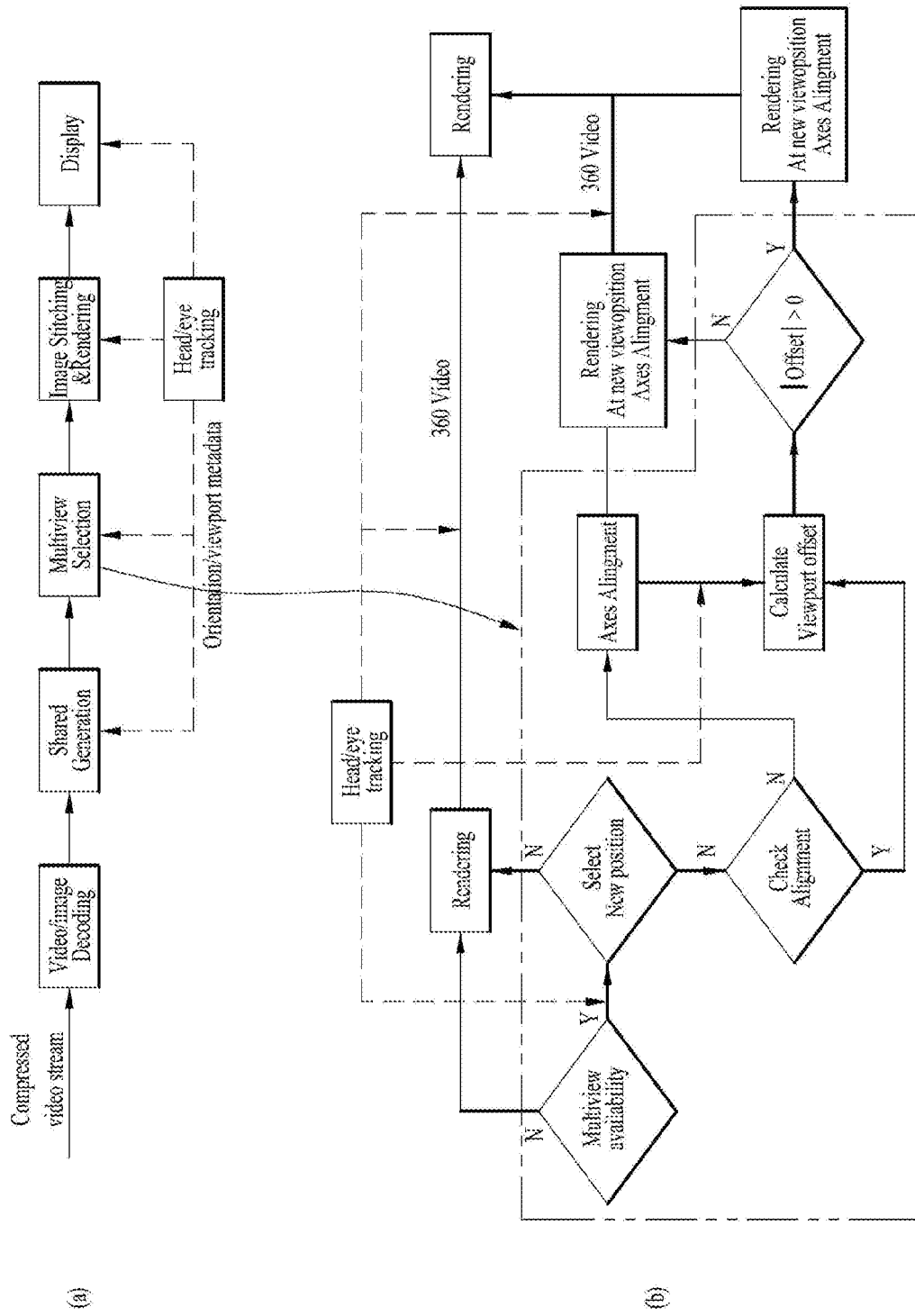
FIG. 18 illustrates an example of a reception terminal operation supporting multiple viewpoints.

FIG. 18 illustrates an example of a reception terminal operation supporting multiple viewpoints.

Referring to FIG. 18, a reception terminal supporting a multi-viewpoint 360 video (a 360 video reception apparatus) may receive a compressed video stream (or a (video) bitstream or 360 video bitstream), and display a desired 360 video through the processes of decoding, sphere generation process, multiview selection, image stitching and rendering. In this case, orientation/port metadata for the sphere generation process and the multiview selection may be delivered through a tracking process (header/eye tracking, etc.). The detailed operation of the multi-viewpoint (multiview) selection process may include the processes shown in (b).

Specifically, the reception terminal may reconstruct (decode) 2D pictures/videos by performing the decoding process based on the compressed video stream. Thereafter, the reception terminal may configure a 360 video supporting multiple viewpoints through sphere generation with the same radius or different radii for each viewpoint. In this case, necessary viewpoint center information and radius information may be delivered from a file format. A multi-viewpoint 360 video constructed in a sphere shape first renders and shows an initial viewpoint. At this time, when a 360 video of another viewpoint is selected through the multi-viewpoint selection process, a 360 video based on a second viewpoint linked at a specific position of a 360 video based on a first viewpoint may be derived through hotspot_struct, axes alignment, viewport offset, etc. In addition, considering the relationship between viewports near the specific position that the user is viewing, an adaptive viewport function of adjusting the position of a viewport displayed after the connection through an offset may be implemented.

For calculation of the offset, position information about the current viewport that the user is viewing may be obtained through head/eye tracking. For example, the user's head position may be identified using micro-electrical-mechanical sensors (MEMS) such as a gyroscope, an accelerometer, and a magnetometer included in the head/eye tracking device. The initial viewport may be calculated based on the field of view (FOV). When the user's position set as the initial value is set to (0, 0, 0), the FOV may be calculated based on tangent values between a viewing vector indicating the direction in which the user is viewing at the position and the top, bottom, left, and right edges. Each time the user moves away from the initial viewport, the center point of the viewport may be moved, and a texture corresponding to a new viewport may be invoked. The center information about the viewport or the information about the direction in which the user is viewing may be acquired through persistent tracking through a device capable of rendering or displaying a 360 video, such as a head mount display (HMD). In this case, the distance between the center of the viewport or the viewing direction of the user and the center position of the hotspot that is pre-signaled and received may be calculated. The distance may be calculated as, for example, a 3D Euclidean distance. When the hot spot is moved, a new viewport may be rendered by applying transfer_rate to the distance in consideration of a difference in distance between the user's position and the hotspot position.

The multi-viewpoint selection process may include the processes shown in FIG. 18(b). The reception terminal may determine whether multiple viewpoints are supported. When multiple viewpoints are not supported, a general operation of the reception terminal for the conventional 360 video display may be performed. When multiple viewpoints are supported, adaptive viewport generation may be performed when a new viewposition is selected. When a new viewposition is not selected, general operation of the reception terminal for the conventional 360 video display may be performed as in the case where multiple viewpoints are not supported. For example, a new viewposition may be selected through the hotspot link described above. The viewposition may correspond to the viewpoint and/or viewing position described above.

In the case where a new viewposition is selected, it is checked whether the axes of the selected viewposition need to be aligned with the axes of the initial viewposition. When the alignment is needed, an alignment procedure may be performed. For example, to configure a multi-viewpoint 360 video system, multiple cameras (or camera lenses) may be configured for each viewposition. In this case, one of the multiple cameras provided for each viewposition may be treated as a master camera. In this case, the coordinates of the remaining cameras in the corresponding viewposition may be defined based on the master camera. For multiple viewpositions, there may be multiple master cameras. In this case, axes may be aligned between the multiple master cameras in the multiple viewpositions in a configuration step. If the axes are not aligned, axes of other master cameras may be aligned based on a specific reference (a specific master camera), and alignment-related information may be transmitted from the transmission terminal to the reception terminal.

After the alignment of the axes is completed, a viewport offset is calculated based on the distance in 3D coordinates between the viewport center of the link point received as metadata and the viewport center that the user is viewing for adaptive viewport generation. In the case where the alignment of the axes is not needed (e.g., the axes are already aligned), the viewport offset may be calculated without the alignment. When the total distance value indicated by the calculated viewport offset is greater than n, a new viewport may be displayed in the new viewposition. When the offset value is less than or equal to n (e.g., 0), a preset viewport may be displayed. The offset threshold n, which is the basis of compensation, is illustrated in FIG. 18(b) as 0, but this is merely an example. The offset threshold may be set to a non-zero value according to a user/producer's intention. The adaptive viewport rendering described above may be performed by a unit configured to process the multiview selection process, or may be performed by a unit configured to perform the image stitching and rendering processes or a display unit.

In order to perform the processes of the present disclosure described above, metadata described below may be configured and transmitted.

For example, the multi-viewpoint information may include the following fields. Here, the multi-viewpoint information may be referred to as multi-viewpoint metadata.

TABLE 1

```
aligned (8)          class multiviewpoint_Info {
   unsigned int(16)origin_viewpoint_ID;
   unsigned int(16)num_of_viewpoint;
   for(i=0;i <num_of_viewpoint; i++){
      unsigned int(16)        viewpoint_ID[i];
      unsigned int(16)        viewpoint_radius;
      signed int(32)          viewpoint_pos_centerX;
      signed int(32)          viewpoint_pos_centerY;
      signed int(32)          viewpoint_pos_centerZ;
      unsigned int(8)         alignment_availability;
      if (alignment_availability == 1)
                         alignment_struct();
      Hospot_Info();
   }
}
```

Here, multiveiwpoint_info { } may represent a structure including metadata configured for multi-viewpoint support.

The origin_viewpoint_ID field may indicate an identifier of a reference viewpoint in a 360 video system supporting multiple viewpoints. That is, it is an identifier of a 360 video to be defined by origin_viewpoint among 360 videos that support multiple viewpoints. This may indicate an identifier of a viewpoint serving as a reference for alignment of axes described above or later. That is, it may indicate the ID of a reference viewpoint having a master camera serving as a reference for alignment of axes among the master cameras of the multiple viewpoints.

The num_of_viewpoint field indicates the number of supported or linked viewpoints.

The viewpoint_ID [ ] field indicates an identifier of a viewpoint.

The viewpoint_radius field may indicate a radius when each viewpoint supports a sphere type, and indicate a distance from a center to a cube boundary when a cube type is supported. The unit of distance may be mm, cm, number of pixels, or relative distance. This field may be fixed to 1 for all viewpoints. In this case, this field may be omitted.

The viewpoint_pos_centerX field, viewpoint_pos_centerY field, and viewpoint_pos_CenterZ field indicate the three-dimensional coordinates of the viewpoint center. For example, the fields may correspond to Cartesian coordinates X, Y, and Z, or correspond to spherical coordinates yaw, pitch, and roll. When the spherical coordinates are used, the unit may be degrees, the yaw and roll be in the range of [−180, 180], and the pitch may be in the range of [−90, 90].

The alignment_availability field may be flag information indicating whether the axes of a corresponding viewpoint should be aligned with the axes of origin_viewpoint. For example, this field may be flag information for applying alignment of axes when the axes of the corresponding viewpoint are not aligned or coincident with the axes of origin_viewpoint. When the value of this field is 1, the axes alignment may be performed by invoking alignment_struct( ), and then the Hotspot_Info( ) field may be invoked. When the value of the alignment_availability field is 0, the Hotspot_Info( ) field may be invoked without invoking alignment_struct( ). The alignment_availability field may be omitted. For example, when the current viewpoint is the same as the origin viewpoint, the alignment_availability field may be omitted.

The alignment_struct( ) field represents a structure containing information (metadata) for the axes alignment. That is, the alignment_struct( ) field contains information for aligning the axes in consideration of the case where the axes of viewpoints are not aligned.

The Hotspot_info( ) field is a structure containing information (such as hotspot information) about a viewpoint to which each viewpoint may be switched. The alignment_struct( ) field may carry information about hotspots linked to a corresponding viewpoint. That is, this field may include information about a link point between a current viewpoint and a new viewpoint and a post-connection processing method.

As another example, the multi-viewpoint information may include the following fields.

TABLE 2

```
aligned (8)         class multiviewpoint_Info {
  unsigned int(16)          origin_viewpoint_ID;
  unsinged int(16)          num_of_viewpoint;
  for(i=0;i < num_of_viewpoint; i++){
    unsigned int(16)        viewpoint_ID[i];
    unsigned int(16)        viewpoint_radius;
    signed int(32)          viewpoint_pos_centerAzi;
    signed int(32)          viewpoint_pos_centerEle;
    signed int(32)          viewpoint_pos_centerDistance;
    unsigned int (8)        alignment_availability;
    if (alignment_availability == 1)
      alignment_struct();
    Hospot_Info();
  }
}
```

Fields having the same name as the above-described fields may carry the same information. The following description is based on this.

The viewpoint_pos_centerAzi field, the viewpoint_pos_centerEle field, and the viewpoint_pos_centerDistance field may indicate azimuth, elevation, and distance of spherical coordinates, which are three-dimensional coordinates of the viewpoint center, respectively.

The above-described information is merely an example. In addition to the above-described fields and information, other fields and information may be further added to support multiple viewpoints.

Each of 360 videos supporting multiple viewpoints may be captured by independent cameras. That is, a 360 video for each viewpoint may be captured with independent cameras for each viewpoint. In this case, the master camera axes for the respective viewpoints may not be aligned with each other as described below.

Figure 19:
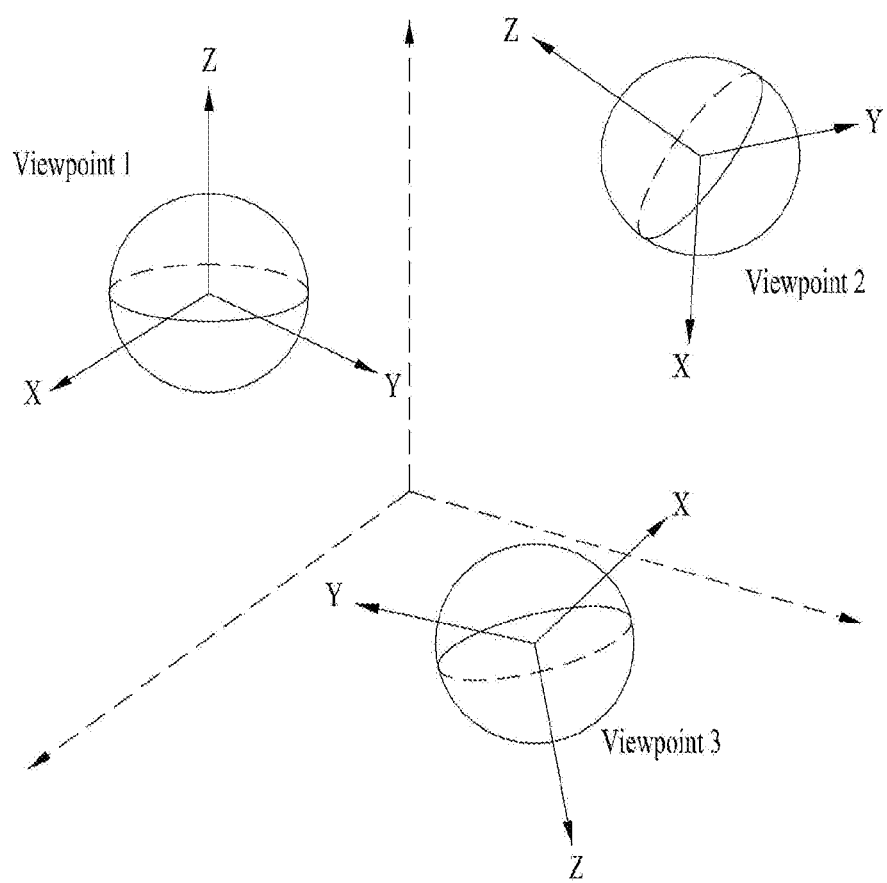
FIG. 19 exemplarily shows reference camera axes for each viewpoint.

FIG. 19 exemplarily shows reference camera axes for each viewpoint. The reference camera axes for each viewpoint may correspond to the axes of the master camera of each viewpoint.

Referring to FIG. 19, 3D axes formed based on a master camera orientation at each viewpoint may not coincide with 3D axes at another viewpoint.

When the axes are not aligned as in this case, an unintended image may be rendered when movement occurs from a 360 video of a specific viewpoint to a 360 video of another viewpoint. Therefore, it is necessary to check whether the axes of 360 videos linked through multiple viewpoints are coincident/aligned with each other, and metadata (axis alignment information) that enables coincidence/alignment when the axes are not coincident/aligned may be transmitted from the transmission terminal to the reception terminal. The metadata may be included in, for example, the alignment_struct( ) field described above as follows.

TABLE 3

```
aligned (8)        class         alignment_struct(){
  signed int(32)   rotation_longitudeX;
  singed int(32)   rotation_latitudeX;
  signed int(32)   rotation_longitudeY;
  signed int(32)   rotation_latitudeY;
  signed int(32)   rotation_longitudeZ;
  signed int(32)   rotation_latitudeZ;
}
```

Here, the rotation_longitudeX field, the rotation_longitudeY field, and the rotation_longitudeZ field may indicate the degree to which each axis should shift in the lateral direction in order to align the axes of the viewpoint with reference axes. The rotation_longitudeX field, the rotation_longitudeY field, and the rotation_longitudeZ field may indicate angles by which the X-axis, the Y-axis, and the Z-axis should shift in the lateral direction, respectively. In this case, the reference axes may be the axes of origin_viewpoint, and the degree of the shift may be calculated based on the axes of origin_viewpoint.

The rotation_latitudeX field, the rotation_latitudeY field, and the rotation_latitudeZ field may indicate the degree to which each axis should shift in a latitudinal direction in order to align the axes of the viewpoint with reference axes. The rotation_latitudeX field, the rotation_latitudeY field, and the rotation_latitudeZ field may indicate an angle by which the X-axis, the Y-axis, and the Z-axis should shift in the latitudinal direction.

As an example, in Table 3, only the fields related to one or two axes among the X-axis, Y-axis, and Z-axis may be included, and the fields related to the other axes may be omitted. For example, the rotation_longitudeX field and the rotation_latitudeX field may be included, and the fields related to the other axes may be omitted. As another example, the rotation_longitudeX field, the rotation_latitudeX field, the rotation_longitudeY field, and the rotation_latitudeY field may be included, and the fields related to the other axis may be omitted. As another example, the rotation_longitudeY field, the rotation_latitudeY field, the rotation_longitudeZ field, and the rotation_latitudeZ field may be included, and the fields related to the other axis may be omitted.

The reception terminal receiving the axis alignment information as described above may calculate the degree to which each axis should be shifted with respect to the reference axes (e.g., the axes of origin_viewpoint).

FIG. 20 shows an example of shift of axes. As illustrated in FIG. 20, necessary adjustment or alignment of the axes may be performed based on the values indicated by the axis alignment information and the reference axes.

The axis alignment information may be expressed as rotation_X, rotation_Y, rotation_Z to apply an Euler's axes rotation matrix.

Figure 21:
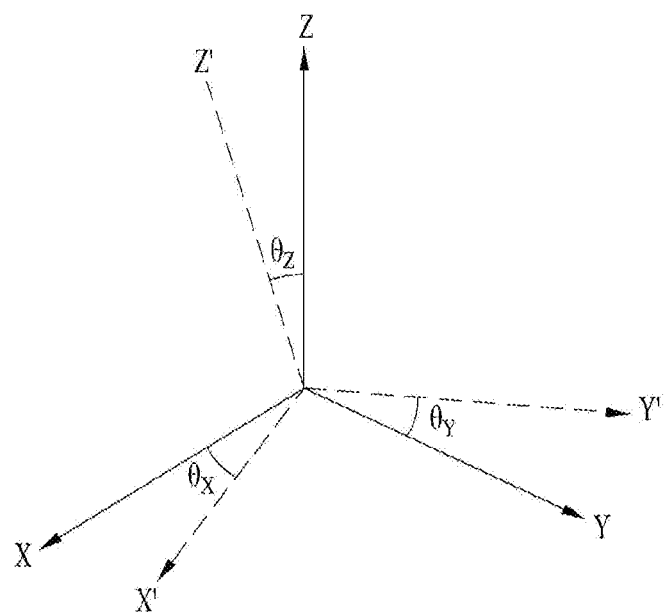
FIG. 21 shows another example of shift of axes.

FIG. 21 shows another example of shift of axes. As illustrated in FIG. 21, the positions of the axes may be adjusted or aligned based on the X-axis rotation angle, the Y-axis rotation angle, and the Z-axis rotation angle. In this case, the rotation transform may be derived as the following equation.

Equation 5

$$R_T = \begin{bmatrix} \cos\theta_y\cos\theta_z & \begin{matrix}-\cos\theta_x\sin\theta_z + \\ \sin\theta_x\sin\theta_y\cos\theta_z\end{matrix} & \sin\theta_x\sin\theta_z + \cos\theta_x\sin\theta_y\cos\theta_z \\ \cos\theta_y\sin\theta_z & \begin{matrix}\cos\theta_x\cos\theta_z + \\ \sin\theta_x\sin\theta_y\sin\theta_z\end{matrix} & -\sin\theta_x\cos\theta_z + \cos\theta_x\sin\theta_y\sin\theta_z \\ -\sin\theta_y & \sin\theta_x\cos\theta_y & \cos\theta_x\cos_y \end{bmatrix}$$

In addition, in this case, metadata related to the axis alignment information may be included as follows.

TABLE 4

```
aligned (8)        class         alignment_struct(){
  signed int(32)   rotation_X;
  singed int(32)   rotation_Y;
  signed int(32)   rotation_Z;
}
```

Here, the rotation_X field, the rotation_Y field, and the rotation_Z field may indicate an angle for shift of each of the X, Y, and Z axes, that is, an offset angle, to apply to the Euler's rotation matrix.

For example, the above-described hotspot information may be configured as follows.

TABLE 5

```
aligned (8)        class          Hotspot_Info (){
unsigned int(16)                  Num_of_hotspot;
   for (i=0;i<Num_of_hotspot;i++){
                   unsigned int(8)    Hotspot_Type;
                   unsigned int(16)   hotspot_ID;
                   signed int(32)     hotspotCenter_yaw;
                   signed int(32)     hotspotCenter_pitch;
                   signed int(32)     hotspotCenter_roll;
                   unsigned int(16)   hotspotRange_Horizontal;
                   unsigned int(16)   hotspotRange_Vertical;
                   unsigned int(16)   viewport_center_yaw;
                   unsigned int(16)   viewport_center_pitch;
                   unsigned int(16)   viewport_center_roll;
                   interactive_viewport_info();
   }
}
aligned (8)        class          interactive_viewport_info(){
   unsigned int(16)                  next_track_ID;
   unsigned int (16)                 next_viewpoint_ID;
   signed int(32)                    center_interactive_yaw;
   signed int(32)                    center_interactive_pitch;
   signed int(32)                    center_interactive_roll;
   signed int(32)                    center_interactive_tilt;
   unsigned int(16)                  new_viewport_horizontal;
   unsigned int(16)                  new_viewport_vertical;
   unsigned int(16)                  transfer_rate;
}
```

Here, the Num_of_hotsopt field indicates the number of hotspots linked to a corresponding viewpoint. That is, this field may indicate the total number of other viewpoints linked to the viewpoint.

The Hotstpot_Type field indicates the type of the hotspot. This field may indicate a hotspot type such as whether the direction of shift of a viewport to be displayed in moving to another viewpoint linked to the hotspot is a direction facing the viewpoint before the shift, or a scene to be viewed after forward movement.

For example, the hotspot types may be represented as in the following table. Details of the types will be described later.

TABLE 6

| Hotspot Type | Description |
| --- | --- |
| 0001 | Forward |
| 0010 | Mirror |
| 0011 | Jumping |
| 0100 | User defined |
| 0101~1111 | reserved |

The hotspot_ID field indicates an identifier of a hotspot. That is, this field may indicate the identifier of a linked viewpoint. The hotspotCenter_yaw field, the hotspot Center_pitch field, and the hotspotCenter_roll field indicate yaw, pitch, and roll values of the hotspot center, respectively. That is, these fields may indicate yaw, pitch, and roll, spherical coordinates, of the center point of the hotspot, which is a point linked to another viewpoint before viewpoint shift. For the spherical coordinates, the unit may be degrees, the yaw and roll may be in the range of [−180, 180], and the pitch may be expressed in the range of [−90, 90]. These fields are based on the basis of yaw, pitch, and roll, but this is merely an example. The center point may be represented by Cartesian coordinates X, Y, and Z. In this case, the names of the fields may be given as, for example, a hotspotCenter_X field, a hotspotCenter_Y field, and a hotspotCenter_Z field.

The hotspotRange_Horizontal field and the hotspotRange_Vertical field indicate horizontal and vertical ranges of the hotspot, respectively. In other words, the hotspot Range_Horizontal field and the hotspotRange_Vertical field are parameters for indicating the area of the hotspot, which is a point linked to other viewpoints, and may indicate the horizontal and vertical ranges on both sides of the coordinates of the hotspotCenter.

The viewport_center_yaw field, the viewport_center_pitch field, and the vieport_center_roll field indicate yaw, pitch, and roll values for the position of the viewport center (viewport_center) of a viewport (e.g., the previous viewport, a first viewport) where the hotspot is positioned, respectively. When the hotspotCenter is different from the viewport_center, the viewport_center_yaw field, the viewport_center_pitch field, and the vieport_center_roll field may indicate the position of the viewport_center with yaw, pitch, and roll to compensate for the position of the default viewport (e.g., a subsequent viewport, a second viewport) that is rendered when movement to another viewpoint is performed.

The interactive_viewport_info( ) field represents a structure including information about a viewport (e.g., a subsequent viewport, the default viewport, the second viewport, etc.) to be basically shown at a viewpoint after connection.

As shown in Table 5, the interactive_viewport_info( ) field may include at least one of a next_track_ID field, a next_viewpoint_ID field, a center_interactive_yaw field, a center_interactive_pitch field, a center_interactive_roll field, a center_interactive_tilt field, a new_viewport_horizontal field, a new_viewport_vertical field, or a transfer_rate field as a sub-field.

The next_track_ID field indicates an identifier of a track or a track group in which a 360 video linked when a viewpoint is changed (via a hotspot) is stored. As described above, a 360 video or a part thereof may be stored or configured on a per track/track group basis so as to be transmitted.

The next_viewpoint_ID field indicates an identifier for a next viewpoint that is linked when a viewpoint is changed (via the hotspot).

The center_interactive_yaw field, the center_interactive_pitch field, and the center_interactive_roll field indicate the position of the center (which may be called center_interactive) of a viewport (e.g., a subsequent viewport, the default viewport, and the second viewport) displayed after movement from the hotspot center to the selected viewpoint. For example, the corresponding values may be expressed in spherical coordinates such as yaw, pitch, and roll. Alternatively, the corresponding values may be expressed in Cartesian coordinates X, Y, and Z. In this case, the yaw, pitch, and roll in the field names may be replaced by X, Y, and Z. When the spherical coordinates are used, the unit may be degrees, yaw and roll may be expressed in the range of [−180, 180], and pitch may be expressed in the range of [−90, 90].

The center_interactive_tilt field may indicate the degree of tilt of a corresponding viewport (e.g., a subsequent viewport, the default viewport, or the second viewport) on a sphere. This field may be omitted.

The new_viewport_horizontal field and the new_viewport_vertical field may indicate the size of the corresponding viewport (e.g., a subsequent viewport, the default viewport, or the second viewport) in both horizontal and vertical directions centering on the center_interactive. The values may be equal to a predetermined viewport size, or may be less or greater than the predetermined size when necessary. When the size of the viewport is constant or predetermined, the new_viewport_horizontal field and the new_viewport_vertical field may be omitted.

The transfer_rate field indicates a weight for the transfer_distance, which is a difference between the viewport center and the hotspot center. For example, the transfer_rate field may indicate a weight value required to show a viewport (e.g., a compensated viewport, a compensated second viewport) that compensates for a position after connection to another viewpoint, using the transfer_distance. In this case, the center position of the compensated viewport may be called compensated_center. For example, when compensation is performed by reflecting the transfer_distance, the value of the transfer_rate field may be 1. When a distance shorter than the transfer_distance is moved and a rendered viewport is shown, the transfer_rate may have a value less than 1. When a distance longer than the transfer_distance is moved and a rendered viewport is shown, the transfer_rate field may have a value greater than 1. Here, the compensation direction may depend on the hotspot type described above. For example, when the hotspot type is jumping, the transfer_rate field may be set to 0.

The hotspot types may be described as follows.

Figure 22:
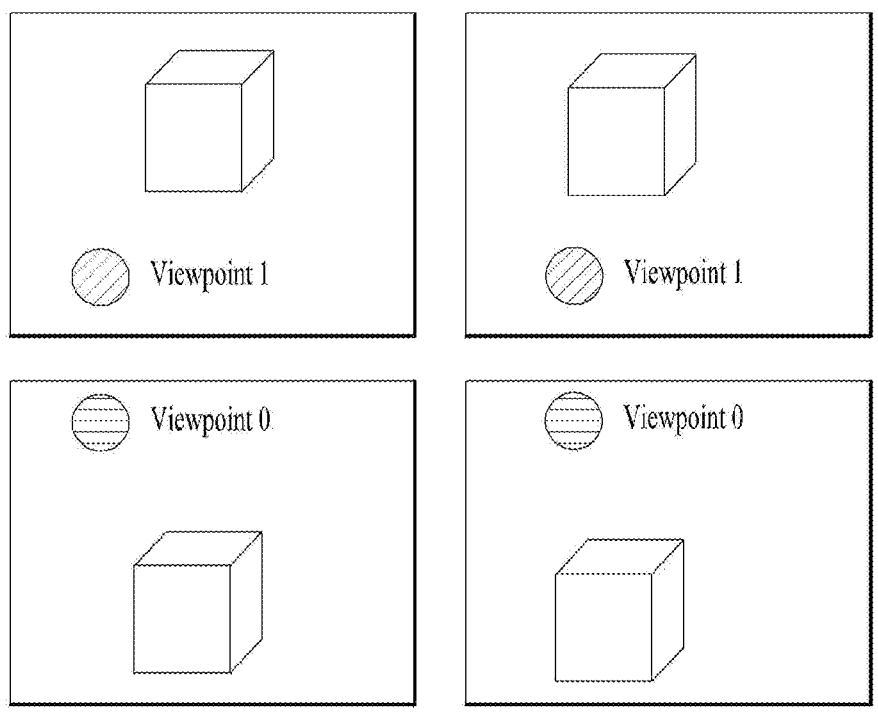
Figure 24:
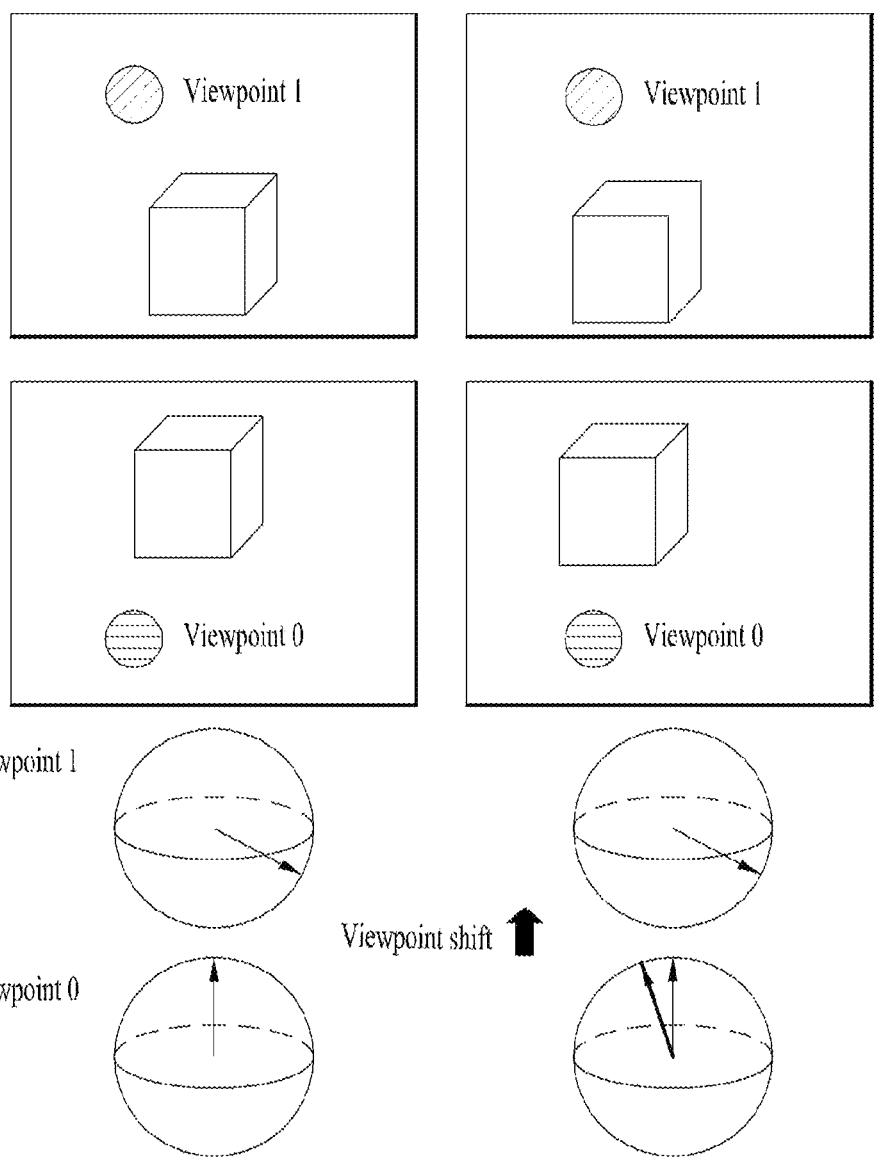

FIGS. 22 to 24 exemplarily show hotspot types to which the present disclosure is applicable. FIG. 22 shows the forward type, FIG. 23 shows the mirror type, and FIG. 24 shows the jumping type.

The forward type may represent a case where the direction of progress at a viewpoint before the transfer is the same as the direction of progress of the content after the transfer when switching between the viewpoints (whose axes are aligned) occurs. For example, when a user selects (via a hotspot) a viewpoint linked to the viewport that the user is viewing at the previous viewpoint, such as a road view, the forward type may indicate a case where content that is farther away that the content at the previous viewpoint is displayed.

The mirror type may represent a case where switching between viewpoints (whose axes are aligned) occurs, and the viewpoint before the transfer and the viewpoint after the transfer are at positions facing each other. For example, when there are multiple viewpoints in a stadium, the mirror type may represent a case where two of the viewpoints are at opposite positions in the stadium, and adaptive viewport compensation in opposite directions is needed when transfer occurs from the previous viewpoint to the next viewpoint (via a hotspot).

The jumping type may represent a case where there is a hotspot via which transfer to another viewpoint is allowed regardless of the position of the adaptive viewport when switching between viewpoints (whose axes are aligned) occurs, and compensation is not required after the transfer. For example, when a medium that is a position to which the viewpoint before the transfer may be switched is a door or a window from which no information about the viewpoint after the transfer is known, the jumping type may correspond to a case where the viewport information after the transfer does not need to be compensated even if the viewport is transferred from the viewpoint given before the transfer.

As another example, the above-described hotspot information may be configured as follows.

TABLE 7

```
aligned (8)   class           Hotspot_Info (){
    unsigned int(16)Num_of_hotspot;
    for (i=0;i<Num_of_hotspot;i++){
        unsigned int(16)          hotspot_ID;
        unsigned int(8)           Hotspot_Type;
        signed int(32)            hotspotCenter_azimuth;
        signed int(32)            hotspotCenter_elevation;
        signed int(32)            hotspotCenter_distance;
        unsigned int(16)          hotspotRange_Horizontal;
        unsigned int(16)          hotspotRange_Vertical;
        unsigned int(16)          viewport_center_azimuth;
        unsigned int(16)          viewport_center_elevation;
        unsigned int(16)          viewport_center_distance;
        interactive_viewport_info();
    }
}
aligned (8)   class           interactive_viewport_info(){
    unsigned int(16)          next_track_ID;
    unsigned int (16)         next_viewpoint_ID;
    signed int(32)            center_interactive_azimuth;
    signed int(32)            center_interactive_elevation;
    signed int(32)            center_interactive_distance;
    signed int(32)            center_interactive_tilt;
    unsigned int(16)          transfer_rate;
    unsigned int(16)          new_viewport_horizontal;
    unsigned int(16)          new_viewport_vertical;
}
```

Fields having the same name as the above-described fields may carry the same information. The following description is based on this.

The hotspotCenter_azimuth field, the hotspotCenter_elevation field, and the hotspotCenter_distance field may indicate the azimuth, elevation, and distance of a hotspot center, respectively. That is, these fields may indicate the center point of the hotspot, which is a point linked to another viewpoint before the viewpoint transfer, using azimuth, elevation, and distance. The values may be represented by spherical coordinates.

The viewport_center_azimuth field, the viewport_center_elevation field, and the viewport_center_distance field indicate azimuth, elevation, distance of the position of the viewport center of the viewport (e.g., the previous viewport, the first viewport) where the hotspot is positioned, respectively. The viewport_center_azimuth field, the viewport_center_elevation field, and the viewport_center_distance field may indicate the position of the viewport_center with spherical coordinates azimuth, elevation, and distance to compensate for the position of a viewport (e.g., a subsequent viewport, the default viewport, the second viewport) rendered when transfer to another viewpoint occurs in the case where the hotspotCenter is different from the viewport_center.

The center_interactive_azimuth field, the center_interactive_elevation field, and the center_interactive_distance field may indicate the position of the center (center_interactive) of the viewport (e.g., a subsequent viewport, the default viewport, the second viewport) that is displayed after transfer from the hotspot center to the selected viewpoint occurs. These values may be represented by spherical coordinates of azimuth, elevation, and distance.

As described above, the transfer_rate field indicates a weight for the transfer_distance, which is a difference between the viewport center and the hotspot center. For example, the transfer_rate field may indicate a weight value required to show a viewport (e.g., a compensated viewport, a compensated second viewport) that compensates for a position after connection to another viewpoint, using the transfer_distance. In this case, the center position of the compensated viewport may be called compensated_center.

For example, when compensation is performed by reflecting the transfer_distance, the value of the transfer_rate field may be 1. When a distance shorter than the transfer_distance is moved and a rendered viewport is shown, the transfer_rate may have a value less than 1. When a distance longer than the transfer_distance is moved and a rendered viewport is shown, the transfer_rate field may have a value greater than 1. Here, the compensation direction may depend on the hotspot type described above. For example, the transfer_rate may be applied according to each hotspot type as follows.

FIG. 25 shows an example of position compensation and an application direction of transfer_rate according to each hot spot type.

A point linked via a hotspot may be represented by the above-described hotspot_center value, and may be different from the center value of the viewport (e.g., the previous viewport, the first viewport) invoked by the user through the hotspot. That is, the hotspot center of the hotspot may be different from the viewport center of the viewport (e.g., the previous viewport, the first viewport) in which the hotspot is positioned. Accordingly, when the center of the hotspot is different from the center of the viewport (e.g., the previous viewport, the first viewport), the transfer_distance in FIG. 25 may be obtained by calculating a difference between the coordinates of the centers. Based on the transfer distance, a viewport (e.g., a compensated viewport, a compensated second viewport) of a compensated position may be derived from the viewport (e.g., a subsequent viewport, the default viewport, the second viewport) in another viewpoint. Here, the transfer_distance, which is the difference, may be limited so as to be within a specific range, and the compensation may not be performed for a distance outside the specific range.

After calculating the transfer_distance, the degree of compensation for the transfer distance may be determined by applying the transfer_rate described above. For example, the transfer_rate may have a value between 0 and 1.

For example, when a user selects (or clicks) a hotspot, a viewport (a subsequent viewport, a default viewport, a second viewport) centered on the center_interactive set at the viewpoint after switching may be rendered. When the user selects (or clicks) the hotspot after transferring the viewport center of the viewport (the previous viewport, the first viewport) (within the allowable specific range), transfer_distance may be derived. In this case, when the transfer_rate is 1, a viewport (compensated viewport, compensated second viewport) centered on a position that is at the transfer distance from the center_interactive (i.e., the center of a subsequent viewport, the default viewport, or the second viewport) that is to be linked at the switched viewpoint may be rendered. When the transfer_rate is 0.5, a viewport (compensated viewport, compensated second viewport) centered on a position that is at a distance equal to 50% of the transfer distance from the center_interactive (i.e., the center of a subsequent viewport, the default viewport, or the second viewport) that is to be linked at the switched viewpoint may be rendered. The transfer_rate may be calculated as a ratio of transfer_distance/hotspotRange, may have a weight, or may be arbitrarily specified.

Figure 26:
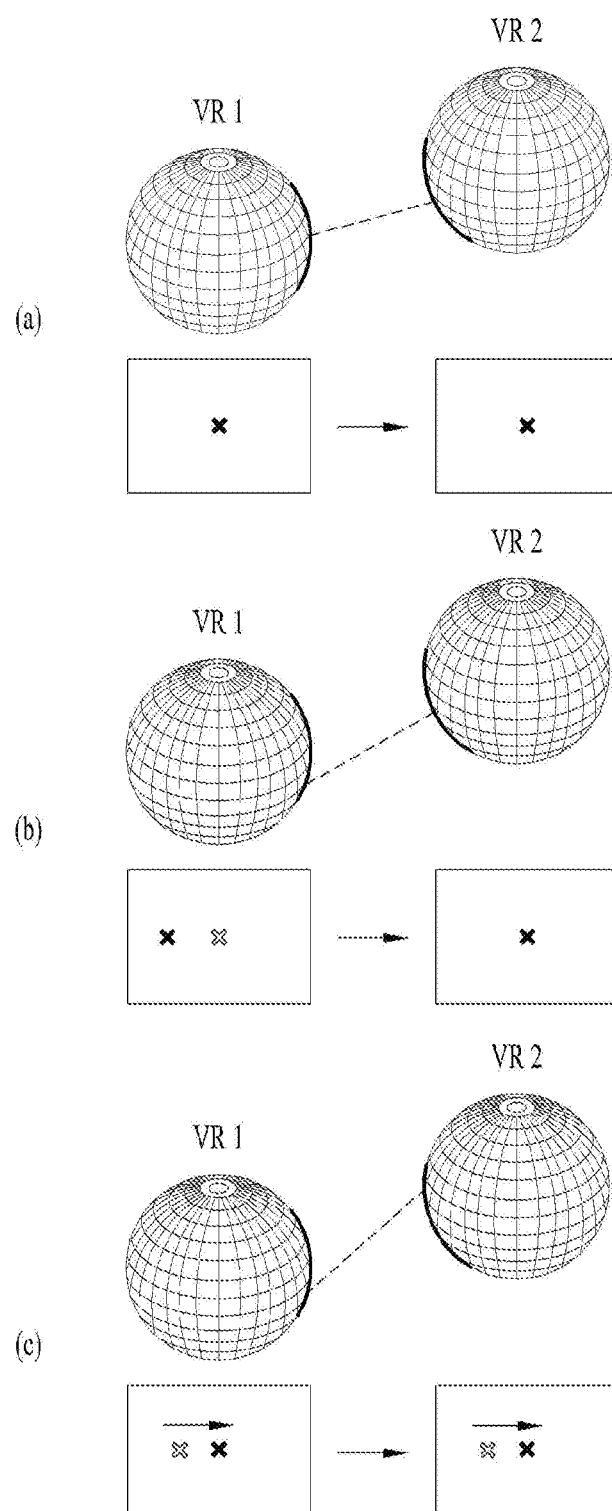
FIG. 26 shows exemplary adaptive viewport applications according to the present disclosure.

The transfer_rate may be applied in different directions based on the hotspot type, as shown in FIG. 26. For example, when the mirror type is applied, the compensation direction and/or the application direction of the transfer_rate may be opposite to the transfer_distance direction. For example, when the forward type is applied, the compensation direction and/or the application direction of the transfer_rate may be the same as the transfer_distance direction. For example, when the jumping type is applied, one or any of the compensation direction and/or the application direction of the transfer_rate may not be provided, and compensation may not be applied.

The viewport_center of the viewport before switching (the previous viewport, the first viewport) may be a partial area of a 360 video formed based the gaze direction of the user at the user's position acquired from the head/eye tracking device or sensor, and the size of the viewport before switching (the previous viewport, the first viewport) may be changed according to a specifications such as the FOV of the device.

According to the present disclosure as described above, an adaptive viewport may be provided to a user in consideration of the positions of the hotspot center and the viewport center of a viewport (the previous viewport, the first viewport) in which the corresponding hotspot is positioned. In this case, an adaptive viewport (a compensated viewport, a compensated second viewport) may be provided to the user by applying compensation for a viewport after switching through the hotspot (a subsequent viewport, the default viewport, the second viewport) considering the difference in position between the hotspot center and the viewport center as a transfer_distance.

FIG. 26 shows exemplary adaptive viewport applications according to the present disclosure.

Referring to FIG. 26, in conventional cases, switching through the hotspot is performed assuming only the case where the viewport center of the viewport (previous viewport, first viewport) where the hotspot in the first viewpoint is positioned coincides with the hotspot center as shown in (a). Accordingly, as shown in (b) even when the viewport center of the viewport (the previous viewport, the first viewport) where the hotspot in the first viewpoint is positioned does not coincide with the hotspot center as shown in (b), the center of the viewport (a subsequent viewport, the default viewport, and the second viewport) of the second viewport simply linked to the hotspot is immediately rendered or displayed, which may cause dizziness to the user or restrict the natural shift of content. However, according to the present disclosure, as shown in (c), when the viewport center of the viewport (the previous viewport, the first viewport) where the hotspot is positioned does not coincide with the hotspot center, an adaptive viewport (a compensated viewport, a compensated second viewport) may be provided to the user by applying compensation for a viewport after switching through the hotspot (a subsequent viewport, the default viewport, the second viewport) considering the difference in position between the hotspot center and the viewport center as a transfer_distance. Thereby, user discomfort such as user visual fatigue may be minimized in switching between viewpoints.

In order to signal the multi-viewpoint omnidirectional video (360 video) information according to the present disclosure, the multi-viewpoint information as described above may be positioned in MultiviewpointOmniVideoSampleEntry or MultiviewpointOmniVideoSample( ) in a sample entry of a timed metadata track or mdat in the ISOBMFF using, for example, the Multi viewpoint_info( ) struct described above as follows. It may be present in another box in the ISOBMFF.

TABLE 8

```
Class MultiviewpointOmniVideoSample(version_flag) {
    unsinged int(16)num_of_viewpoint;
    for(i=0;i <num_of_viewpoint; i++){
        unsigned int(16)        viewpoint_ID[i];
        unsigned int(16)        viewpoint_radius;
        signed int(32)          viewpoint_pos_centerX;
        signed int(32)          viewpoint_pos_centerY;
        signed int(32)          viewpoint_pos_centerZ;
        if (alignment_availability == 1)
            alignment_struct();
        Hospot_Info();
    }
}
```

Although the origin_viewpoint_ID field is omitted in Table 8, this is merely an example. The origin_viewpoint_ID field may be further included as shown in Table 1 above.

The multi-viewpoint information (multiviewpoint_Info( )), (axes) alignment information (Alignmnet_struct ( )), and hotspot information (Hotspot_Info ( )) proposed above may be included in, for example, the track header ('tkhd') box included in the moov box of the ISOBMFF as shown below.

TABLE 9

```
aligned(8) class TrackHeaderBox    extends FullBox('tkhd', version, flags){
    if (version==1) {
        unsigned int(64)            creation_time;
        unsigned int(64)            modification_time;
        unsigned int(32)            track_ID;
        const unsigned int(32)      reserved = 0;
        unsigned int(64)            duration;
    }else {// version==0
        unsigned int(32)            creation_time;
        unsigned int(32)            modification_time;
        unsigned int(32)            track_ID;
        const unsigned int(32)      reserved = 0;
        unsigned int(32)            duration;
    }
    const unsigned int(32)[2]       reserved = 0;
    template int(16)                layer =0;
    template int(16)                alternate_group = 0;
    template int(16) volume = {if track_is_audio 0x0100 else 0};
    const unsigned int(16)          reserved = 0;
    template int(32)[9]             matrix=
    { 0x00010000,0,0,0,0x00010000,0,0,0,0x40000000 };// unity matrix
    unsigned int(32) width;
    unsigned int(32)                height;
    unsigned int(1)   Multiviewpoint_info_flag;
    unsigned int(7)   reserved=0;
    if(Multiviewpoint_info_flag == 1){
            unsigned int(16)        origin_viewpoint_ID;
            unsigned int(16)        num_of_viewpoint;
            for(i=0;i <num_of_viewpoint; i++){
            unsigned int(16)        viewpoint_ID[i];
            unsigned int(16)        viewpoint_radius;
            signed int(32)          viewpoint_pos_centerX;
            signed int(32)          viewpoint_pos_centerY;
            signed int(32)          viewpoint_pos_centerZ;
            if (alignment_availability == 1)
                    alignment_struct();
            Hospot_Info();
        }
}
```

The Multiviewpoint_info_flag field may indicate whether multi-viewpoint omnidirectional video (360 video) information is included in the video track. When the value of the Multiviewpoint_info_flag field is 1, it may indicate that the multi-viewpoint omnidirectional video (360 video) information is included in the video track. When the value of the Multiviewpoint_info_flag field is 0, SphereRegionStruct may be invoked to signal the existing 360 video.

Metadata related to the multi-viewpoint omnidirectional video information as described may be included in the video media header ("vmhd") box included in the track box of the ISOBMFF as shown below.

TABLE 10

```
aligned(8) class VideoMediaHeaderBox extends FullBox('vmhd',
version = 0, 1) {
template unsigned int(16)           graphicsmode = 0;
// copy, see below
    template unsigned int(16)[3]            opcolor = {0, 0, 0};
    unsigned int(1)     Multiple viewpoint_info_flag;
    unsigned int(7)     reserved=0;
    if(Multiviewpoint_info_flag == 1){
            unsigned int(16)        origin_viewpoint_ID;
            unsigned int(16)        num_of_viewpoint;
            for(i=0;i < num_of_viewpoint; i++){
            unsigned int(16)        viewpoint_ID[i];
            unsigned int(16)        viewpoint_radius;
            signed int(32)          viewpoint_pos_centerX;
            signed int(32)          viewpoint_pos_centerY;
            signed int(32)          viewpoint_pos_centerZ;
            if (alignment_availability ==1)
                    alignment_struct();
            Hospot_Info();
        }
    }
}
```

When the metadata related to the multi-viewpoint omnidirectional video information is included in both the track header(tkhd) box and the video media header box at the same time, the values of respective elements of the multi-viewpoint information flag and the multi-viewpoint omnidirectional video information related metadata defined in the track header box may be overridden by the values defined in the video media header.

A reference type may be defined to process supplemental information only when multi-viewpoint omnidirectional video information is linked by signaling, in the track, whether information about omnidirectional videos supporting multiple viewpoints is linked. 'mvom' may be used as a track reference to indicate that multi-viewpoint omnidirectional video information is present in the corresponding track, and may indicate track_ID information to which the multi-viewpoint omnidirectional video information is linked. It may be represented, for example, as in Tables 11 and 12 below.

TABLE 11

```
aligned(8) Class TrackReferenceBox extends Box('tref') {
}
aligned(8) class TrackReferenceTypeBox (unsigned int(32) reference_type)
extends Box(reference_type) {
    unsigned int(32) Track_IDs[];
}
```

TABLE 12

| Track Reference | Description |
| --- | --- |
| 'hint' | The referenced track(s) contain the original media for this hint track |
| 'cdsc' | This track describes the referenced track |
| 'font' | This track uses fonts carried/defined in the referenced track |
| 'hind' | This track depends on the referenced hint track i.e., it should only be used if the referenced hint track is used |
| 'vdep' | This track contains auxiliary depth video information for the referenced video track |

TABLE 12-continued

| Track Reference | Description |
| --- | --- |
| 'vplx' | This track contains auxiliary parallax video information for the referenced video track |
| 'subt' | This track contains subtitle, timed text or overlay graphical information for the referenced track or any track in the alternate group to which the track belongs, if any. |
| 'mvom' | This track contains information related to multiple viewpoint omnidirectional video information for the referenced track or any track in the alternate group to which the track belongs, if any |

Using the 'hdlr' box positioned in the 'meta' box, the position of the hotspot, the position for playback after selecting the linked VR content (360 content), a time for which information indicating that a hotspot is linked in the scene of the currently played VR content is to be exposed, and the like may be defined. For example, in the Handler boxes, 'mvom', which is MultiviewpointlnformationBox, may be configured as follows.

TABLE 13

```
Class MultiviewpointInformationBox extends Box ('mvom'){
        if(Multiviewpoint_info_flag == 1){
               unsigned int(16)      origin_viewpoint_ID;
               unsigned int(16)      num_of_viewpoint;
               for(i=0;i < num_of_viewpoint; i++){
                       unsigned int(16)     viewpoint_ID[i];
                       unsigned int(16)     viewpoint_radius;
                       signed int(32)       viewpoint_pos_centerX;
                       signed int(32)       viewpoint_pos_centerY;
                       signed int(32)       viewpoint_pos_centerZ;
                       if (alignment_availability == 1)
                               alignment_struct();
                       Hospot_info();
               }
        }
}
```

Tracks having the same track_group_type and the same track_group_id in the TrackGroupBox may be grouped into one group. Thus, tracks containing multi-viewpoint omnidirectional video information may be grouped into one group. When the track_group_type indicates that 'mvom is a track belonging to a group capable of presenting a multi-viewpoint omnidirectional video and has the same track_group_id, this may mean that the same multi-viewpoint omnidirectional video information is given. For example, this configuration may be expressed as follows.

TABLE 14

```
aligned(8)           class TrackGroupBox('trgr') {
}
Aligned(8)           class TrackGroupTypeBox(unsigned int(32)
track_group_type) extends FullBox(track_group_type, version=0,
flags = 0)
{
        unsigned int(32)     track_group_id;
        // the remaining data may be specified for a particular
track_group_type
}
```

The information suggested above may be included in any box such as the sample entry, the sample group box, or the track group box in the media file format. Further, the proposed information may be signaled in the DASH MPD, and may be delivered in the SEI or the like in a video bitstream.

According to the present disclosure described above, to align axes, rotation and axis shift may be performed between multi-viewpoint 360 videos generated around the origin point in each viewpoint with the three-dimensional axes misaligned.

In addition, there may be a hotspot, which is a link point through which movement or switching between two 360 videos may be performed at a specific point, and the user may move from one 360 video (a 360 video based on a first viewpoint) to another 360 video (a 360 video based on a second viewpoint) by selecting the hotspot. In this case, a viewport to be displayed at the second viewpoint after the hotspot is selected may be specified.

In addition, when the hotspot is not aligned with the center point of the viewport within the first viewpoint, the difference in distance corresponding to the misalignment may be explicitly or implicitly signaled as a transfer_distance, and a compensated viewport based on the transfer distance may be presented in a new 360 video (the 360 video of the second viewpoint). By playing the viewport obtained by compensating for the distance as described above, visual fatigue that may occur due to sudden movement between viewports when the user uses the content may be reduced.

Figure 27:
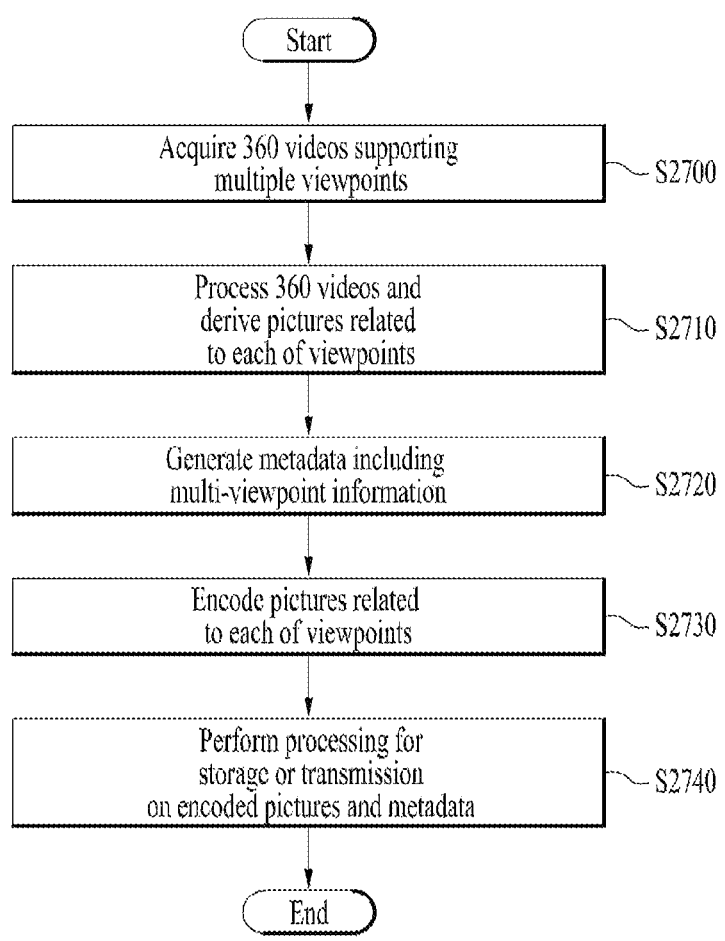
FIG. 27 schematically illustrates a method for processing 360 video data based on multiple viewpoints by a 360 video transmission apparatus according to the present disclosure.

FIG. 27 schematically illustrates a method for processing 360 video data based on multiple viewpoints by a 360 video transmission apparatus according to the present disclosure. The method disclosed in FIG. 27 may be performed by the 360 video transmission apparatus disclosed in FIG. 5 or 16.

The 360 video transmission apparatus acquires 360 videos supporting multiple viewpoints (S2700). The 360 videos may be captured by at least one camera. Alternatively, some or all of the 360 videos may be virtual videos generated by a computer program or the like.

The 360 video transmission apparatus processes the 360 videos and derives pictures related to each of the viewpoints (S2710). The 360 video transmission apparatus may derive the 2D-based pictures based on the various projection formats described above. In this case, the pictures may be distinguishably derived according to the respective viewpoints.

The 360 video transmission apparatus generates metadata about the 360 videos supporting the multiple viewpoints (S2720). Here, the metadata may include the fields described above in this specification. The fields may be included in boxes of various levels or as data in a separate track in a file. For example, the metadata may include some or all of the information described in Tables 1 to 14 above. For example, the metadata may include the multi-viewpoint information described above. The multi-viewpoint information may include the hotspot information and the axis alignment information described above.

For example, the multi-viewpoint information may indicate that a hotspot in a first viewport of a first viewpoint among the multiple viewpoints is linked to a second viewport in a second viewpoint.

For example, the multi-viewpoint information may include information about the center position of the first viewport and information about the center position of the hotspot. The position of the center of the second viewport may represent a compensated position obtained based on a difference in distance between the center position of the first viewport and the center position of the hotspot. For example, when the difference in distance is greater than a predetermined threshold, the center position of the second viewport may be a compensated position obtained based on the difference in distance. The threshold may be 0 or defined as a value of n.

For example, the multi-viewpoint information may further include information about a center position of a default viewport in the second viewpoint related to the hotspot. The center position of the second viewport may indicate a compensated position obtained using the difference in distance based on the center position of the default viewpoint.

For example, the multi-viewpoint information may include transfer rate information. The transfer rate information may indicate a weight value for the difference in distance, and the center position of the second viewport may represent a compensated position obtained by applying the weight value to the difference in distance.

For example, the multi-viewpoint information may include hotspot type information. The hotspot type information may include at least one of a forward type, a mirror type, and a jumping type. The compensation direction applied to the center position of the second viewport when the forward type is applied, the center of the second viewport may be different from the compensation direction applied to the center position of the second viewport when the mirror type is applied.

For example, the multi-viewpoint information may include information about the vertical size and horizontal size of the second viewport. The second viewport may be derived further based on the information about the vertical size and horizontal size of the second viewport.

For example, the multi-viewpoint information may include information about the number of other viewpoints linked to the first viewpoint or the first viewpoint.

For example, the multi-viewpoint information may include axis alignment information about alignment of axes for the first viewpoint or the second viewpoint. The axis alignment information may indicate an offset value for at least one axis for aligning the axes for the first viewpoint or the second viewpoint with reference axes.

For example, the multi-viewpoint information may include information about a reference viewpoint, and the reference axes may be derived based on the axes of the reference viewpoint.

For example, the information about axes alignment may indicate offset values for at least one of the X axis, the Y axis, and the Z axis.

For example, the multi-viewpoint information may include an alignment flag for the first viewpoint or the second viewpoint. When the value of the alignment flag is 1, the multi-viewpoint information may include the axis alignment information.

For example, the metadata may include a multi-viewpoint information flag. When the value of the multi-viewpoint information flag is 1, the multi-viewpoint information may be included in the metadata.

Pictures related to each of the viewpoints are encoded (S2730). The 360 video transmission apparatus may encode the pictures related to each of the viewpoints separately.

The 360 video transmission apparatus performs processing on the encoded pictures and the metadata for storage or transmission (S2740). The 360 video transmission apparatus may encapsulate the encoded 360 video data (data about the encoded pictures) and/or the metadata in a file format or the like. The 360 video transmission apparatus may encapsulate the encoded 360 video data and/or the metadata in a file format such as ISOBMFF or CFF, or process the same in the form of a DASH segment or the like to store or transmit the same. The 360 video transmission apparatus may include the metadata in a file format. For example, the metadata may be included in various levels of boxes in the ISOBMFF file format, or may be included as data in a separate track in the file. The 360 video transmission apparatus may encapsulate the metadata as a file. The 360 video transmission apparatus may apply processing for transmission to the encapsulated 360 video data according to the file format. The 360 video transmission apparatus may process the 360 video data according to any transmission protocol. The processing for transmission may include processing for delivery over a broadcasting network, or processing for transmission over a communication network such as broadband. In addition, the 360 video transmission apparatus may apply processing for transmission to the metadata. The 360 video transmission apparatus may transmit the 360 video data and the metadata processed for transmission over a broadcasting network and/or broadband.

Figure 28:
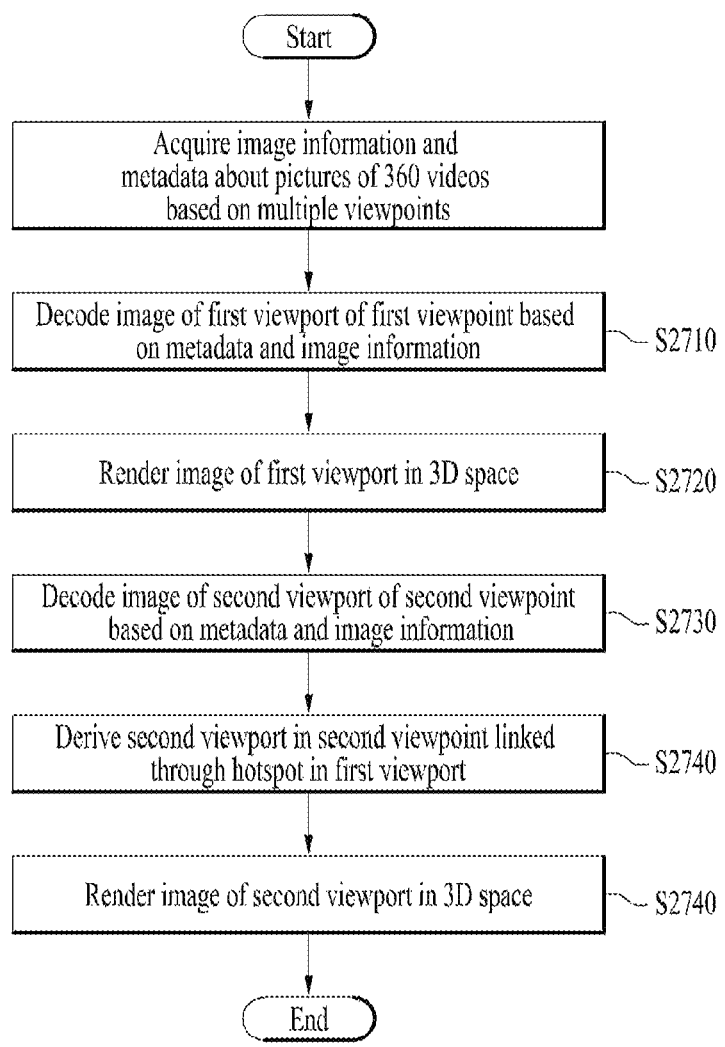
FIG. 28 schematically illustrates a method for processing 360 video data based on multiple viewpoints by a 360 video reception apparatus according to the present disclosure.

FIG. 28 schematically illustrates a method for processing 360 video data based on multiple viewpoints by a 360 video reception apparatus according to the present disclosure. The method disclosed in FIG. 28 may be performed by the 360 video reception apparatus disclosed in FIG. 6 or 17.

Image information about pictures of 360 videos based on multiple viewpoints and metadata about the 360 videos based on the multiple viewpoints are acquired from a received video signal (S2800). The 360 video reception apparatus may acquire the image information about the pictures of the 360 videos based on multiple viewpoints and the metadata signaled from the 360 video transmission apparatus over a broadcasting network. The 360 video reception apparatus may receive the image information and the metadata over a communication network, such as broadband, or a storage medium. Here, the pictures may represent 2D-based pictures, and may correspond to a projected picture or a packed picture (when region-wise packing is applied).

The metadata may include the fields described above in this specification. The fields may be included in boxes of various levels or as data in a separate track in a file. For example, the metadata may include some or all of the information described in Tables 1 to 14 above. For example, the metadata may include the multi-viewpoint information described above. The multi-viewpoint information may include the hotspot information and the axis alignment information described above.

For example, the multi-viewpoint information may indicate that a hotspot in a first viewport of a first viewpoint among the multiple viewpoints is linked to a second viewport in a second viewpoint.

For example, the multi-viewpoint information may include information about the center position of the first viewport and information about the center position of the hotspot. The position of the center of the second viewport may represent a compensated position obtained based on a difference in distance between the center position of the first viewport and the center position of the hotspot. For example, when the difference in distance is greater than a predetermined threshold, the center position of the second viewport may be a compensated position obtained based on the difference in distance. The threshold may be 0 or defined as a value of n.

For example, the multi-viewpoint information may further include information about a center position of a default viewport in the second viewpoint related to the hotspot. The center position of the second viewport may indicate a compensated position obtained using the difference in distance based on the center position of the default viewpoint.

For example, the multi-viewpoint information may include transfer rate information. The transfer rate information may indicate a weight value for the difference in distance, and the center position of the second viewport may represent a compensated position obtained by applying the weight value to the difference in distance.

For example, the multi-viewpoint information may include hotspot type information. The hotspot type information may include at least one of a forward type, a mirror type, and a jumping type. The compensation direction applied to the center position of the second viewport when the forward type is applied, the center of the second viewport may be different from the compensation direction applied to the center position of the second viewport when the mirror type is applied.

For example, the multi-viewpoint information may include information about the vertical size and horizontal size of the second viewport. The second viewport may be derived further based on the information about the vertical size and horizontal size of the second viewport.

For example, the multi-viewpoint information may include information about the number of other viewpoints linked to the first viewpoint or the first viewport.

For example, the multi-viewpoint information may include axis alignment information about alignment of axes for the first viewpoint or the second viewpoint. The axis alignment information may indicate an offset value for at least one axis for aligning the axes for the first viewpoint or the second viewpoint with reference axes.

For example, the multi-viewpoint information may include information about a reference viewpoint, and the reference axes may be derived based on the axes of the reference viewpoint.

For example, the information about axes alignment may indicate offset values for at least one of the X axis, the Y axis, and the Z axis.

For example, the multi-viewpoint information may include an alignment flag for the first viewpoint or the second viewpoint. When the value of the alignment flag is 1, the multi-viewpoint information may include the axis alignment information.

For example, the metadata may include a multi-viewpoint information flag.

When the value of the multi-viewpoint information flag is 1, the multi-viewpoint information may be included in the metadata.

The image of the first viewport of the first viewpoint is decoded based on the metadata and the image information (S2810). The 360 video reception apparatus may decode the entire picture area of the first viewpoint based on the metadata and the image information, or may decode a part of the area including the first viewport.

The 360 video reception apparatus renders the image of the first viewport in 3D space (S2820). The 360 video reception apparatus may process the decoded image of the first viewport based on the metadata and render the same in the 3D space.

The 360 video reception apparatus decodes the image of the second viewport of the second viewpoint based on the metadata and the image information (S2830). The 360 video reception apparatus may decode the entire picture area of the second viewpoint based on the metadata and the image information, or may decode a part of the area including the second viewport.

The 360 video reception apparatus derives the second viewport in the second viewpoint linked through the hotspot in the first viewport based on the multi-viewpoint information (S2840). The 360 video reception apparatus may derive the second viewport in the second viewpoint linked through the hotspot based on the multi-viewpoint information when the hotspot in the first viewport is selected.

The 360 video reception apparatus renders the image of the second viewport in the 3D space (S2850). The 360 video reception apparatus may process the decoded image of the second viewport based on the metadata and render the same in the 3D space.

The above-described steps may be omitted or replaced by other steps of performing similar/same operations according to embodiments.

The internal components of the above-described device may be processors that execute successive processes stored in the memory, or may be hardware components composed of other hardware. These components may be arranged inside/outside the device.

The above-described modules may be omitted or replaced by other modules configured to perform similar/same operations according to embodiments.

Each of the above-described parts, modules, or units may be a processor or hardware part that executes successive procedures stored in a memory (or storage unit). Each of the steps described in the above-described embodiment may be performed by processors or hardware parts. Each module/block/unit described in the above-described embodiment may operate as a hardware element/processor. In addition, the methods described in the present disclosure may be executed as code. The code may be written in a recoding medium readable by a processor, and thus may be read by the processor provided by the apparatus.

While the methods in the above-described embodiment are described based on a flowchart of a series of steps or blocks, the present disclosure is not limited to the order of the steps. Some steps may take place in a different order or simultaneously. It will be understood by those skilled in the art that the steps shown in the flowchart are not exclusive, and other steps may be included or one or more of the steps in the flowchart may be deleted within the scope of the present disclosure.

When embodiments of the present disclosure are implemented in software, the above-described method may be implemented as a module (process, function, etc.) configured to perform the above-described functions. The module may be stored in a memory and may be executed by a processor. The memory may be inside or outside the processor, and may be linked to the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium, and/or other storage devices.

The invention claimed is:

1. A method for processing 360 video data by an apparatus for receiving 360 video data, the method comprising:
    receiving a bitstream including 360 video data for viewpoints and metadata for the 360 video data;
    decapsulating the 360 video data and the metadata;
    decoding the 360 video data; and
    rendering the 360 video data based on the metadata,
    the metadata includes viewpoint transition information for a transition of the viewpoints,
    the viewpoint transition information including type information for a type of a transition effect,
    in response to a first value of the type information, the type representing a mirror effect for a viewpoint, the mirror effect represents that a first viewpoint of the viewpoints is transitioned into a second viewpoint of the viewpoints by flipping the first viewpoint by 180 degrees, and in response to a second value of the type information, the type representing a forward movement in a same direction, the forward movement represents that the first viewpoint of the viewpoints is replaced by the second viewpoint of the viewpoints based on the same direction.

2. The method of claim 1, wherein an image of a first viewport of the first viewpoint is decoded based on the metadata and the image information, wherein an image of a second viewport of the second viewpoint is decoded based on the metadata and the image information, wherein the metadata further includes multiple viewpoint information including information for a center location of the first viewport and information for a center location of the hotspot, or the center location of the second viewport is a compensated location by using a distance difference between the center location of the first viewport and the center location of the hotspot, or wherein the multiple viewpoint information further includes information for a center location of basic viewport in the second viewpoint associated with the hotspot, the center location of the second viewport is a compensated location by using the distance difference based on the center location of the basic viewport.

3. The method of claim 2, wherein the multiple viewpoint information includes transfer rate information, the transfer rate information represents a weight value for the distance difference, the center location of the second viewport is the compensated location by applying the weight value to the distance difference.

4. The method of claim 2, wherein the multiple viewpoint information includes hotspot type information, the hotspot type information includes at least one of a forward type, a mirror type, and a jumping type, a compensated orientation for the forward type that is applied to the center location of the second viewport is different from a compensated orientation that is applied to the center location of the second viewport for the mirror type.

5. The method of claim 2, wherein the multiple viewpoint information includes information for a horizontal size and a vertical size of the second viewport, the second viewport is derived based on the information for the horizontal size and the vertical size of the second viewport.

6. The method of claim 2, wherein the multiple viewpoint information includes information for a number of other viewpoints that is connected to the first viewpoint or the first viewport.

7. The method of claim 2, wherein the metadata includes a multiple viewpoint information flag, when the multiple viewpoint information flag is one(1), the multiple viewpoint information is included in the metadata.

8. The method of claim 2, wherein when the distance difference is larger than predetermined threshold value, the center location of the second viewport is a compensated location based on the distance difference.

9. The method of claim 2, wherein the multiple viewpoint information includes information for an axis alignment for the first viewpoint or the second viewpoint, the information for the axis alignment represents an offset for at least one axis to align axes for the first viewpoint or the second viewpoint and a reference axis.

10. The method of claim 9, wherein the multiple viewpoint information includes information for a criteria viewpoint, the criteria axis is derived based on axes of the criteria viewpoint.

11. The method of claim 9, wherein the information for the axis alignment represents offset values for at least one of a X axis, a Y axis, and a Z axis.

12. The method of claim 9, wherein the multiple viewpoint information an alignment flag for the first viewpoint or the second viewpoint, when the alignment flag is one(1), the multiple viewpoint information includes information for an alignment of axes.

13. A method for processing 360 video data by 360 video data transmission apparatus, the method comprising:

encoding 360 video data for viewpoints and metadata for the 360 video data;

encapsulating the 360 video data and the metadata;

transmitting a bitstream including the 360 video data and the metadata;

the metadata includes viewpoint transition information for a transition of the viewpoints, the viewpoint transition information including type information for a type of a transition effect, in response to a first value of the type information, the type representing a mirror effect for a viewpoint, the mirror effect represents that a first viewpoint of the viewpoints is transitioned into a second viewpoint of the viewpoints by flipping the first viewpoint by 180 degrees, and in response to a second value of the type information, the type representing a forward movement in a same direction, the forward movement represents that the first viewpoint of the viewpoints is replaced by the second viewpoint of the viewpoints based on the same direction.

14. The method of claim 13, wherein the metadata further includes multiple viewpoint information, represents that a second viewport in the second viewpoint is connected based on a hotspot in a first viewport of the first viewpoint of the viewpoints, including information for a center location of the first viewport and information for a center location of the hotspot, the center location of the second viewport is a compensated location by using a distance difference between the center location of the first viewport and the center location of the hotspot, or wherein the multiple viewpoint information further includes information for a center location of basic viewport in the second viewpoint associated with the hotspot, the center location of the second viewport is a compensated location by using the distance difference based on the center location of the basic viewport.

15. The method of claim 14,
wherein the multiple viewpoint information includes information for an axis alignment for the first viewpoint or the second viewpoint,
the information for the axis alignment represents an offset for at least one axis to align axes for the first viewpoint or the second viewpoint and a criteria axis.

16. The method of claim 15,
wherein the information for the axis alignment represents offset values for at least one of a X axis, a Y axis, and a Z axis.

17. An apparatus for receiving 360 video data, the apparatus comprising:
a receiver configured to receive a bitstream including 360 video data for viewpoints and metadata for the 360 video data;
a decapsulator configured to decapsulate the 360 video data and the metadata;
a decoder configured to decode the 360 video data;
a renderer configured to render the 360 video data based on the metadata,
the metadata includes viewpoint transition information for a transition of the viewpoints,
the viewpoint transition information including type information for a type of a transition effect,
in response to a first value of the type information, the type representing a mirror effect for a viewpoint, the mirror effect represents that a first viewpoint of the viewpoints is transitioned into a second viewpoint of the viewpoints by flipping the first viewpoint by 180 degrees, and
in response to a second value of the type information, the type representing a forward movement in a same direction, the forward movement represents that the first viewpoint of the viewpoints is replaced by the second viewpoint of the viewpoints based on the same direction.

18. An apparatus for processing 360 video data, the apparatus comprising:
an encoder configured to encode 360 video data for viewpoints and metadata for the 360 video data;
an encapsulator configured to encapsulate the 360 video data and the metadata;
a transmitter configured to transmit a bitstream including the 360 video data and the metadata;
the metadata includes viewpoint transition information for a transition of the viewpoints, the viewpoint transition information including type information for a type of a transition effect,
in response to a first value of the type information, the type representing a mirror effect for a viewpoint, the mirror effect represents that a first viewpoint of the viewpoints is transitioned into a second viewpoint of the viewpoints by flipping the first viewpoint by 180 degrees, and
in response to a second value of the type information, the type representing a forward movement in a same direction, the forward movement represents that the first viewpoint of the viewpoints is replaced by the second viewpoint of the viewpoints based on the same direction.

* * * * *